(12) United States Patent
Kinoshita

(10) Patent No.: US 6,342,965 B1
(45) Date of Patent: *Jan. 29, 2002

(54) OPTICAL FIBER AMPLIFIER AND DISPERSION COMPENSATING FIBER MODULE FOR OPTICAL FIBER AMPLIFIER

(75) Inventor: Susumu Kinoshita, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/619,869

(22) Filed: Mar. 19, 1996

(30) Foreign Application Priority Data

Mar. 20, 1995 (JP) .............................. 7-061345
Oct. 26, 1995 (JP) .............................. 7-278530

(51) Int. Cl.[7] .......................... G02B 6/26; H04B 10/00; H01S 3/30
(52) U.S. Cl. .................. 359/334; 359/124; 359/341.1; 372/3; 372/6
(58) Field of Search .................... 359/124, 160, 359/327, 334, 341, 341.1; 372/3, 6

(56) References Cited

U.S. PATENT DOCUMENTS

| | | | |
|---|---|---|---|
| 3,571,607 A | * 3/1971 | Giordmaine et al. | 359/331 |
| 5,253,104 A | 10/1993 | Delavaux | |
| 5,283,686 A | 2/1994 | Huber | |
| 5,361,319 A | 11/1994 | Antos | |
| 5,532,868 A | * 7/1996 | Gnauck et al. | 359/332 |
| 5,675,428 A | * 10/1997 | Henmi | 359/161 |
| 5,675,429 A | * 10/1997 | Henmi et al. | 359/179 |
| 5,887,093 A | * 3/1999 | Hansen et al. | 385/27 |

FOREIGN PATENT DOCUMENTS

| | | |
|---|---|---|
| EP | 0 404 152 A | 12/1990 |
| EP | 0 421 675 A | 4/1991 |
| EP | 0 458 256 A | 11/1991 |
| EP | 0 554 714 A | 8/1993 |
| EP | 0 566 236 A | 10/1993 |
| JP | 06 097554 A | 4/1994 |
| WO | WO 94 05061 A | 3/1994 |

OTHER PUBLICATIONS

21st European Conference on Optical Communication ECOC'95 including Symposium on Photonic versus Electronic Technologies in Switching and Interconnection Symposium on Broadband Networks for Video and Multimedia Services, Brussels Belgium, Sep. 17–21, 1995, Proceedings vol. 2 Regular Papers & Invited Papers.

Aida et al, IEE Procedings / (Optoelectronics), vol. 137, #4, pp 225–228, Aug. 1990.*

Govind P. Agrawal, "Nonlinear Fiber Optics", Second Edition, Academic Press, 1995.

Emmanuel Desurvire, "Erbium–doped Fiber Amplifiers, Principles and Applications", John Wiley & Sons, Inc., 1994.

(List continued on next page.)

*Primary Examiner*—Nelson Moskowitz
(74) *Attorney, Agent, or Firm*—Rosenman & Colin, LLP

(57) ABSTRACT

The invention provides an optical fiber amplifier which assures stable operation of a pump light source and efficiently makes use of residual pump power to achieve improvement in conversion efficiency. The optical fiber amplifier includes a rare earth doped fiber. Pump light from a pump light source is introduced into one end of the rare earth doped fiber by way of a first optical coupler, and residual pump light originating from the pump light and arriving at the other end of the rare earth doped fiber is applied to the other rare earth doped fiber amplifier or the loss compensation of a dispersion compensating fiber by Raman amplification.

13 Claims, 48 Drawing Sheets

OTHER PUBLICATIONS

D.M. Spirit, High Capacity Optical Transmission Explained, John Wiley & Sons, Inc. 1995.

Nobuhiko Kikuchi, "10–Gbit/s dispersion–compensated transmission over 2245–km conventional (non–dispersion–shifted) fibers in a recirculating loop", OFC'95 Technical Digest, FB5, Feb. 26 to Mar. 3, 1995.

H. Miyata, "Dispersion Compensation Design for 10–Gb/s, 16–Wave WDM Transmission System over Standard Single–Mode Fiber", Processings ECOC'95, Mo.A.4.3, Sep. 17 to 21, 1995.

S. Kinoshita and K. Iga, "Circular Buried Heterostructure (CBH) GaAlAs/GaAs surface emitting lasers," IEEE Jounal of Quantum Electronics, vol. QE–23, No. 6, pp. 882–888, Jun. 1987.

K. Iga, S. Kinoshita, and F. Koyama, "Microcavity GaAlAs/GaAs surface–emitting laser with lth=6mA," Electronics Letters, vol. 23, No. 3, pp. 134–136, Jan. 1987.

S. Kinoshita, T. Okiyama, and H. Kuwahara, "Optimised bandwidth of optical filter in optical preamplifier," Electronics Letters, vol. 28, No. 13, pp. 1213–1214, Jun. 1992.

S.Kinoshita, Y. Sugaya, H. Onaka, M.Takeda, C. Ohshima and T. Chikama, "Low Noise and Wide Dynamic Range Erbium–Dopes Fiber Amplifiers With Automatic Level Control for WDM Transmission Systems," Optical Amplifiers and Their Applications, Monterey, CA, Jul. 11–13, 1996, pp. 211–214.

S. Kinoshita, C. Ohshima, H. Itoh, M. Takeda, T. Kobayashi, Y. Sugaya, T. Okiyama and T. Chikama, "Wide–Dynamic–Range WDM Optical Fiber Amplifiers for 32x 10 Gb/s, SMF Transmission Systems," Optical Amplifiers and their Applications, Vail, CO., Jul. 27–29, 1998, pp. 280–283.

Y. Sugaya, S. Kinoshita, and T. Chikama, "In–service–upgradable and wide–dynamic–range split–band optical fibre amplifier for high–capacity broadband WDM transmission systems," Electronics Letters, vol. 35, No. 16, pp. 1361–1362, Aug. 1999.

Goldstone et al, Proceedings of SPIE, vol. 874 pp 107–110; abstract only herewith, Jan. 14, 1988.*

Izadpanah et al, Electronics Letters, vol. 28, #15, pp 146–71; abst. only herewith, Jul. 16, 1992.*

Delavaux J –M P et al: "Multistage EDFA–Circulator–Based Designs" Optical Fiber Communication. Summaries of Papers Presented at the Conference OFC '95, San Diego, Feb. 26–Mar. 3, 1995, vol. 8, Institute of Electrical and Electronics Engineers, pp. 47–49, XP000517642.

Iwatsuki K et al: "2.8 Gbit/s optical soliton transmission employing all laser diodes" Electronics Letters, Jan. 4, 1990, UK, vol. 26, No. 1, ISSN 0013–5194, pp. 1–2, XP 002054033.

Delavaux J –M P: "COBRA: Compensating Optical Balanced Reflective Amplifier" Proceedings of the European Conference on Optical Communication (EC, Firenze, Sep. 25–29, 1994, vol. 4, Istituto Internazionale Delle Comunicazioni, pp. 5–9.

Chaudhry M S et al: "Unrepeatered Transmission at 2.5Gbit/s Over 410KM with a Single Remote Amplifier and Dispersion Compensation" Electronics Letters, vol. 30, No. 24, Nov. 24, 1994, pp. 2061–2063, XP000492633.

Aida et al, IEE Proc. J. (Optoelectronics), vol. 137, #4, pp. 225–229, 8/90.*

Aida et al, NTT R & D, vol. 40, #2, pp. 229–238, 1991.*

Sian et al, Proc. of OFC, 3/95, pp. 26–1–4.*

Chaudhry et al, Electr. Letters, vol. 30, #24, pp 2061–3, Nov. 24, 1994; abst. only herewith.*

* cited by examiner

| OUTPUT LIGHT POWER | Vcont1 | OPTICAL OUTPUT OF PUMP LD |
|---|---|---|
| ↗ | ↘ | ↘ |
| ↘ | ↗ | ↗ |

| OUTPUT LIGHT POWER | Vcont 2 | OPTICAL OUTPUT OF PUMP LD |
|---|---|---|
| ↗ | ↘ | ↘ |
| ↘ | ↗ | ↗ |

OPTICAL FIBER AMPLIFIER AND DISPERSION COMPENSATING FIBER MODULE FOR OPTICAL FIBER AMPLIFIER

BACKGROUND OF THE INVENTION

1. Field of the Invention

This invention relates to an optical fiber amplifier and a dispersion compensating fiber module for use with an optical fiber amplifier.

2. Description of the Related Art

In recent years, research and development of an optical communication system has been and is being performed energetically, and the importance of booster amplifiers, repeaters or preamplifiers which make use of the technique of optical amplification in which an erbium (Er) doped fiber (an erbium-doped-fiber may be hereinafter referred to as "EDF") is employed has become apparent.

Further, due to the appearance of optical amplifiers, attention is drawn to an optical-amplifier-repeated transmission system since the transmission system plays a very important role in achievement of economization of a communication system in the multimedia society.

By the way, in an ordinary rare earth doped fiber optical amplifier which particularly amplifies a wavelength of a signal, the length of the doped fiber is set to a value at which a maximum gain is obtained in order to assure a high conversion efficiency from pump power to signal power.

Meanwhile, in a wavelength division multiplexing (WDM) optical amplifier which amplifies many channels at the same time, it is important to keep the wavelength dependency of the gain as flat as possible. As a result, the rare earth doped fiber (which will be hereinafter discussed in connection with a representative EDF) must operate in a condition wherein the degree of the saturation of the gain is low. To this end, where the concentration of high level ions is represented by N2 while the concentration of all ions is represented by N1 and N2/N1 is defined as pump ratio, in order to raise the average pump ratio N2/N1 of the doped fiber over the entire length, the length of the doped fiber must be set short.

However, if the doped fiber is formed short in this manner, then much residual pump power will leak out from the other end of the doped fiber, resulting in degradation of the conversion efficiency. Nevertheless, since the required pump power increases as the number of signal wavelengths increases, the output power of a semiconductor pump laser must be raised.

In particular, although it is apparent from the conservative law of energy that the pump power increases as the number of wavelengths increases, a wavelength multiplexing optical amplifier cannot be used in a condition in which it exhibits a high efficiency of conversion from pump power to signal power. This is because, since the rare earth doped fiber is intentionally formed short so as to prevent saturation in order to obtain a gain over a wide bandwidth or to make the gain flat, pump power which has not been converted into a signal will leak out from the other end of the doped fiber.

Accordingly, while high pump power is required originally when comparing with ordinary amplification of only one signal channel, the rare earth doped fiber must be used in a condition wherein the pump power leaks out therefrom.

Thus, in order to effectively make use of thus leaking out residual pump light, a technique has been proposed wherein a reflecting mirror is provided at the other end of a doped fiber so that residual pump light is reflected by the reflecting mirror so as to be introduced back into the doped fiber so that it may be used for optical amplification again. The technique is disclosed in Japanese Patent Laid-Open Application No. Heisei 3-25985 or Japanese Patent Laid-Open Application No. 3-166782.

However, where residual pump light is reflected by the reflecting mirror in this manner, the pump light is returned not only to the doped fiber but also to the pump source. This pump light may possibly give rise to unstable operation of the pump source such as interference.

By the way, while, due to the appearance of optical amplifiers, attention is drawn to an optical-amplifier-repeated transmission system which includes a plurality of repeating and amplifying optical amplifiers since it plays a very important role in achievement of economization of a communication system in the multimedia society as described above, the transmission system has subjects to be solved in terms of the dispersion compensation, reduction in nonlinear effects (effects having a bad influence on the transmission quality) in an optical fiber serving as a transmission line and economic wide bandwidth wavelength multiplexing transmission.

Generally, an optical fiber serving as a transmission line has a dispersion characteristic and accumulates a dispersion amount in proportion to the length thereof. Usually, however, in an optical fiber transmission system which employs regenerative repeaters, the dispersion amount is reset at the regenerative repeaters. Consequently, the accumulation of the dispersion amount does not make a problem.

However, in an optical-amplifier-repeated transmission system, since a transmitted optical signal is repeated by a kind of analog amplification, the dispersion amount is accumulated. Accordingly, in order to eliminate the accumulation, the signal wavelength used for transmission should be set to a zero dispersion wavelength. This, however, provides the following subjects to be solved:

1-1) Optical fibers have already been laid by a large amount, and unfortunately, those optical fibers have a zero dispersion wavelength at 1.3 $\mu$m while an optical amplifier which is expected to be put into practical use soon can amplify only a signal of the 1.55 $\mu$m band;

1-2) It has been reported recently that, even if optical fibers whose zero dispersion wavelength is 1.55 $\mu$m are laid newly to transmit a signal of 1.55 $\mu$m, nonlinear effects occur actively in the optical fibers. This signifies that, if a signal wavelength equal to a zero dispersion wavelength is used for transmission, then undesirable nonlinear effects occur; and 1-3) Particularly in wavelength multiplexing transmission, since a plurality of different signal wavelengths are involved, the concept that the signal wavelengths are set equal to a zero dispersion wavelength cannot be applied.

Accordingly, it has been proposed recently to intentionally displace the signal wavelength from the zero dispersion wavelength suitably and compensate for the dispersion, for example, at the repeater.

While research of dispersion compensators has been and is being performed actively in recent years in this manner, one of dispersion compensators which is expected to be most likely put into practical use is a dispersion compensating fiber (which may be referred to as "DCF"; here the term DCF is the abbreviation of Dispersion Compensating Fiber). The DCF, however, has the following subjects to be solved:

2-1) Where fibers (transmission lines) laid already are utilized, a dispersion compensating fiber must be interposed as a device at each repeating point in order to perform dispersion compensation collectively at such each repeating point. Therefore, research and development is being directed to reduction in length of dispersion compensating fibers.

2-2) When fibers are to be laid newly, it is a possible idea not to interpose a dispersion compensating fiber as a device but to lay a dispersion compensating fiber as part of a transmission line. For example, a transmission line of 40 km may be formed from a fiber of 20 km and a dispersion compensating fiber of 20 km. However, research and development of such a novel dispersion compensating fiber as just mentioned makes overlapping development with research and development of a dispersion compensating fiber for the application described in paragraph 2-1) above.

In summary, in wavelength multiplexing transmission, a wavelength dispersion must be compensated for, and since the compensation for a wavelength dispersion is expected to be most likely put into practical use where a dispersion compensating fiber is employed, it is prospective to use a dispersion compensating fiber. Further, it is investigated to incorporate a dispersion compensating fiber as a part into an optical amplifier repeater. Generally, however, the mode field diameter of a dispersion compensating fiber (DCF) is set small in order to compensate for a dispersion, and consequently, nonlinear effects are liable to occur and, as the dispersion amount to be compensated for increases, also the loss increases.

Thus, it is a possible method to compensate also for the loss of a dispersion compensating fiber using an optical amplifier. In this instance, the loss must be compensated for so that a transmission optical signal may not be influenced by nonlinear effects which degrade the quality of a signal such as self-phase modulation (SPM) and cross-phase modulation (XPM) occurring in the dispersion compensating fiber. Accordingly, the possible method has a problem in that designing of a level diagram is difficult. Further, while a flat and wide optical amplification bandwidth is required for an optical amplifier for WDM, also a rare earth doped fiber optical amplifier has a wavelength dependency of the gain. Accordingly, there is a subject to be solved in that it is difficult to realize a flat and wide amplification bandwidth.

Meanwhile, a rare earth doped fiber optical amplifier having a high gain sometimes suffers from unnecessary oscillations which are produced when it performs optical amplification. If such unnecessary oscillations are produced, the rare earth doped fiber optical amplifier operates but unstably.

For example, in an erbium-doped-fiber optical amplifier, spontaneous emission light (ASE) of 1.53 to 1.57 $\mu$m in wavelength is generated when optical amplification is performed, and since the ASE is repetitively reflected from reflection points in the erbium-doped-fiber optical amplifier, unnecessary oscillations are liable to be produced. Particularly with an erbium-doped-fiber optical amplifier adjusted for multiple wavelength collection amplification (that is, an erbium-doped-fiber optical amplifier having a high pump rate), since it has a high gain in the proximity of 1.53 $\mu$m, unnecessary oscillations are liable to be produced at this wavelength. When such unnecessary oscillations are produced, the erbium-doped-fiber optical amplifier operates but unstably.

SUMMARY OF THE INVENTION

It is an object of the present invention to provide an optical fiber amplifier wherein stable operation of a pump source (pump light source) is assured and residual pump power which is produced when the average pump ratio is raised is utilized efficiently to improve the conversion efficiency.

It is another object of the present invention to provide an optical fiber amplifier and a dispersion compensating fiber module for an optical fiber amplifier employing a dispersion compensating fiber wherein the loss of the dispersion compensating fiber by Raman amplification can be compensated for making use of the fact that the threshold value of the Raman amplification is low because the mode field diameter of the dispersion compensating fiber is small.

It is a further object of the present invention to provide an optical fiber amplifier wherein, where a silica-type-optical-fiber having a Raman amplification function similarly to a dispersion compensating fiber is employed, the loss of the silica-type-optical-fiber by Raman amplification can be compensated for similarly to the case where a dispersion compensating fiber is used.

It Is a still further object of the present invention to provide an optical fiber amplifier which minimizes unstable operation of a rare earth doped fiber optical amplifier having a high gain or a rare earth doped fiber optical amplifier adjusted for multiple wavelength collective amplification.

In order to attain the objects of the present invention described above, according to an aspect of the present invention, there is provided an optical fiber amplifier including a rare earth doped fiber, which comprises first means for introducing pump light into one end of the rare earth doped fiber by way of a first optical coupler, second means for demultiplexing residual pump light originating from the pump light introduced into the one end of the rare earth doped fiber by the first means and arriving at the other end of the rare earth doped fiber by a second optical coupler and reflecting the demultiplexed residual pump light by reflection means so as to be introduced back into the rare earth doped fiber, and third means for preventing the residual pump light introduced back into the rare earth doped fiber by the second means from being introduced into a pump source, from which the pump light to be introduced into the rare earth doped fiber by the first means is produced, by optical isolation means so as to prevent unstable operation of the pump source.

In the optical fiber amplifier, when pump light is introduced into the one end of the rare earth doped fiber by way of the first optical coupler, residual pump light arrives at the other end of the rare earth doped fiber and is then demultiplexed by the second optical coupler, whereafter it is reflected by the reflection means so that it is introduced back into the rare earth doped fiber. In order to prevent unstable operation of the pump source caused by interference of the residual pump light introduced back into the rare earth doped fiber, the optical isolation means is interposed between the pump source and the first optical coupler. Consequently, the optical fiber amplifier is advantageous in that it makes use of the pump power with a high efficiency while assuring stabilized operation of the pump source.

According to another aspect of the present invention, there is provide an optical fiber amplifier including a rare earth doped fiber, which comprises a pump source, a first optical coupler for introducing pump light from the pump source into one end of the rare earth doped fiber, a second optical coupler for demultiplexing residual pump light originating from the pump light introduced into the one end of the rare earth doped fiber by way of the first optical coupler and arriving at the other end of the rare earth doped fiber, a reflecting mirror for reflecting the residual pump light demultiplexed by the second optical coupler so as to be introduced back into the rare earth doped fiber by way of the second optical coupler, and an optical isolator interposed between the pump source and the first optical coupler for preventing unstable operation of the pump source arising from interference of the residual pump light introduced back into the rare earth doped fiber.

In the optical fiber amplifier, when pump light is introduced into the one end of the rare earth doped fiber by way of the first optical coupler, residual pump light arrives at the other end of the rare earth doped fiber and is demultiplexed by the second optical coupler, whereafter it is reflected by the reflecting mirror so that it is introduced back into the rare earth doped fiber. In order to prevent unstable operation of the pump source caused by interference of the residual pump light introduced back into the rare earth doped fiber, the optical isolator is interposed between the pump source and the first optical coupler. Consequently, the optical fiber amplifier is advantageous in that it makes use of the pump power with a high efficiency while assuring stabilized operation of the pump source.

According to a further aspect of the present invention, there is provided an optical fiber amplifier including a first rare earth doped fiber and a second rare earth doped fiber disposed at front and rear stages, which comprises first means for introducing pump light into one end of one of the first rare earth doped fiber and the second rare earth doped fiber by way of an optical circulator having three or more ports and a first optical coupler, second means for demultiplexing residual pump light originating from the pump light introduced into the one end of the one rare earth doped fiber by the first means and arriving at the other end of the one rare earth doped fiber by a second optical coupler and reflecting the demultiplexed residual pump light by reflection means so as to be introduced back into the one rare earth doped fiber, and third means for causing the residual pump light reflected from the reflection means and introduced back into the one rare earth doped fiber by the second means to follow, after passing the one rare earth doped fiber, a different optical path by the optical circulator and multiplexing the residual pump light in the different optical path with an output of the other one of the first rare earth doped fiber and the second rare earth doped fiber by a third optical coupler.

In the optical fiber amplifier, pump light is first passed through the optical circulator having three or more ports and then introduced into the one end of the rare earth doped fiber at the front stage or the rear stage by the first optical coupler. Then, residual pump light originating from the pump light and arriving at the other end of the rare earth doped fiber is demultiplexed by the second optical coupler and then reflected by the reflection means so that it is introduced back into the rare earth doped fiber. The residual pump light is then introduced, after passing the rare earth doped fiber, into the different optical path by the optical circulator and is multiplexed with an output of the other rare earth doped fiber by the third optical coupler. Consequently, the optical fiber amplifier of the two stage construction just described is advantageous in that it makes use of the pump power with a high efficiency.

According to a still further aspect of the present invention, there is provided an optical fiber amplifier including a first rare earth doped fiber and a second rare earth doped fiber disposed at front and rear stages, which comprises a pump source, a first optical coupler provided at one end of one of the first rare earth doped fiber and the second rare earth doped fiber, a second optical coupler provided at the other end of the one rare earth doped fiber, a third optical coupler provided at one end of the other one of the first rare earth doped fiber and the second rare earth doped fiber, a reflecting mirror for reflecting residual pump light demultiplexed by the second optical coupler so as to be introduced back into the one rare earth doped fiber by way of the second optical coupler, and an optical circulator having three or more ports connected to the pump source, the first optical coupler and the third optical coupler, and wherein pump light from the pump source is introduced into one end of the one rare earth doped fiber by way of the optical circulator and the first optical coupler, and residual pump light originating from the pump light introduced into the one end of the one rare earth doped fiber and arriving at the other end of the one rare earth doped fiber is demultiplexed by the second optical coupler and reflected by the reflecting mirror so as to be introduced back into the one rare earth doped fiber, whereafter the residual pump light is introduced, after passing the one rare earth doped fiber, into a different optical path by the optical circulator so that the residual pump light is thereafter multiplexed with an output of the other rare earth doped fiber by the third optical coupler.

The optical fiber amplifier of the two stage construction just described is advantageous in that it makes use of the pump power with a high efficiency.

According to a yet further aspect of the present invention, there is provided an optical fiber amplifier including a first rare earth doped fiber and a second rare earth doped fiber disposed at front and rear stages, which comprises first means for branching pump power at a ratio of n:1, n being a real number equal to or greater than 1, by an optical branching element, multiplexing the pump light from a port of the optical branching element by a first optical coupler and introducing the multiplexed light into one end of one of the first rare earth doped fiber and the second rare earth doped fiber, second means for extracting residual pump power originating from the pump light introduced into the one end of the one rare earth doped fiber by the first means and arriving at the other end of the one rare earth doped fiber by a second optical coupler connected to the other end of the one rare earth doped fiber, multiplexing the extracted residual pump power by a third optical coupler and introducing the multiplexed power into one end of the other one of the first rare earth doped fiber and the second rare earth doped fiber, and third means for multiplexing the pump power from another port of the optical branching element branched by the optical branching element and introducing the multiplexed power into the other end of the other rare earth doped fiber by a fourth optical coupler.

In the optical fiber amplifier, the pump power is branched at the ratio of n:1, and the pump light from a port of the optical branching element is multiplexed by the first optical coupler and then introduced into the rare earth doped fiber at the front stage or the rear stage. Then, residual pump power is extracted by the second optical coupler connected to the other end of the rare earth doped fiber and is then multiplexed by the third optical coupler. Then, the output light of the third optical coupler is introduced into the one end of the other rare earth doped fiber. Meanwhile, the branched pump power from another port of the optical branching element is introduced into the other end of and multiplexed in the other rare earth doped fiber by the fourth optical coupler. Consequently, the optical fiber amplifier of the two stage construction just described is advantageous in that it makes use of the pump power with a high efficiency.

According to a yet further aspect of the present invention, there is provided an optical fiber amplifier including a first rare earth doped fiber and a second rare earth doped fiber disposed at front and rear stages, which comprises a pump source, an optical branching element for branching pump power from the pump source at a ratio of n:1, n being a real number equal to or greater than 1, a first optical coupler for multiplexing the pump light from a port of the optical branching element and introducing the multiplexed light into one of the first rare earth doped fiber and second rare earth doped fiber, a second optical coupler for extracting residual pump power outputted from the one rare earth doped fiber, a third optical coupler for multiplexing the residual pump power extracted by the second optical coupler and introducing the multiplexed power into the other one of the first rare earth doped fiber and the second rare earth doped fiber, and a fourth optical coupler for multiplexing the pump power from another port of the optical branching element branched by the optical branching element and introducing the multiplexed power into the other rare earth doped fiber.

In the optical fiber amplifier, the pump power is branched at the ratio of n:1, and the pump light from a port of the optical branching element is multiplexed by the first optical coupler and then introduced into the rare earth doped fiber at the front stage or the rear stage. Then, residual pump power is extracted by the second optical coupler connected to the other end of the rare earth doped fiber and is then multiplexed by the third optical coupler. Then, the output light of the third optical coupler is introduced into the one end of the other rare earth doped fiber. Meanwhile, the branched pump power from another port of the optical branching element is introduced into the other end of and multiplexed in the other rare earth doped fiber by the fourth optical coupler. Consequently, the optical fiber amplifier of the two stage construction just described is advantageous in that it makes use of the pump power with a high efficiency.

According to a yet further aspect of the present invention, there is provided an optical fiber amplifier including a rare earth doped fiber, which comprises a pump source, an optical circulator having three or more ports one of which is connected to the pump source, a first optical coupler for multiplexing pump light introduced thereto from the pump source by way of the optical circulator and introducing the multiplexed light into one end of the rare earth doped fiber, a second optical coupler for demultiplexing residual pump light originating from the pump light introduced into the one end of the rare earth doped fiber by the first optical coupler and arriving at the other end of the rare earth doped fiber, a reflecting mirror for reflecting the residual pump light demultiplexed by the second optical coupler so as to be introduced back into the rare earth doped fiber by way of the second optical coupler, a residual pump light detector for detecting the residual pump light introduced back into the rare earth doped fiber by the reflecting mirror and inputted from the one end of the rare earth doped fiber to the optical circulator by way of the first optical coupler, and a controller for controlling the pump source so that the residual pump light detected by the residual pump light detector may be constant.

In the optical fiber amplifier, pump light is first passed through the optical circulator having three or more ports and is then introduced into the one end of the rare earth doped fiber by the first optical coupler. Then, residual pump light originating from the pump light and arriving at the other end of the rare earth doped fiber is demultiplexed by the second optical coupler and then reflected by the reflecting mirror so that it is introduced back into the rare earth doped fiber. The residual pump power comes out from the one end of the rare earth doped fiber and is then inputted by way of the first optical coupler to the optical circulator, by which it is introduced into the different optical path so that it is monitored by the residual pump light detector. Then, the residual pump power is kept constant under the control of the controller. Consequently, the wavelength characteristic of the gain of the optical fiber amplifier can be controlled so that it may not be varied irrespective of any variation of the input level. Consequently, the optical fiber amplifier is advantageous in that it can be realized readily as a multiple wavelength collective amplifier.

According to a yet further aspect of the present invention, there is provided an optical fiber amplifier, which comprises a rare earth doped fiber optical amplification element formed from a rare earth doped fiber, and a Raman optical amplification element which is pumped with pump light to cause Raman amplification to occur, the rare earth doped fiber optical amplification element and the Raman optical amplification element being connected in cascade connection.

The optical fiber amplifier is advantageous in that it makes use of the pump power with a high efficiency while it has a two stage construction.

According to a yet further aspect of the present invention, there is provided an optical fiber amplifier, which comprises a rare earth doped fiber optical amplification element formed from a rare earth doped fiber, a Raman optical amplification element which is pumped with pump light, which is capable of pumping the rare earth doped fiber optical amplification element, to cause Raman amplification to occur, the rare earth doped fiber optical amplification element and the Raman optical amplification element being connected in cascade connection, and a pump source for supplying pump light for pumping the rare earth doped fiber optical amplification element and the Raman optical amplification element.

In the optical fiber amplifier, since it includes the pump source for supplying pump light for pumping the rare earth doped fiber optical amplification element and the Raman optical amplification element, the pump power can be utilized with a high efficiency and the number of pump sources to be used can be reduced, which contributes to simplification in construction and reduction in cost.

According to a yet further aspect of the present invention, there is provided an optical fiber amplifier, which comprises a rare earth doped fiber optical amplification element formed from a rare earth doped fiber, and a Raman optical amplification element formed from a dispersion compensating fiber which is pumped with pump light to cause Raman amplification to occur, the rare earth doped fiber optical amplification element and the Raman optical amplification element being connected in cascade connection at two front and rear stages.

The optical fiber amplifier just described is advantageous in that it makes use of the pump power with a high efficiency while it has a two stage construction.

According to a yet further aspect of the present invention, there is provided an optical fiber amplifier, which comprises a rare earth doped fiber and a dispersion compensating fiber disposed at two front and rear stages, a first pump source for producing pump light of a first wavelength band for the rare earth doped fiber, a first optical coupler for introducing the pump light from the first pump source into the rare earth doped fiber, a second pump source for producing pump light of a second wavelength band for the dispersion compensating fiber, and a second optical coupler for introducing the pump light from the second pump source into the dispersion compensating fiber, the dispersion compensating fiber being pumped with the pump light of the second wavelength band from the second pump source to cause Raman amplification to occur.

With the optical fiber amplifier, compensation for the loss of the dispersion compensating fiber by Raman amplification can be achieved while optical amplification is performed by the rare earth doped fiber.

According to a yet further aspect of the present invention, there is provided an optical fiber amplifier, which comprises an erbium-doped-fiber and a dispersion compensating fiber disposed at two front and rear stages, a pump source for producing pump light, and an optical coupler for introducing the pump light from the pump source into the erbium-doped-fiber, the dispersion compensating fiber being pumped with residual pump light from the erbium-doped-fiber to cause Raman amplification to occur.

With the optical fiber amplifier, compensation for the loss of the dispersion compensating fiber by Raman amplification can be achieved while optical amplification is performed by the erbium-doped-fiber.

According to a yet further aspect of the present invention, there is provided an optical fiber amplifier, which comprises an erbium-doped-fiber and a dispersion compensating fiber disposed at two front and rear stages, a pump source for producing pump light, and an optical coupler for introducing the pump light from the pump source into the dispersion compensating fiber, the erbium-doped-fiber being pumped with residual pump light from the dispersion compensating fiber.

With the optical fiber amplifier, compensation for the loss of the dispersion compensating fiber by Raman amplification can be achieved while optical amplification is performed by the erbium-doped-fiber.

According to a yet further aspect of the present invention, there is provided an optical fiber amplifier, which comprises a dispersion compensating fiber doped with a rare earth element, a pump source for producing pump light for the dispersion compensating fiber, and an optical coupler for introducing the pump light from the pump source into the dispersion compensating fiber.

With the optical fiber amplifier, since the dispersion compensating fiber used is doped with a rare earth element, dispersion compensation can be performed by the dispersion compensating fiber, and the loss of the dispersion compensating fiber can be reduced simultaneously. The optical fiber amplifier with the dispersion compensation function is advantageous also in that it can optically amplify signal light sufficiently.

According to a yet further aspect of the present invention, there is provided an optical fiber amplifier, which comprises an erbium-doped-fiber and a dispersion compensating fiber disposed at two front and rear stages, a pump source for producing pump light for the erbium-doped-fiber, an optical coupler for introducing the pump light from the pump source into the erbium-doped-fiber, and an optical filter interposed between the erbium-doped-fiber and the dispersion compensating fiber for intercepting residual pump light coming out from the erbium-doped-fiber.

With the optical fiber amplifier, leakage pump power Raman amplifies the dispersion compensating fiber. Consequently, the optical fiber amplifier is prevented from unstable operation or from variation of the wavelength dependency of the amplification band thereof.

According to a yet further aspect of the present invention, there is provided an optical fiber amplifier, which comprises a rare earth doped fiber optical amplification element formed from a rare earth doped fiber, and a Raman optical amplification element formed from a silica-type-optical-fiber which causes, when pumped with pump light, Raman amplification to occur, the rare earth doped fiber optical amplification element and the Raman optical amplification element being connected in cascade connection at two front and rear stages.

The optical fiber amplifier just described is advantageous in that it makes use of the pump power with a high efficiency while it has a two stage construction.

According to a yet further aspect of the present invention, there is provided an optical fiber amplifier, which comprises a silica-type-optical-fiber and an erbium-doped-fiber provided at a front stage and a rear stage, respectively, a silica-type-optical-fiber pump source for producing pump light of a wavelength band for the silica-type-optical-fiber, an optical coupler for introducing the pump light from the silica-type-optical-fiber pump source into the silica-type-optical-fiber, an erbium-doped-fiber pump source for producing pump light of a wavelength band for the erbium-doped-fiber, and another optical coupler for introducing the pump light from the erbium-doped-fiber pump source into the erbium-doped-fiber, the silica-type-optical-fiber being pumped with the pump light from the silica-type-optical-fiber pump source to cause Raman amplification to occur.

With the optical fiber amplifier, compensation for the loss of the silica-type-optical-fiber by Raman amplification can be performed while optical amplification by the erbium-doped-fiber is performed.

According to a yet further aspect of the present invention, there is provided an optical fiber amplifier, which comprises an erbium-doped-fiber having a low noise figure and a silica-type-optical-fiber provided at a front stage and a rear stage, respectively, a silica-type-optical-fiber pump source for producing pump light of a wavelength band for the silica-type-optical-fiber, an optical coupler for introducing the pump light from the silica-type-optical-fiber pump source into the silica-type-optical-fiber, an erbium-doped-fiber pump source for producing pump light of a wavelength band for the erbium-doped-fiber, and another optical coupler for introducing the pump light from the erbium-doped-fiber pump source into the erbium-doped-fiber, the silica-type-optical-fiber being pumped with the pump light from the silica-type-optical-fiber pump source to cause Raman amplification to occur.

With the optical fiber amplifier, compensation for the loss of the silica-type-optical-fiber by Raman amplification can be performed while optical amplification by the erbium-doped-fiber is performed.

According to a yet further aspect of the present invention, there is provided an optical fiber amplifier, which comprises a rare earth doped fiber optical amplification element formed from a rare earth doped fiber and having a low noise figure, the rare earth doped fiber optical amplification element being disposed as a front stage amplification element, a Raman optical amplification element for causing Raman amplification to occur when pumped with pump light, the Raman optical amplification section being disposed as a middle stage amplification element, and another rare earth doped fiber optical amplification element formed from a rare earth doped fiber and disposed as a rear stage amplification element.

With the optical fiber amplifier, the compensation effect of the Raman optical amplification element can be increased. Consequently, a wide bandwidth optical amplifier can be realized while achieving simplification in structure and reduction in cost.

According to a yet further aspect of the present invention, there is provided an optical fiber amplifier, which comprises a first erbium-doped-fiber having a low noise figure, a dispersion compensating fiber and a second erbium-doped-fiber provided at a front stage, a middle stage and a rear stage, respectively, a first erbium-doped-fiber pump source for producing pump light of a wavelength band for the first erbium-doped-fiber, an optical coupler for introducing the pump light from the first erbium-doped-fiber pump source into the first erbium-doped-fiber, a dispersion compensating fiber pump source for producing pump light of a wavelength band for the dispersion compensating fiber, another optical coupler for introducing the pump light from the dispersion compensating fiber pump source into the dispersion compensating fiber, a second erbium-doped-fiber pump source for producing pump light of a wavelength band for the second erbium-doped-fiber, and a further optical coupler for introducing the pump light from the second erbium-doped-fiber pump source into the second erbium-doped-fiber, the dispersion compensating fiber being pumped with the pump light from the dispersion compensating fiber pump source to cause Raman amplification to occur.

With the optical fiber amplifier, the compensation effect of the Raman optical amplification element can be increased. Consequently, a wide bandwidth optical amplifier can be realized while achieving simplification in structure and reduction in cost.

According to a yet further aspect of the present invention, there is provided an optical fiber amplifier, which comprises a first erbium-doped-fiber having a low noise figure, a silica-type-optical-fiber and a second erbium-doped-fiber provided at a front stage, a middle stage and a rear stage, respectively, a first erbium-doped-fiber pump source for producing pump light of a wavelength band for the first erbium-doped-fiber, an optical coupler for introducing the pump light from the first erbium-doped-fiber pump source into the first erbium-doped-fiber, a silica-type-optical-fiber pump source for producing pump light of a wavelength band for the silica-type-optical-fiber, another optical coupler for introducing the pump light from the silica-type-optical-fiber pump source into the silica-type-optical-fiber, a second erbium-doped-fiber pump source for producing pump light of a wavelength band for the second erbium-doped-fiber, and a further optical coupler for introducing the pump light from the second erbium-doped-fiber pump source into the second erbium-doped-fiber, the silica-type-optical-fiber being pumped with the pump light from the silica-type-optical-fiber pump source to cause Raman amplification to occur.

With the optical fiber amplifier, the compensation effect of the silica-type-optical-fiber can be increased. Consequently, a wide bandwidth optical amplifier can be realized while achieving simplification in structure and reduction in cost.

According to a yet further aspect of the present invention, there is provided a dispersion compensating fiber module for an optical fiber amplifier, which comprises a dispersion compensating fiber, and a pump source for pumping the dispersion compensating fiber to cause Raman amplification to occur.

Where an optical fiber amplifier is constructed using the module wherein the dispersion compensating fiber is pumped to cause Raman amplification to occur, it exhibits a reduced loss due to reduction of the loss by the dispersion compensating fiber.

According to a yet further aspect of the present invention, there is provided an optical fiber amplifier including a dispersion compensating fiber, which comprises a pump source, and an optical coupler for introducing pump light from the pump source into the dispersion compensating fiber, the dispersion compensating fiber being pumped with pump light from the pump source to cause Raman amplification to occur.

Also the optical fiber amplifier is advantageous in that the loss of the dispersion compensating fiber can be reduced.

According to a yet further aspect of the present invention, there is provided an optical fiber amplifier, which comprises a pump source, and an optical coupler for introducing pump light from the pump source into the silica-type-optical-fiber, the silica-type-optical-fiber being pumped with the pump light from the pump source to cause Raman amplification to occur.

The optical fiber amplifier is advantageous in that the loss of the silica-type-optical-fiber can be reduced.

According to a yet further aspect of the present invention, there is provided an optical fiber amplifier, which comprises a rare earth doped fiber optical amplification element formed from a rare earth doped fiber, and an optical fiber attenuation element formed from an optical fiber or an optical fiber with an optical isolator for suppressing unstable operation of the rare earth doped fiber optical amplification element.

The optical fiber amplifier is advantageous in that stabilized optical amplification can be achieved with unstable operation of the rare earth doped fiber optical amplification element suppressed.

According to a yet further aspect of the present invention, there is provided an optical fiber amplifier, which comprises an optical amplification unit including a front stage optical amplification element and a rear stage optical amplification element each formed as a rare earth doped fiber optical amplification element formed from a rare earth doped fiber, and an optical fiber attenuation element formed from an optical fiber or an optical fiber with an optical isolator interposed between the front stage optical amplification element and the rear stage optical amplification element of the optical amplification unit for suppressing unstable operation of the optical amplification unit.

The optical fiber amplifier is advantageous in that stabilized optical amplification can be achieved with unstable operation of the optical amplification unit suppressed.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS

A. Aspects of the Invention

Several aspects of the present invention will first be described with reference to FIGS. 1 to 9, 10(*a*), 10(*b*), 11, 12, 13(*a*), 13(*b*), 14 and 15.

A1. First Aspect of the Invention

Figure 1:
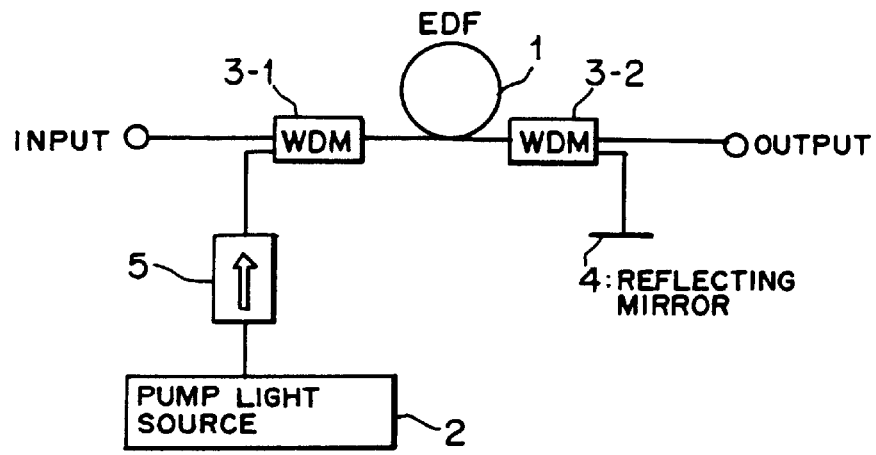
FIGS. 1 to 9, 10(a), 10(b), 11, 12, 13(a), 13(b), 14 and 15 are block diagrams illustrating different aspects of the present invention.

Referring first to FIG. 1, there is shown in block diagram an optical fiber amplifier according to a first aspect of the present invention. The optical fiber amplifier shown includes a rare earth doped fiber 1, and a pump source (pump light source) 2. The optical fiber amplifier further includes a first optical coupler 3-1 for introducing pump light from the pump source 2 into one end of the rare earth doped fiber 1, and a second optical coupler 3-2 for demultiplexing residual pump light originating from the pump light introduced into the one end of the rare earth doped fiber 1 by way of the first optical coupler 3-1 and arriving at the other end of the rare earth doped fiber 1.

The optical fiber amplifier further includes a reflecting mirror 4 for reflecting residual pump light demultiplexed by the second optical coupler 3-2 so as to be introduced back into the rare earth doped fiber 1 by way of the second optical coupler 3-2. The optical fiber amplifier further includes an optical isolator 5 interposed between the pump source 2 and the first optical coupler 3-1 for preventing unstable operation of the pump source 2 arising from interference of the residual pump light introduced back into the rare earth doped fiber 1.

In this instance, the optical fiber amplifier shown in FIG. 1 and including the rare earth doped fiber 1 is constructed such that it includes a first system for introducing pump light into one end of the rare earth doped fiber 1 by way of a first optical coupler 3-1, a second system for demultiplexing residual pump light originating from the pump light introduced into the one end of the rare earth doped fiber 1 by the first system and arriving at the other end of the rare earth doped fiber 1 by a second optical coupler 3-2 and reflecting the demultiplexed residual pump light by a reflection element (reflecting mirror) 4 so as to be introduced back into the rare earth doped fiber 1, and a third system for preventing the residual pump light introduced back into the rare earth doped fiber 1 by the second system from being introduced into a pump source 2, from which the pump light to be introduced into the rare earth doped fiber 1 by the first system is produced, by an optical isolation element (optical isolator) 5 so as to prevent unstable operation of the pump source 2.

The reflection element 4 may be formed as a Faraday rotation reflecting mirror.

The optical fiber amplifier may further include an optical circulator through which input signal light is inputted to the optical fiber amplifier and through which output signal light of the optical fiber amplifier is outputted.

In the optical fiber amplifier having the construction described above with reference to FIG. 1 and including the rare earth doped fiber 1, pump source is introduced by way of the first optical coupler 3-1 into the one end of the rare earth doped fiber 1, and residual pump light originating from the pump light and arriving at the other end of the rare earth doped fiber 1 is demultiplexed by the second optical coupler 3-2. The residual pump light thus demultiplexed is reflected by the reflection element 4 (reflecting mirror 4: a Faraday rotation reflecting mirror can be used for the reflecting mirror 4) so that it is introduced back into the rare earth doped fiber 1.

If the residual pump light introduced back into the rare earth doped fiber 1 is admitted, after passing the rare earth doped fiber 1, into the pump source 2 for producing pump light to be introduced into the rare earth doped fiber 1, then the pump source 2 operates but unstably. The optical isolation element 5 (optical isolator 5) intercepts the residual pump light to prevent such unstable operation of the pump source 2.

Where the optical fiber amplifier includes the optical circulator, input signal light is inputted to the optical fiber amplifier and output signal light of the optical fiber amplifier is outputted both through the optical circulator.

Thus, with the optical fiber amplifier of the first aspect of the present invention, since the optical isolator 5 is interposed between the pump source 2 and the first optical coupler 3-1 in order to prevent unstable operation of the pump source 2 arising from interference of the residual pump light introduced back into the rare earth doped fiber 1 when the pump light is reflected by the reflecting mirror 4 so as to go back through the rare earth doped fiber 1, there is an advantage in that the optical fiber amplifier can make use of the pump power with a high efficiency while assuring stable operation of the pump source 2.

A2. Second Aspect of the Invention

Figure 2:
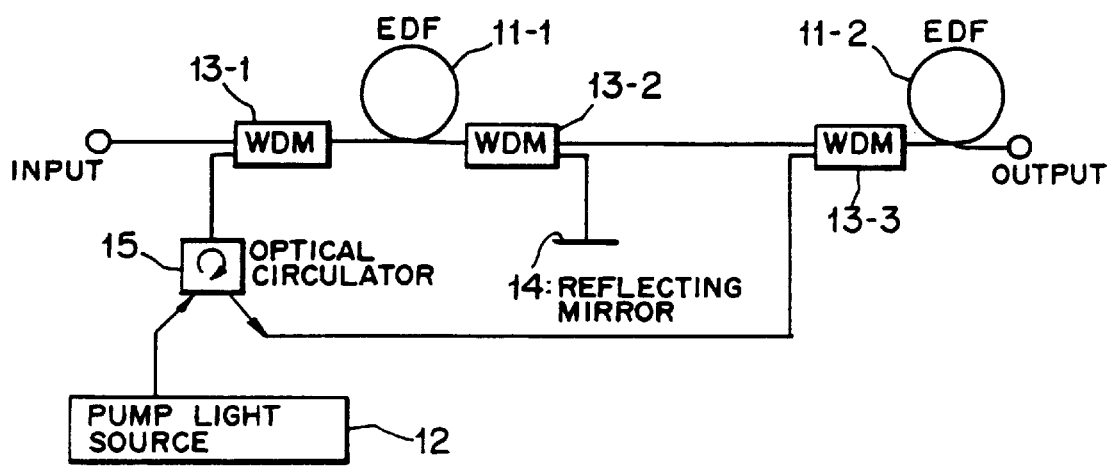

Referring now to FIG. 2, there is shown in block diagram an optical fiber amplifier according to a second aspect of the present invention. The optical fiber amplifier shown includes a first rare earth doped fiber 11-1 and a second rare earth doped fiber 11-2 disposed at front and rear stages.

The optical fiber amplifier further includes a pump source 12, a first optical coupler 13-1 provided at one end of one of the first rare earth doped fiber 11-1 and the second rare earth doped fiber 11-2, that is, at one end of the rare earth doped fiber 11-1.

The optical fiber amplifier further includes a second optical coupler 13-2 provided at the other end of the one rare earth doped fiber 11-1, and a third optical coupler 13-3 provided at one end of the other one of the first rare earth doped fiber 11-1 and the second rare earth doped fiber 11-2, that is, at one end of the rare earth doped fiber 11-2.

The optical fiber amplifier further includes a reflecting mirror 14 for reflecting residual pump light demultiplexed by the second optical coupler 13-2 so as to be introduced back into the one rare earth doped fiber 11-1 by way of the second optical coupler 13-2.

The optical fiber amplifier further includes an optical circulator 15 having three or more ports connected to the pump source 12, the first optical coupler 13-1 and the third optical coupler 13-3.

In this instance, pump light from the pump source 12 is introduced into one end of the one rare earth doped fiber 11-1 by way of the optical circulator 15 and the first optical coupler 13-1, and residual pump light originating from the pump light introduced into the one end of the one rare earth doped fiber 11-1 and arriving at the other end of the one rare earth doped fiber 11-1 is demultiplexed by the second optical coupler 13-2 and reflected by the reflecting mirror 14 so as to be introduced back into the one rare earth doped fiber 11-1. Thereafter, the residual pump light is introduced, after passing the one rare earth doped fiber 11-1, into a different optical path by the optical circulator 15 so that the residual pump light is thereafter multiplexed with an output of the other rare earth doped fiber 11-2 by the third optical coupler 13-3.

In this instance, the optical fiber amplifier shown in FIG. 2 and including the first rare earth doped fiber 11-1 and the second rare earth doped fiber 11-2 disposed at front and rear stages is constructed such that it includes a first system for introducing pump light into the one end of the one rare earth doped fiber 11-1 by way of the optical circulator 15 having three or more ports and the first optical coupler 13-1, a second system for demultiplexing residual pump light originating from the pump light introduced into the one end of the one rare earth doped fiber 11-1 by the first system and arriving at the other end of the one rare earth doped fiber 11-1 by the second optical coupler 13-2 and reflecting the demultiplexed residual pump light by the reflection element 14 so as to be introduced back into the one rare earth doped fiber 11-1, and a third system for causing the residual pump light reflected from the reflection element 14 and introduced back into the one rare earth doped fiber 11-1 by the second system to follow, after passing the one rare earth doped fiber 11-1, the different optical path by the optical circulator 15 and multiplexing the residual pump light in the different optical path with the output of the other rare earth doped fiber 11-2 by the third optical coupler 13-3.

The optical fiber amplifier may further include an isolator provided at an input port of the optical fiber amplifier to which input signal light is inputted, another isolator provided between an output of the second optical coupler 13-2 and an input of the third optical coupler 13-3, and a further isolator provided at an output port of the optical fiber amplifier from which output signal light is outputted (it is to be noted that, where a pair of rare earth doped fibers are disposed at two front and rear stages, it is very effective to additionally provide an isolator for both of the front and rear stages).

Also in this instance, the reflecting mirror 14 may be formed as a Faraday rotation reflecting mirror.

The optical fiber amplifier may further include an optical circulator through which input signal light is inputted to the optical fiber amplifier and through which output signal light of the optical fiber amplifier is outputted.

In the optical fiber amplifier having the construction described above with reference to FIG. 2 and including the first rare earth doped fiber 11-1 and the second rare earth doped fiber 11-2 disposed at front and rear stages, pump light is introduced into the one end of the one rare earth doped fiber 11-1 by way of the optical circulator 15 and the first optical coupler 13-1 having three or more ports, and residual pump light originating from the pump light introduced into the one end of the one rare earth doped fiber 11-1 and arriving at the other end of the one rare earth doped fiber 11-1 is demultiplexed by the second optical coupler 13-2 and reflected by the reflecting element 14 (reflecting mirror 14: a Faraday rotation reflecting mirror can be used for the reflecting mirror 14) so as to be introduced back into the one rare earth doped fiber 11-1.

Thereafter, the residual pump light is introduced, after passing the one rare earth doped fiber 11-1, into the different optical path by the optical circulator 15 so that the residual pump light is thereafter multiplexed with the output of the other rare earth doped fiber 11-2 by the third optical coupler 13-3.

Where the optical fiber amplifier includes the additional isolators, input signal light is inputted by way of one of the isolators, and the input signal light from the second optical coupler 13-2 is inputted to the third optical coupler 13-3 by way of another one of the isolators whereas output signal light is outputted by way of the remaining isolator.

Where the optical fiber amplifier includes the optical circulator, input signal light is inputted to the optical fiber amplifier and output signal light of the optical fiber amplifier is outputted both through the optical circulator.

Thus, with the optical fiber amplifier of the second aspect of the present invention, since the optical amplifier including the first rare earth doped fiber 11-1 and the second rare earth doped fiber 11-2 disposed at front and rear stages is constructed such that pump light is reflected by the reflecting mirror 14 so that it goes back through the rare earth doped fiber 11-1 at the front stage and then is caused to follow, after passing the rare earth doped fiber 11-1, the different optical path by the optical circulator 15 so that it is multiplexed with the output of the other rare earth doped fiber 11-2 at the rear stage by the third optical coupler 13-3, there is an advantage in that the optical fiber amplifier of the two stage construction makes use of the pump power with a high efficiency.

A3. Third Aspect of the Invention

Figure 3:
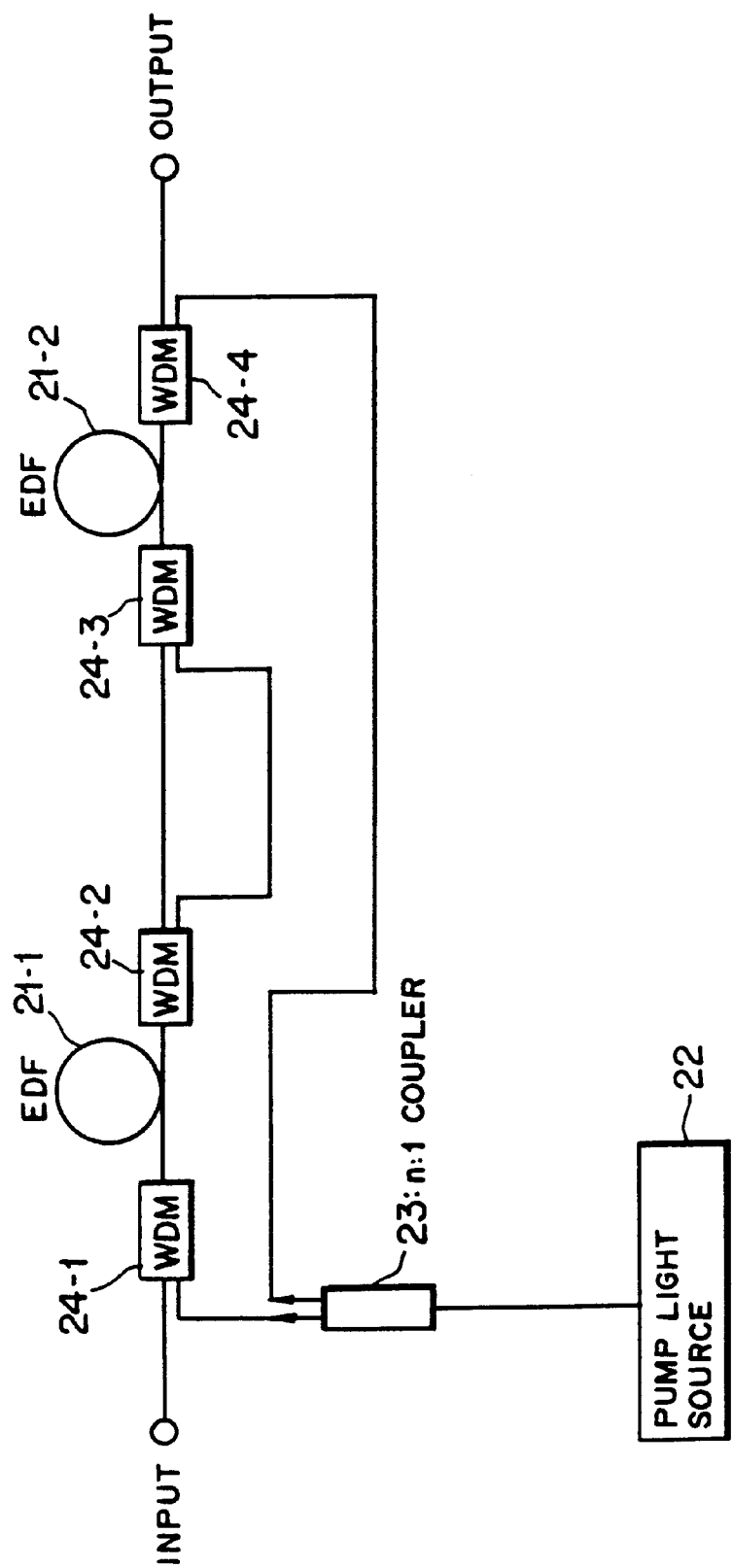

Referring now to FIG. 3, there is shown in block diagram an optical fiber amplifier according to a third aspect of the present invention. The optical fiber amplifier shown includes a first rare earth doped fiber 21-1 and a second rare earth doped fiber 21-2 disposed at front and rear stages.

The optical fiber amplifier further includes a pump source 22, and an optical branching element 23 for branching pump power from the pump source 22 at a ratio of n:1 (n is a real number equal to or greater than 1).

The optical fiber amplifier further includes a first optical coupler 24-1 for multiplexing pump light from a port of the optical branching element 23 and introducing the multiplexed light into one of the first rare earth doped fiber 21-1 and second rare earth doped fiber 21-2, that is, into the rear earth doped fiber 21-1.

The optical fiber amplifier further includes a second optical coupler 24-2 for extracting residual pump power outputted from the one rare earth doped fiber 21-1.

The optical fiber amplifier further includes a third optical coupler 24-3 for multiplexing residual pump power extracted by the second optical coupler 24-2 and introducing the multiplexed power into the other one of the first rare earth doped fiber 21-1 and the second rare earth doped fiber 21-2, that is, into the rare earth doped fiber 21-2.

The optical fiber amplifier further includes a fourth optical coupler 24-4 for multiplexing pump power from another port of the optical branching element 23 branched by the optical branching element 23 and introducing the multiplexed power into the other rare earth doped fiber 21-2.

In this instance, the optical fiber amplifier shown in FIG. 3 and including the first rare earth doped fiber 21-1 and the second rare earth doped fiber 21-2 disposed at front and rear stages is constructed such that it includes a first system for branching pump power at a ratio of n:1 (n is a real number equal to or greater than 1) by an optical branching element 23, multiplexing the pump light from a port of the optical branching element 23 by a first optical coupler 24-1 and introducing the multiplexed light into one end of the first rare earth doped fiber 21-1, a second system for extracting residual pump power originating from the pump light introduced into the one end of the one rare earth doped fiber by the first system and arriving at the other end of the one rare earth doped fiber by a second optical coupler 24-2 connected to the other end of the one rare earth doped fiber, multiplexing the extracted residual pump power by a third optical coupler 24-3 and introducing the multiplexed power into one end of the other one of the first rare earth doped fiber 21-1 and the second rare earth doped fiber 21-2, and a third system for multiplexing the pump power from another port of the optical branching element 23 branched by the optical branching element 23 and introducing the multiplexed power into the other end of the other rare earth doped fiber 21-2 by a fourth optical coupler 24-4.

The optical fiber amplifier may further include an isolator provided at an input port of the optical fiber amplifier to which input signal light is inputted, another isolator provided between the pump source 22 and the optical branching element 23, a further isolator provided between the second optical coupler 24-2 and a signal port of the third optical coupler 24-3, and a still further isolator provided at an output port of the optical fiber amplifier from which output signal light is outputted.

Also here, the optical fiber amplifier may further include an optical circulator through which input signal light is inputted to the optical fiber amplifier and through which output signal light of the optical fiber amplifier is outputted.

In the optical fiber amplifier having the construction described above with reference to FIG. 3 and including the first rare earth doped fiber 21-1 and the second rare earth doped fiber 21-2 disposed at front and rear stages, pump power is branched at the ratio of n:1 (n is a real number equal to or greater than 1) by the optical branching element 23, and the pump light from a port of the optical branching element 23 is multiplexed by the first optical coupler 24-1 and introduced into the one end of the one rare earth doped fiber 21-1.

Then, residual pump power originating from the pump light introduced into the one end of the one rare earth doped fiber 21-1 and arriving at the other end of the one rare earth doped fiber 21-1 is extracted by the second optical coupler 24-2 connected to the other end of the one rare earth doped fiber 21-1 and multiplexed by the third optical coupler 24-3. Then, the thus multiplexed power is introduced into the one end of the other one rare earth doped fiber 21-2.

Further, the pump power from another port of the optical branching element 23 branched by the optical branching element 23 is multiplexed and introduced into the other end of the other rare earth doped fiber 21-2 by the fourth optical coupler 24-4.

Where the optical fiber amplifier includes the additional isolators, input signal light is inputted by way of one of the isolators whereas pump light is inputted to the optical branching element 23 through another one of the isolators, and input signal light from the second optical coupler 24-2 is inputted to the third optical coupler 24-3 by way of a further one of the isolators whereas output light signal is outputted through the remaining one of the isolators.

Also in this instance, where the optical fiber amplifier includes the optical circulator, input signal light is inputted to the optical fiber amplifier and output signal light of the optical fiber amplifier is outputted both through the optical circulator.

Thus, with the optical fiber amplifier of the third aspect of the present invention, since the optical amplifier of the two stage construction is constructed such that pump power is branched at the ratio of n:1 and the pump light from a port of the optical branching element 23 is multiplexed by the first optical coupler 24-1 and then introduced into the one end of the rare earth doped fiber 21-1 at the front stage or the rare earth doped fiber 21-2 at the rear stage while residual pump power is extracted by the second optical coupler 24-2 connected to the other end of the rare earth doped fiber, whereafter the residual pump power is multiplexed by the third optical coupler 24-3 and introduced into the one end of the other rare earth doped fiber while the pump power from another port of the optical branching element 23 branched by the optical branching element 23 is multiplexed and introduced into the other end of the other rare earth doped fiber by the fourth optical coupler 24-4, there is an advantage in that the optical fiber amplifier of the two stage construction makes use of the pump power with a high efficiency.

A4. Fourth Aspect of the Invention

Figure 4:
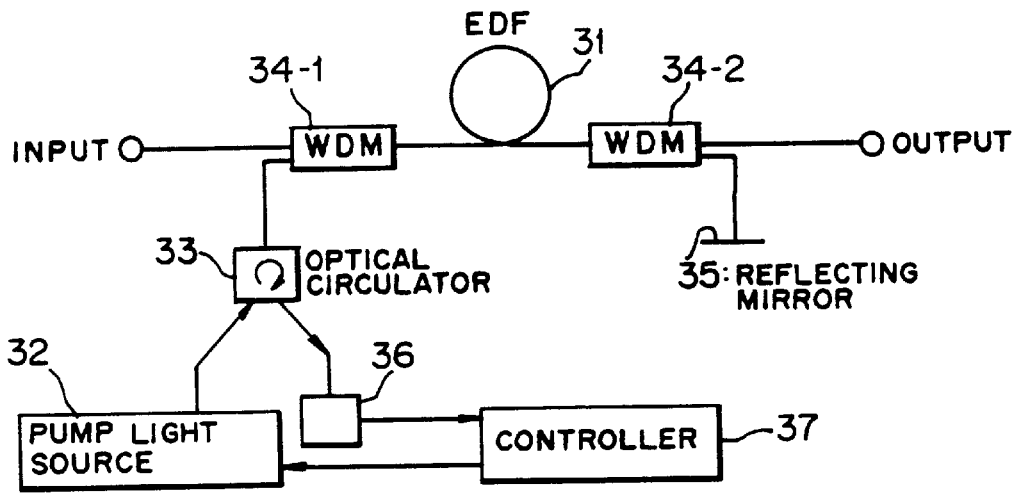

Referring now to FIG. 4, there is shown in block diagram an optical fiber amplifier according to a fourth aspect of the present invention. The optical fiber amplifier shown includes a rare earth doped fiber 31, a pump source 32, and an optical circulator 33 having three or more ports one of which is connected to the pump source 32.

The optical fiber amplifier further includes a first optical coupler 34-1 for multiplexing pump light introduced thereto from the pump source 32 by way of the optical circulator 33 and introducing the multiplexed light into one end of the rare earth doped fiber 31.

The optical fiber amplifier further includes a second optical coupler 34-2 for demultiplexing residual pump light originating from pump light introduced into the one end of the rare earth doped fiber 31 by the first optical coupler 34-1 and arriving at the other end of the rare earth doped fiber 31.

The optical fiber amplifier further includes a reflecting mirror 35 for reflecting the residual pump light demultiplexed by the second optical coupler 34-2 so as to be introduced back into the rare earth doped fiber 31 by way of the second optical coupler 34-2.

The optical fiber amplifier further includes a residual pump light detector 36 for detecting residual pump light introduced back into the rare earth doped fiber 31 by the reflecting mirror 35 and inputted from the one end of the rare earth doped fiber 31 to the optical circulator 33 by way of the first optical coupler 34-1.

The optical fiber amplifier further includes a controller 37 for controlling the pump source 32 so that residual pump light detected by the residual pump light detector 36 may be constant.

Also in this instance, a Faraday rotation reflecting mirror can be used for the reflecting mirror 35.

Further, the optical fiber amplifier may further include an optical circulator through which input signal light is inputted to the optical fiber amplifier and through which output signal light of the optical fiber amplifier is outputted or may further include an isolator provided at an input port of the optical fiber amplifier to which input signal light is inputted and another isolator provided at an output port of the optical fiber amplifier from which output signal light is outputted.

In the optical fiber amplifier having the construction described above with reference to FIG. 4 and including the rare earth doped fiber 31, pump light is introduced into the one end of the rare earth doped fiber 31 by way of the optical circulator 33 having three or more ports and the first optical coupler 34-1, and residual pump light originating from pump light and arriving at the other end of the rare earth doped fiber 31 is demultiplexed by the second optical coupler 34-2. Then, the residual pump light is reflected by the reflecting mirror 35 (a Faraday rotation reflecting mirror can be used for the reflecting mirror 35) so that it is introduced back into the rare earth doped fiber 31. The residual pump light is thereafter introduced, after passing the rare earth doped fiber 31, into a different optical path so that it is introduced into the residual pump light detector 36. Thus, the pump source 32 is controlled by the controller 37 so that the residual pump light detected by the residual pump light detector 36 may be constant.

Where the optical fiber amplifier includes the additional optical circulator, input signal light is inputted to the optical fiber amplifier and output signal light of the optical fiber amplifier is outputted both through the optical circulator. On the other hand, where the optical fiber amplifier includes the additional isolators, input signal light is inputted through one of the isolators whereas output signal light is outputted through the other isolator.

Thus, with the optical fiber amplifier of the fourth aspect of the present invention, since residual pump power is extracted from the different optical path to which it is introduced by the optical circulator 33 and is then monitored and controlled so as to be constant, the optical fiber amplifier is advantageous in that the wavelength characteristic of the gain can be prevented from variation irrespective of a variation of the input level and this contributes very much to realization of a multiple wavelength collective amplifier.

A5. Fifth Aspect of the Invention

Figure 5:
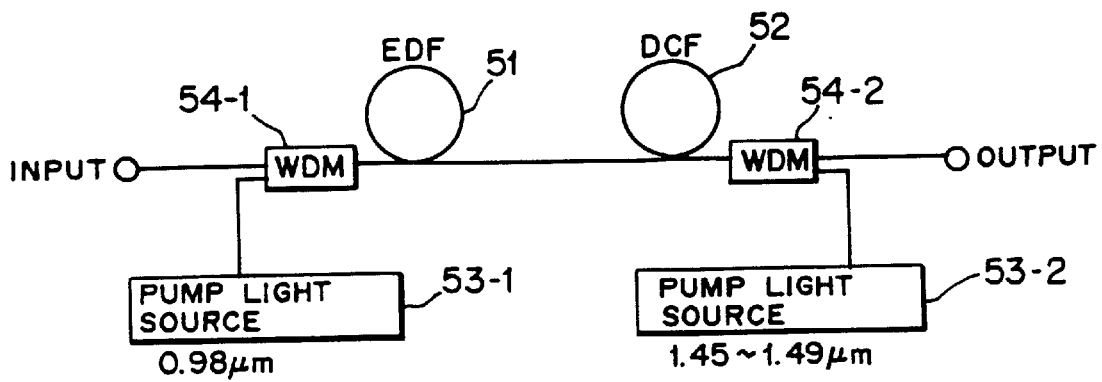

Referring now to FIG. 5, there is shown in block diagram an optical fiber amplifier according to a fifth aspect of the present invention. The optical fiber amplifier shown includes a rare earth doped fiber 51 and a dispersion compensating fiber 52 disposed at two front and rear stages.

The optical fiber amplifier further includes a first pump source 53-1 for producing pump light of a first wavelength band for the rare earth doped fiber 51, and a first optical coupler 54-1 for introducing the pump light from the first pump source 53-1 into the rare earth doped fiber 51.

The optical fiber amplifier further includes a second pump source 53-2 for producing pump light of a second wavelength band for the dispersion compensating fiber 52, and a second optical coupler 54-2 for introducing the pump light from the second pump source 53-2 into the dispersion compensating fiber 52.

The dispersion compensating fiber 52 is pumped with pump light of the second wavelength band from the second pump source 53-2 to cause Raman amplification to occur.

In the optical fiber amplifier, a rare earth doped fiber optical amplification element formed from the rare earth doped fiber 51 and a Raman optical amplification element formed from the dispersion compensating fiber 52 which is pumped with pump light to cause Raman amplification to occur are connected in cascade connection at two front and rear stages.

Preferably, the wavelength band of the pump light produced by the first pump source 53-1 is a 0.98 $\mu$m band while the wavelength band of the pump light produced by the second pump source 53-2 is a 1.47 $\mu$m band (1.45 to 1.49 $\mu$m: in the following description, unless otherwise specified, the terminology "1.47 $\mu$m band" signifies a band from 1.45 to 1.49 $\mu$m).

The Raman optical amplification element may be disposed as a front stage amplification element while the rare earth doped fiber optical amplification element is disposed as a rear stage amplification element. Or, where the rare earth doped fiber optical amplification element is formed as an optical amplification element having a low noise figure, the rare earth doped fiber optical amplification element may be disposed as a front stage amplification element while the Raman optical amplification element is disposed as a rear stage amplification element.

The second pump source 53-2 may include a pair of pump sources and a polarizing multiplexer for orthogonally polarizing and multiplexing pump light from the pump sources or may include a combination of a pump source and a depolarizer by which pump light is depolarized or else may produce modulated pump light.

In the optical fiber amplifier having the construction described above with reference to FIG. 5, pump light (whose wavelength band is, for example, 0.98 $\mu$m) from the first pump source 53-1 is introduced into the rare earth doped fiber 51 by way of the first optical coupler 54-1 while pump light (whose wavelength band is, for example, 1.47 $\mu$m) from the second pump source 53-2 is introduced into the dispersion compensating fiber 52 by way of the second optical coupler 54-2. Consequently, the dispersion compensating fiber 52 can be pumped with the pump light of the second wavelength band from the second pump source 53-2 to cause Raman amplification to occur.

Where the second pump source 53-2 includes the pair of pump sources and the polarizing multiplexer, it supplies pump light obtained by orthogonal polarization and multiplexing of the pump light from the pump sources. Meanwhile, where the second pump source 53-2 includes the combination of the pump source and the depolarizer, it supplies depolarized pump light. On the other hand, where the second pump source 53-2 produces modulated pump light, it supplies the modulated pump light.

Thus, with the optical fiber amplifier of the fifth aspect of the present invention, since a rare earth doped fiber optical amplification element formed from the rare earth doped fiber 51 and a Raman optical amplification element formed from the dispersion compensating fiber 52 which is pumped with pump light to cause Raman amplification to occur are connected in cascade connection, there is an advantage in that the optical fiber amplifier of the two stage construction makes use of the pump power with a high efficiency.

A6. Sixth Aspect of the Invention

Figure 6:
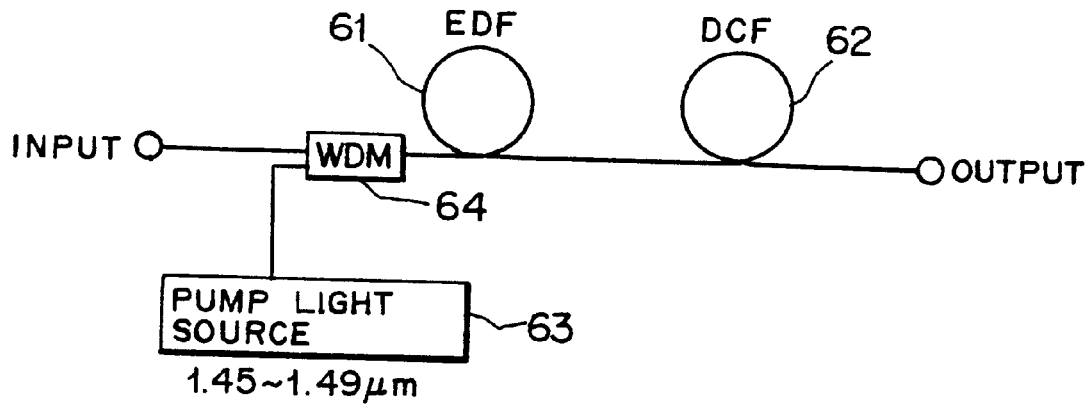

Referring now to FIG. 6, there is shown in block diagram an optical fiber amplifier according to a sixth aspect of the present invention. The optical fiber amplifier shown includes an erbium-doped-fiber 61 and a dispersion compensating fiber 62 disposed at two front and rear stages.

The optical fiber amplifier further includes a pump source 63 for producing pump light of the 1.47 $\mu$m band, and an optical coupler 64 for introducing the pump light from the pump source 63 into the erbium-doped-fiber 61.

Here, the dispersion compensating fiber 62 is pumped with residual pump light from the erbium-doped-fiber 61 to cause Raman amplification to occur.

In the optical fiber amplifier, a rare earth doped fiber optical amplification element formed from the erbium-doped-fiber 61 which is a rare earth doped fiber and a Raman optical amplification element (which is formed from the dispersion compensating fiber 62) which is pumped with pump light, which is capable of pumping the rare earth doped fiber optical amplification element, to cause Raman amplification to occur are connected in cascade connection, and the pump source 63 for supplying pump light for pumping the rare earth doped fiber optical amplification element and the Raman optical amplification element is provided.

The pump source 63 may include a pair of pump sources and a polarizing multiplexer for orthogonally polarizing and multiplexing pump light from the pump sources or may include a combination of a pump source and a depolarizer by which pump light is depolarized or else may produce modulated pump light.

In the optical fiber amplifier having the construction described above with reference to FIG. 6, the erbium-doped-fiber 61 is pumped with pump light of the 1.47 $\mu$m band whereas the dispersion compensating fiber 62 is pumped with residual pump light from the erbium-doped-fiber 61 to cause Raman amplification to occur.

Where the pump source 63 includes the pair of pump sources and the polarizing multiplexer, it supplies pump light obtained by orthogonal polarization and multiplexing of the pump light from the pump sources. Meanwhile, where the pump source 63 includes the combination of the pump source and the depolarizer, it supplies depolarized pump light. On the other hand, where the pump source 63 produces modulated pump light, it supplies the modulated pump light.

Thus, with the optical fiber amplifier of the sixth aspect of the present invention, since the common pump source for supplying pump light for pumping the rare earth doped fiber optical amplification element and the Raman optical amplification element is provided, the optical fiber amplifier can make use of the pump power with a high efficiency, and the number of pump sources to be used can be reduced, which contributes to simplification in construction and reduction in cost.

A7. Seventh Aspect of the Invention

Figure 7:
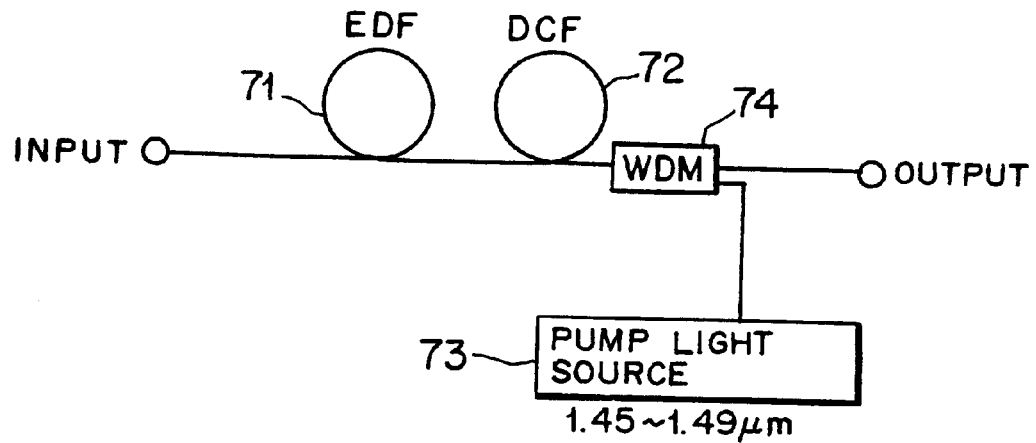

Referring now to FIG. 7, there is shown in block diagram an optical fiber amplifier according to a seventh aspect of the present invention. The optical fiber amplifier shown includes an erbium-doped-fiber 71 and a dispersion compensating fiber 72 disposed at two front and rear stages.

The optical fiber amplifier further includes a pump source 73 for producing pump light of the 1.47 $\mu$m band, and an optical coupler 74 for introducing the pump light from the pump source 73 into the dispersion compensating fiber 72.

In this instance, the erbium-doped-fiber 71 is pumped with residual pump light from the dispersion compensating fiber 72.

In the optical fiber amplifier having the construction described above with reference to FIG. 7, the dispersion compensating fiber 72 is caused to perform Raman amplification using pump light of the 1.47 $\mu$m band whereas the erbium-doped-fiber 71 is pumped with residual pump light from the dispersion compensating fiber 72.

Thus, with the optical fiber amplifier of the seventh aspect of the present invention, since the common pump source for supplying pump light for pumping the erbium-doped-fiber 71 and the dispersion compensating fiber 72 is provided, the optical fiber amplifier can make use of the pump power with a high efficiency, and the number of pump sources to be used can be reduced, which contributes to simplification in construction and reduction in cost.

A8. Eighth Aspect of the Invention

Figure 8:
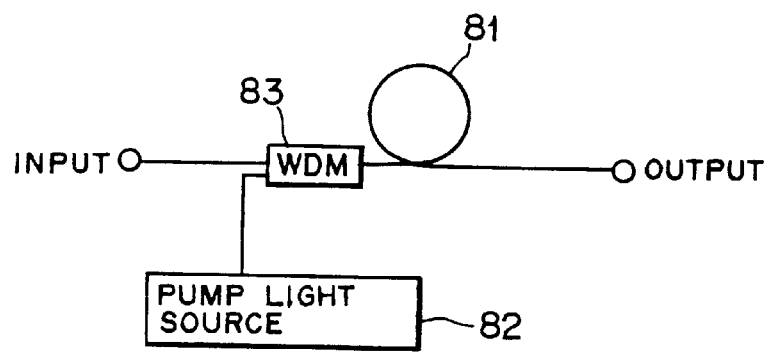

Referring now to FIG. 8, there is shown in block diagram an optical fiber amplifier according to an eighth aspect of the present invention. The optical fiber amplifier shown includes a dispersion compensating fiber (rare earth doped dispersion compensating fiber) 81 doped with a rare earth element, a pump source 82 for producing pump light for the rare earth doped dispersion compensating fiber 81, and an optical coupler 83 for introducing the pump light from the pump source 82 into the rare earth doped dispersion compensating fiber 81.

In the optical fiber amplifier having the construction described above with reference to FIG. 8, pump light from the pump source 82 is introduced into the the rare earth doped dispersion compensating fiber 81 doped with a rare earth element to pump the rare earth doped dispersion compensating fiber 81.

Thus, with the optical fiber amplifier of the eighth aspect of the present invention, since the dispersion compensating fiber is doped with a rare earth element, the loss of the dispersion compensating fiber is reduced while dispersion compensation is performed. Further, the optical fiber amplifier with a dispersion compensating function can optically amplify signal light sufficiently.

A9. Ninth Aspect of the Invention

Figure 9:
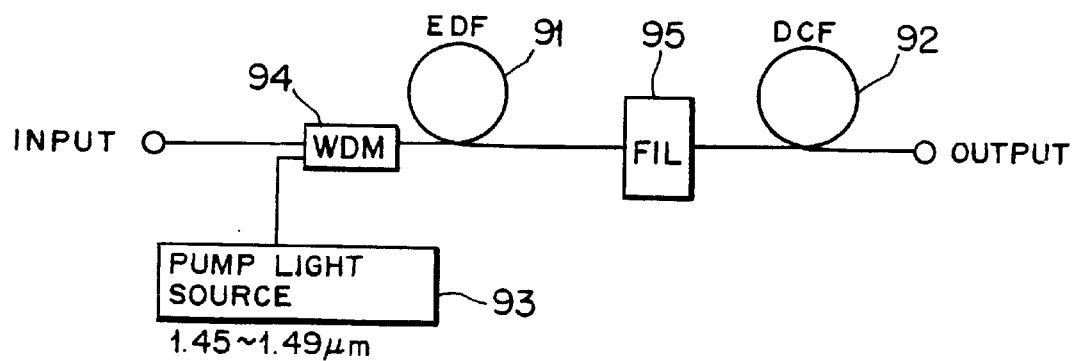

Referring now to FIG. 9, there is shown in block diagram an optical fiber amplifier according to a ninth aspect of the present invention. The optical fiber amplifier shown includes an erbium-doped-fiber 91 and a dispersion compensating fiber 92 disposed at two front and rear stages.

The optical fiber amplifier further includes a pump source 93 for producing pump light of the 1.47 $\mu$m band for the erbium-doped-fiber 91, and an optical coupler 94 for introducing the pump light from the pump source 93 into the erbium-doped-fiber 91.

The optical fiber amplifier further includes an optical filter 95 interposed between the erbium-doped-fiber 91 and the dispersion compensating fiber 92 for intercepting residual pump light of the 1.47 $\mu$m band coming out from the erbium-doped-fiber 91.

In the optical fiber amplifier having the construction described above with reference to FIG. 9, the erbium-doped-fiber 91 is pumped with pump light of the 1.47 $\mu$m band from the pump source 93. In this instance, residual pump light of the 1.47 μm band coming out from the erbium-doped-fiber 91 is intercepted by the optical filter 95 so that it is prevented from being inputted to the dispersion compensating fiber 92.

Thus, with the optical fiber amplifier of the ninth aspect of the present invention, since the optical filter 95 which prevents pump light of the 1.47 μm band from being inputted to the dispersion compensating fiber 92 is provided, leaking pump power of the 1.47 μm band causes the dispersion compensating fiber 92 to perform Raman amplification, and consequently, the optical fiber amplifier can be prevented from unstable operation or from variation of the wavelength dependency of the amplification band.

A10. Tenth Aspect of the Invention

Figure 10A:
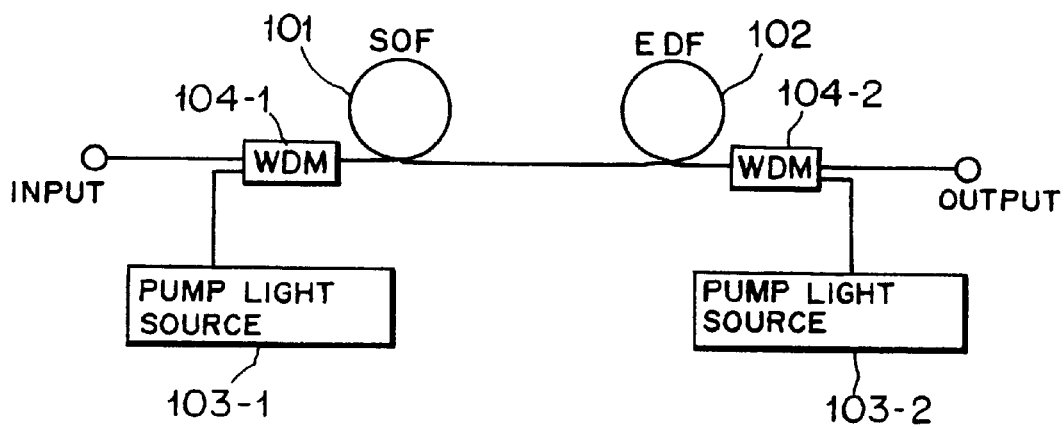

Referring now to FIG. 10(a), there is shown in block diagram an optical fiber amplifier according to a tenth aspect of the present invention. The optical fiber amplifier shown includes a silica-type-optical-fiber (SOF) 101 and an erbium-doped-fiber (EDF) 102. In the optical fiber amplifier shown in FIG. 10(a), the silica-type-optical-fiber 101 and the erbium-doped-fiber 102 are provided at a front stage and a rear stage, respectively.

The optical fiber amplifier further includes a silica-type-optical-fiber pump source 103-1 for producing pump light of a wavelength band for the silica-type-optical-fiber 101, and an optical coupler 104-1 for introducing the pump light from the silica-type-optical-fiber pump source 103-1 into the silica-type-optical-fiber 101.

The optical fiber amplifier further includes an erbium-doped-fiber pump source 103-2 for producing pump light of a wavelength band for the erbium-doped-fiber 102, and another optical coupler 104-2 for introducing the pump light from the erbium-doped-fiber pump source 103-2 into the erbium-doped-fiber 102;

In this instance, the silica-type-optical-fiber 101 is pumped with the pump light from the silica-type-optical-fiber pump source 103-1 to cause Raman amplification to occur.

In particular, in the optical fiber amplifier shown in FIG. 10(a), a rare earth doped fiber optical amplification element formed from the erbium-doped-fiber 102 which is a rare earth doped fiber and a Raman optical amplification element formed from the silica-type-optical-fiber 101 which causes, when pumped with pump light, Raman amplification to occur are connected in cascade connection at two front and rear stages. Further, the Raman optical amplification element is disposed as a front stage amplification element while the rare earth doped fiber optical amplification element is disposed as a rear stage amplification element.

Where the rare earth doped fiber optical amplification element is formed as an optical amplification element having a low noise figure, the rare earth doped fiber optical amplification element may be disposed as a front stage amplification element while the Raman optical amplification element is disposed as a rear stage amplification element.

Further, the optical fiber amplifier may additionally include a pump source which produces pump light and serves both as the silica-type-optical-fiber pump source 103-1 and the erbium-doped-fiber pump source 103-2.

In the optical fiber amplifier having the construction described above with reference to FIG. 10(a), pump light from the silica-type-optical-fiber pump source 103-1 is introduced into the silica-type-optical-fiber 101 by way of the optical coupler 104-1 while pump light from the erbium-doped-fiber pump source 103-2 is introduced into the erbium-doped-fiber 102 by way of the optical coupler 104-2. Consequently, the silica-type-optical-fiber 101 can be pumped with the pump light of the wavelength band therefor from the silica-type-optical-fiber pump source 103-1 to cause Raman amplification to occur.

Thus, with the optical fiber amplifier of the tenth aspect of the present invention, since the optical fiber amplifier includes the Raman optical amplification element formed from the silica-type-optical-fiber 101 and causes, when pumped with pump light, Raman amplification to occur and the rare earth doped fiber optical amplification element formed from the erbium-doped-fiber 102 are connected in cascade connection, there is an advantage in that the optical fiber amplifier of the two stage construction makes use of the pump power with a high efficiency.

Further, where the rare earth doped fiber optical amplification element is formed as an optical amplification element having a low noise figure and is disposed as a front stage amplification element while the Raman optical amplification element is disposed as a rear stage amplification element, there is an advantage in that the optical fiber amplifier of the two stage construction makes use of the pump power with a high efficiency.

Furthermore, where the optical fiber amplifier additionally includes the pump source which produces pump light for pumping both of the Raman optical amplification element and the rare earth doped fiber optical amplification element is provided, the optical fiber amplifier can make use of the pump power with a high efficiency, and the number of pump sources to be used can be reduced, which contributes to simplification in construction and reduction in cost.

A11. Eleventh Aspect of the Invention

Figure 10B:
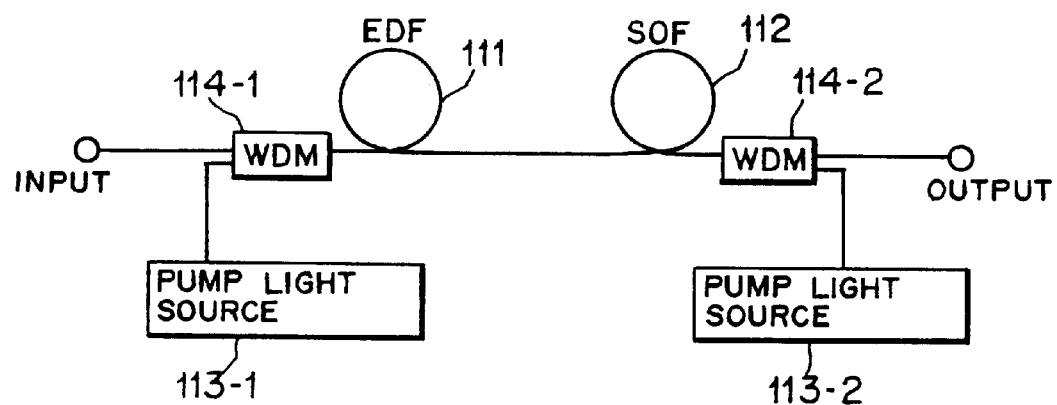

Referring now to FIG. 10(b), there is shown in block diagram an optical fiber amplifier according to an eleventh aspect of the present invention. The optical fiber amplifier shown includes an erbium-doped-fiber (EDF) 111 having a low noise figure and a silica-type-optical-fiber (SOF) 112. In the optical fiber amplifier shown in FIG. 10(b), the erbium-doped-fiber 111 and the silica-type-optical-fiber (SOF) 112 are provided at a front stage and a rear stage, respectively.

The optical fiber amplifier further includes a silica-type-optical-fiber pump source 113-2 for producing pump light of a wavelength band for the silica-type-optical-fiber 112, and an optical coupler 114-2 for introducing the pump light from the silica-type-optical-fiber pump source 113-2 into the silica-type-optical-fiber 112.

The optical fiber amplifier further includes an erbium-doped-fiber pump source 113-1 for producing pump light of a wavelength band for the erbium-doped-fiber 111, and another optical coupler 114-1 for introducing the pump light from the erbium-doped-fiber pump source 113-1 into the erbium-doped-fiber 111.

In this instance, the silica-type-optical-fiber 112 is pumped with pump light from the silica-type-optical-fiber pump source 113-2 to cause Raman amplification to occur.

The optical fiber amplifier may further include a pump source which produces pump light of the 1.47 μm band and serves both as the silica-type-optical-fiber pump source 113-2 and the erbium-doped-fiber pump source 113-1.

In the optical fiber amplifier having the construction described above with reference to FIG. 10(b), pump light from the erbium-doped-fiber pump source 113-1 is introduced into the erbium-doped-fiber 111 by way of the optical coupler 114-1 while pump light from the silica-type-optical-fiber pump source 113-2 is introduced into the silica-type-optical-fiber 112 by way of the optical coupler 114-2. Consequently, the silica-type-optical-fiber 112 can be pumped with the pump light of the wavelength band therefor from the silica-type-optical-fiber pump source 113-2 to cause Raman amplification to occur.

Thus, with the optical fiber amplifier of the eleventh aspect of the present invention, since the optical fiber amplifier includes a Raman optical amplification element formed from the silica-type-optical-fiber 112 for causing, when pumped with pump light, Raman amplification to occur and a rare earth doped fiber optical amplification element formed from the erbium-doped-fiber 111 and arranged in tandem to the Raman optical amplification element, there is an advantage in that the optical fiber amplifier of the two stage construction makes use of the pump power with a high efficiency.

Further, where the optical fiber amplifier additionally includes the pump source which supplies pump light for pumping both of the Raman optical amplification element and the rare earth doped fiber optical amplification element is provided, the optical fiber amplifier can make use of the pump power with a high efficiency, and the number of pump sources to be used can be reduced, which contributes to simplification in construction and reduction in cost.

A12. Twelfth Aspect of the Invention

Figure 11:
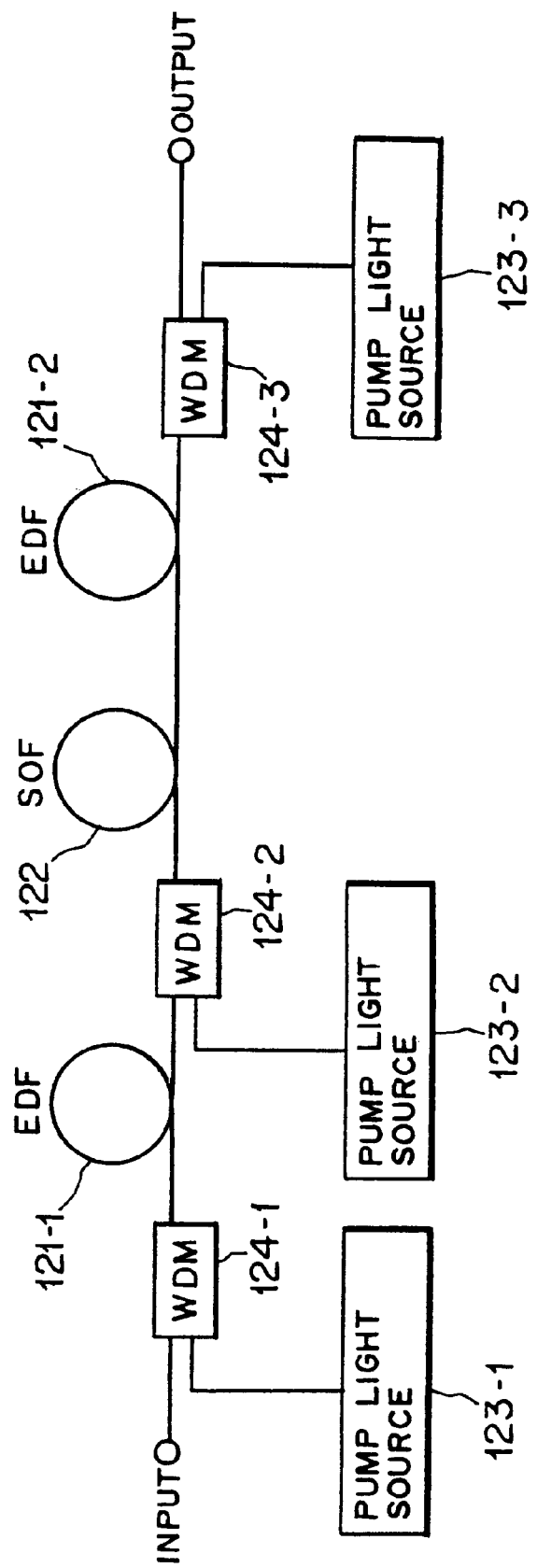

Referring now to FIG. 11, there is shown in block diagram an optical fiber amplifier according to a twelfth aspect of the present invention. The optical fiber amplifier shown includes a first erbium-doped-fiber (EDF) 121-1 having a low noise figure, a silica-type-optical-fiber (SOF) 122 and a second erbium-doped-fiber (EDF) 121-2. In the optical fiber amplifier shown in FIG. 11, the first erbium-doped-fiber 121-1, the silica-type-optical-fiber 122 and the second erbium-doped-fiber 121-2 are provided at a front stage, a middle stage and a rear stage, respectively.

The optical fiber amplifier further includes a first erbium-doped-fiber pump source 123-1 for producing pump light of a wavelength band for the first erbium-doped-fiber 121-1, and an optical coupler 124-1 for introducing the pump light from the first erbium-doped-fiber pump source 123-1 into the first erbium-doped-fiber 121-1.

The optical fiber amplifier further includes a silica-type-optical-fiber pump source 123-2 for producing pump light of a wavelength band for the silica-type-optical-fiber 122, and another optical coupler 124-2 for introducing the pump light from the silica-type-optical-fiber pump source 123-2 into the silica-type-optical-fiber 122.

The optical fiber amplifier further includes a second erbium-doped-fiber pump source 123-3 for producing pump light of a wavelength band for the second erbium-doped-fiber 121-2, and a further optical coupler 124-3 for introducing the pump light from the second erbium-doped-fiber pump source 123-3 into the second erbium-doped-fiber 121-2.

In this instance, the silica-type-optical-fiber 122 is pumped with the pump light from the silica-type-optical-fiber pump source 123-2 to cause Raman amplification to occur.

In the optical fiber amplifier shown in FIG. 11, a rare earth doped fiber optical amplification element formed from the erbium-doped-fiber 121-1 which is a rare earth doped fiber and having a low noise figure is disposed as a front stage amplification element; a Raman optical amplification element formed from the silica-type-optical-fiber 122 for causing Raman amplification to occur when pumped with pump light is disposed as a middle stage amplification element; and another rare earth doped fiber optical amplification element formed from the erbium-doped-fiber 121-2 which is a rare earth doped fiber is disposed as a rear stage amplification element.

In the optical fiber amplifier having the construction described above with reference to FIG. 11, pump light from the first erbium-doped-fiber pump source 123-1 is introduced into the first erbium-doped-fiber 121-1 by way of the optical coupler 124-1 and pump light from the silica-type-optical-fiber pump source 123-2 is introduced into the silica-type-optical-fiber 122 by way of the optical coupler 124-2 while pump light from the second erbium-doped-fiber pump source 123-3 is introduced into the second erbium-doped-fiber 121-2 by way of the optical coupler 124-3.

Consequently, the silica-type-optical-fiber 122 can be pumped with the pump light of the wavelength band therefor from the silica-type-optical-fiber pump source 123-2 to cause Raman amplification to occur.

Thus, with the optical fiber amplifier of the twelfth aspect of the present invention, since the first erbium-doped-fiber 121-1 having a low noise figure, the silica-type-optical-fiber 122 and the second erbium-doped-fiber 121-2 are provided at the front stage, the middle stage and the rear stage, respectively, such that residual pump light from the first and second erbium-doped-fibers 121-1 and 121-2 positioned on the front and the rear to the silica-type-optical-fiber 122 are used for Raman amplification of the silica-type-optical-fiber 122, the silica-type-optical-fiber 122 exhibits an improved compensation effect. Consequently, a wide bandwidth optical amplifier can be realized while achieving simplification in structure and reduction in cost.

A13. Thirteenth Aspect of the Invention

Figure 12:
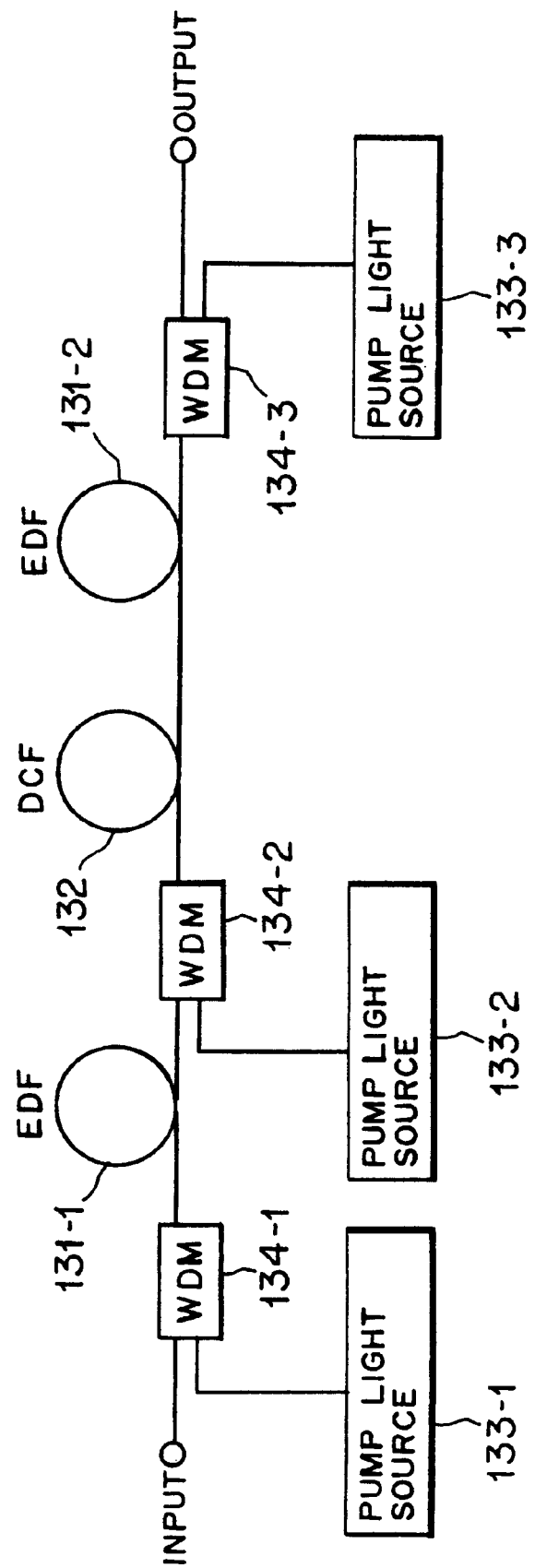

Referring now to FIG. 12, there is shown in block diagram an optical fiber amplifier according to a thirteenth aspect of the present invention. The optical fiber amplifier shown includes a first erbium-doped-fiber (EDF) 131-1 having a low noise figure, a dispersion compensating fiber (DCF) 132 and a second erbium-doped-fiber (EDF) 131-2. In the optical fiber amplifier shown in FIG. 12, the first erbium-doped-fiber 131-1, the dispersion compensating fiber 132 and the second erbium-doped-fiber 131-2 are provided at a front stage, a middle stage and a rear stage, respectively.

The optical fiber amplifier further includes a first erbium-doped-fiber pump source 133-1 for producing pump light of a wavelength band for the first erbium-doped-fiber 131-1, and an optical coupler 134-1 for introducing the pump light from the first erbium-doped-fiber pump source 133-1 into the first erbium-doped-fiber 131-1.

The optical fiber amplifier further includes a dispersion compensating fiber pump source 133-2 for producing pump light of a wavelength band for the dispersion compensating fiber 132, and another optical coupler 134-2 for introducing the pump light from the dispersion compensating fiber pump source 133-2 into the dispersion compensating fiber 132.

The optical fiber amplifier further includes a second erbium-doped-fiber pump source 133-3 for producing pump light of a wavelength band for the second erbium-doped-fiber 131-2, and a further optical coupler 134-3 for introducing the pump light from the second erbium-doped-fiber pump source 133-3 into the second erbium-doped-fiber 131-2.

In this instance, the dispersion compensating fiber 132 is pumped with the pump light from the dispersion compensating fiber pump source 133-2 to cause Raman amplification to occur.

In the optical fiber amplifier shown in FIG. 12, a rare earth doped fiber optical amplification element formed from the erbium-doped-fiber 131-1 which is a rare earth doped fiber and having a low noise figure is disposed as a front stage amplification element; a Raman optical amplification element formed from the dispersion compensating fiber 132 for causing Raman amplification to occur when pumped with pump light is disposed as a middle stage amplification element; and another rare earth doped fiber optical amplification element formed from the erbium-doped-fiber 131-2 which is a rare earth doped fiber is disposed as a rear stage amplification element.

In the optical fiber amplifier having the construction described above with reference to FIG. 12, pump light from the first erbium-doped-fiber pump source 133-1 is introduced into the first erbium-doped-fiber 131-1 by way of the optical coupler 134-1 and pump light from the dispersion compensating fiber pump source 133-2 is introduced into the dispersion compensating fiber 132 by way of the optical coupler 134-2 while pump light from the second erbium-doped-fiber pump source 133-3 is introduced into the second erbium-doped-fiber 131-2 by way of the optical coupler 134-3.

Consequently, the dispersion compensating fiber 132 can be pumped with the pump light of the wavelength band therefor from the dispersion compensating fiber pump source 133-2 to cause Raman amplification to occur.

Thus, with the optical fiber amplifier of the thirteenth aspect of the present invention, since the first erbium-doped-fiber 131-1 having a low noise figure, the dispersion compensating fiber 132 and the second erbium-doped-fiber 131-2 are provided at the front stage, the middle stage and the rear stage, respectively, such that residual pump light from the first and second erbium-doped-fibers 131-1 and 131-2 positioned on the front and the rear to the dispersion compensating fiber 132 are used for Raman amplification of the dispersion compensating fiber 132, the dispersion compensating fiber 132 exhibits an improved compensation effect. Consequently, a wide bandwidth optical amplifier can be realized while achieving simplification in structure and reduction in cost.

A14. Fourteenth Aspect of the Invention

Figure 13A:
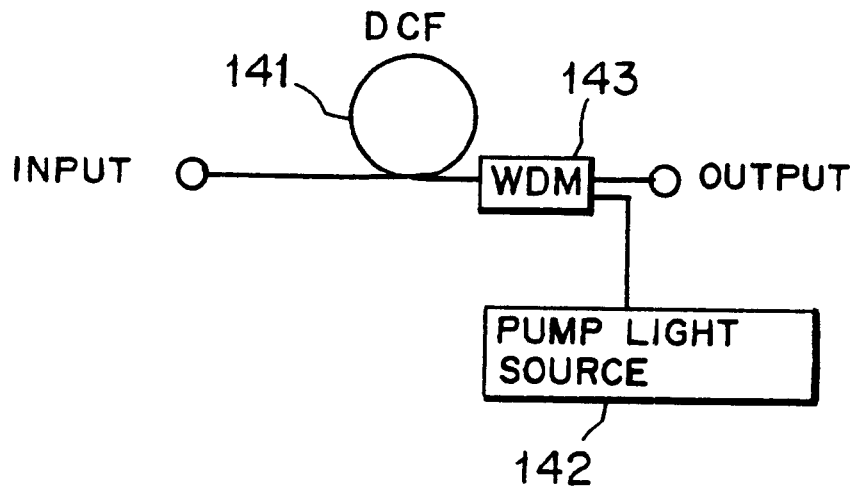

Referring now to FIG. 13(a), there is shown in block diagram an optical fiber amplifier according to a fourteenth aspect of the present invention. The optical fiber amplifier shown includes a dispersion compensating fiber (DCF) 141, a pump source 142 for producing pump light, and an optical coupler 143 for introducing pump light from the pump source 142 into the dispersion compensating fiber 141. The dispersion compensating fiber 141 is pumped with pump light from the pump source 142 to cause Raman amplification to occur.

Accordingly, the optical fiber amplifier includes a dispersion compensating fiber module which includes the dispersion compensating fiber 141, and the pump source 142 for pumping the dispersion compensating fiber 141 to cause Raman amplification to occur.

Also in this instance, the optical fiber amplifier may further include an optical circulator through which input signal light is inputted to the optical fiber amplifier and through which output signal light of the optical fiber amplifier is outputted, or may additionally include an isolator provided at an input port of the optical fiber amplifier to which input signal light is inputted and/or another isolator provided at an output port of the optical fiber amplifier from which output signal light is outputted.

In the optical fiber amplifier having the construction described above with reference to FIG. 13(a), the dispersion compensating fiber 141 is pumped with pump light from the pump source 142 to cause Raman amplification to occur.

Where the optical fiber amplifier includes the additional optical circulator, input signal light is inputted to the optical fiber amplifier and output signal light of the optical fiber amplifier is outputted both through the optical circulator. On the other hand, where the optical fiber amplifier includes the additional isolators, input signal light is inputted through one of the isolators whereas output signal light is outputted through the other isolator.

Thus, with the optical fiber amplifier of the fourteenth aspect of the present invention, since it is constructed using the module wherein the dispersion compensating fiber 141 is pumped to cause Raman amplification to occur, there is an advantage in that the loss of the dispersion compensating fiber 141 can be reduced.

Also in this instance, where the additional circulators are provided at the input and output portions of the optical fiber amplifier, the number of isolators to be used can be reduced, which contributes to reduction in cost.

A15. Fifteenth Aspect of the Invention

Figure 13B:
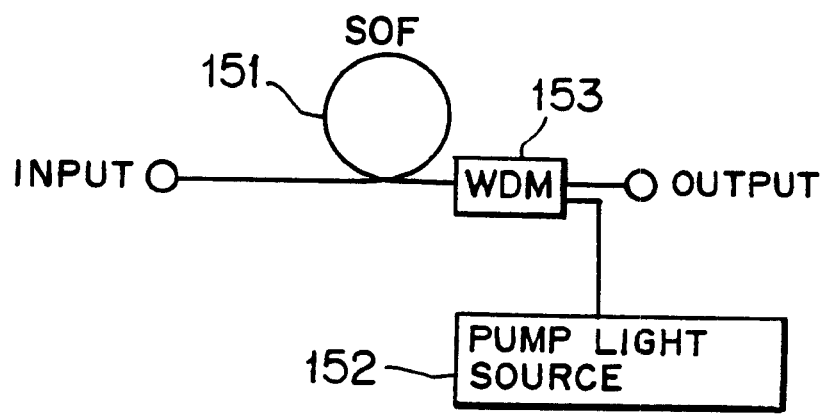

Referring now to FIG. 13(b), there is shown in block diagram an optical fiber amplifier according to a fifteenth aspect of the present invention. The optical fiber amplifier shown includes a silica-type-optical-fiber (SOF) 151, a pump source 152 for producing pump light, and an optical coupler 153 for introducing the pump light from the pump source 152 into the silica-type-optical-fiber 151. The silica-type-optical-fiber 151 is pumped with the pump light from the pump source 152 to cause Raman amplification to occur.

Also in this instance, the optical fiber amplifier may further includes an optical circulator through which input signal light is inputted to the optical fiber amplifier and through which output signal light of the optical fiber amplifier is outputted.

In the optical fiber amplifier having the construction described above with reference to FIG. 13(b), the silica-type-optical-fiber 151 is pumped with pump light from the pump source 152 to cause Raman amplification to occur.

Also here, where the optical fiber amplifier includes the additional optical circulator, input signal light is inputted to the optical fiber amplifier and output signal light of the optical fiber amplifier is outputted both through the optical circulator. On the other hand, where the optical fiber amplifier includes the additional isolators, input signal light is inputted through one of the isolators whereas output signal light is outputted through the other isolator.

Thus, with the optical fiber amplifier of the fifteenth aspect of the present invention, since the silica-type-optical-fiber 151 is pumped to cause Raman amplification to occur, there is an advantage in that the loss of the silica-type-optical-fiber 151 can be reduced.

Also in this instance, where the additional circulators are provided at the input and output portions of the optical fiber amplifier, the number of isolators to be used can be reduced, which contributes to reduction in cost.

A16. Sixteenth Aspect of the Invention

Figure 14:
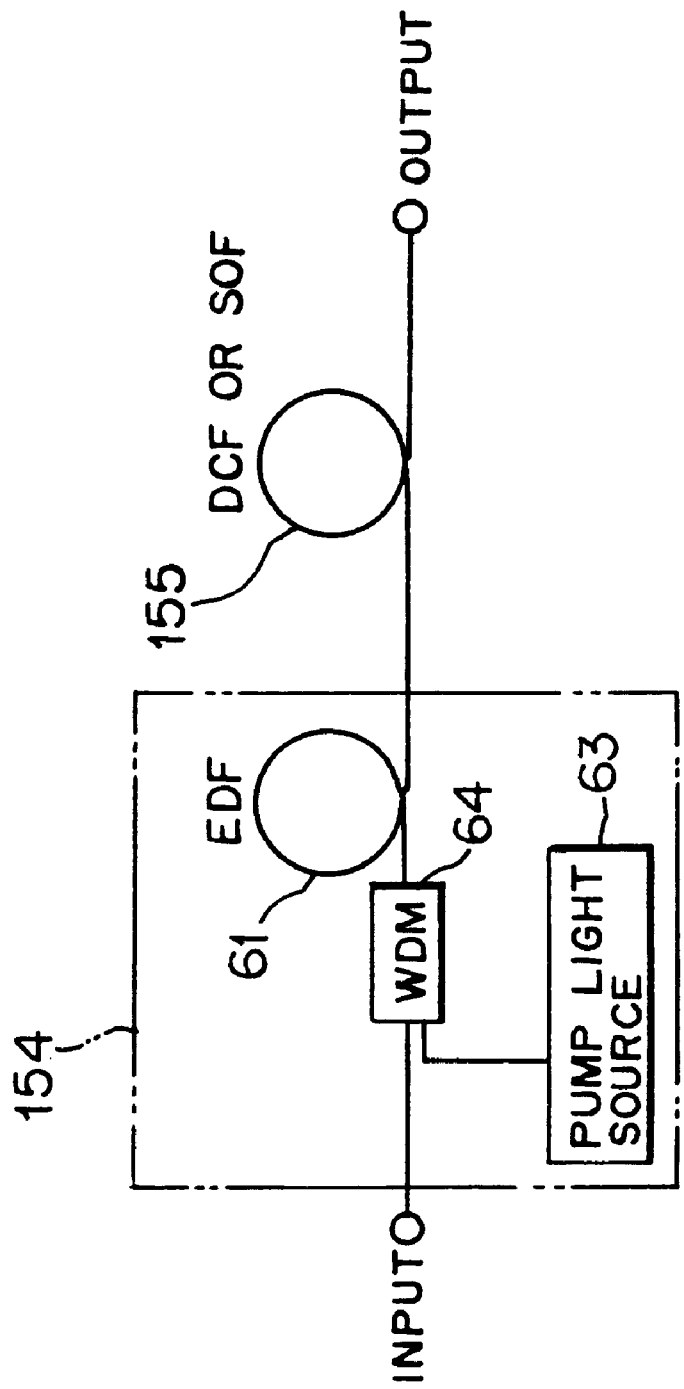

Referring now to FIG. 14, there is shown in block diagram an optical fiber amplifier according to a sixteenth aspect of the present invention. The optical fiber amplifier shown includes a rare earth doped fiber optical amplification element 154 formed from a rare earth doped fiber 61, and an optical fiber attenuation element 155 formed from an optical fiber or an optical fiber with an optical isolator.

The optical fiber attenuation element 155 suppresses unstable operation of the rare earth doped fiber optical amplification element 154.

The optical fiber attenuation element 155 may serve also as a Raman optical amplification element which is pumped with pump light to cause Raman amplification to occur.

It is to be noted that, in FIG. 14, reference numeral 63 denotes a pump source, and 64 an optical coupler which introduces pump light from the pump source 63 into the rare earth doped fiber 61.

In the optical fiber amplifier having the construction described above with reference to FIG. 14, when the erbium-doped-fiber 61 is pumped with pump light from the pump source 63 in the rare earth doped fiber optical amplification element 154, if the rare earth doped fiber optical amplification element 154 operates unstably, the optical fiber attenuation element 155 suppresses the unstable operation of the rare earth doped fiber optical amplification element 154.

The optical fiber attenuation element 155 may be pumped with residual pump light from the erbium-doped-fiber 61 to cause Raman amplification to occur.

In this manner, due to the provision of the optical fiber attenuation element 155, unstable operation of the rare earth doped fiber optical amplification element 154 can be suppressed so that stabilized optical amplification of the optical fiber amplifier can be achieved.

A17. Seventeenth Aspect of the Invention

Figure 15:
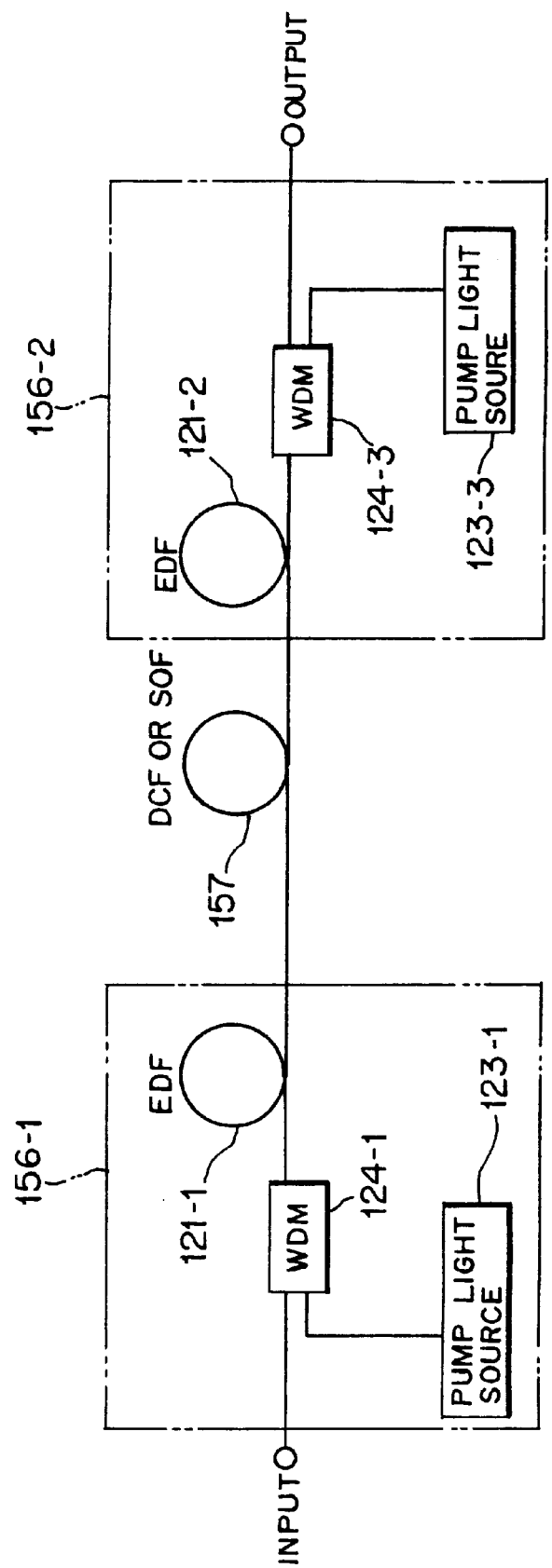

Referring now to FIG. 15, there is shown in block diagram an optical fiber amplifier according to a seventeenth aspect of the present invention. The optical fiber amplifier shown includes a front stage optical amplification element 156-1 and a rear stage optical amplification element 156-2 each formed as a rare earth doped fiber optical amplification element formed from a rare earth doped fiber 121-1 or 121-2. The front stage optical amplification element 156-1 and the rear stage optical amplification element 156-2 form an optical amplification unit.

The optical fiber amplifier further includes an optical fiber attenuation element 157 formed from an optical fiber or an optical fiber with an optical isolator interposed between the front stage optical amplification element 156-1 and the rear stage optical amplification element 156-2 of the optical amplification unit. The optical fiber attenuation element 157 suppresses unstable operation of the optical amplification unit.

The optical fiber attenuation element 157 may serve also as a Raman optical amplification element which is pumped with pump light to cause Raman amplification to occur.

It is to be noted that, in FIG. 15, reference numerals 123-1 and 123-3 denote each a pump source, and reference numeral 124-1 denotes an optical coupler for introducing pump light from the pump source 123-1 into the rare earth doped fiber 121-1, and 124-3 an optical coupler for introducing pump light from the pump source 123-3 into the rare earth doped fiber 121-2.

In the optical fiber amplifier having the construction described above with reference to FIG. 15, when the erbium-doped-fiber 121-1 is pumped with pump light from the pump source 123-1 in the front stage optical amplification element 156-1 in the optical amplification unit and the erbium-doped-fiber 121-2 is pumped with pump light from the pump source 123-3 in the rear stage optical amplification element 156-2 in the optical amplification unit, if the front stage optical amplification element 156-1 and the rear stage optical amplification element 156-2 in the optical amplification unit operate unstably, the optical fiber attenuation element 157 suppresses the unstable operation of the front stage optical amplification element 156-1 and the rear stage optical amplification element 156-2 in the optical amplification unit.

The optical fiber attenuation element 157 may be pumped with residual pump light from the erbium-doped-fibers 121-1 and 121-2 to cause Raman amplification to occur.

In this manner, since the optical fiber attenuation element 157 is interposed between the front stage optical amplification element 156-1 and the rear stage optical amplification element 156-2 in the optical amplification unit, unstable operation of the front stage optical amplification element 156-1 and the rear stage optical amplification element 156-2 in the optical amplification unit can be suppressed to achieve stabilized optical amplification of the optical fiber amplifier.

B. Preferred Embodiments of the Invention

The present invention will be described in more detail below in connection with preferred embodiments thereof shown in the accompanying drawings.

B1. First Embodiment

Figure 16:
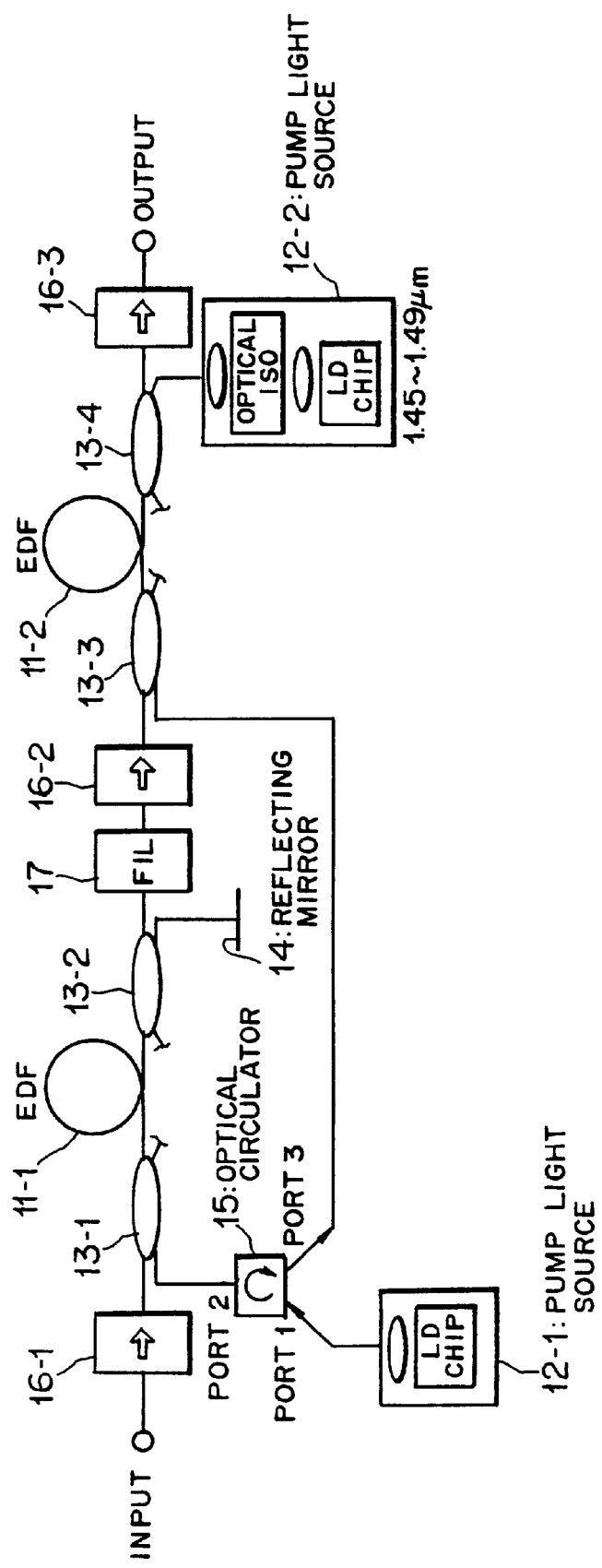
FIG. 16 is a block diagram of an optical fiber amplifier showing a first preferred embodiment of the present invention.

Referring now to FIG. 16, there is shown in block diagram an optical fiber amplifier according to a first preferred embodiment of the present invention. The optical fiber amplifier shown includes a pair of erbium-doped-fibers (EDF) 11-1 and 11-2 each as a rare earth doped fiber, a pair of pump sources 12-1 and 12-2, four optical demultiplexer-multiplexers (WDM; optical wave separator-combiners) 13-1 to 13-4 serving as first to fourth optical couplers, respectively, a reflecting mirror (reflection element) 14, an optical circulator 15, three isolators (ISO) 16-1 to 16-3, and an optical filter 17.

In particular, in the optical fiber amplifier, the isolator 16-1, optical demultiplexer-multiplexer 13-1, erbium-doped-fiber 11-1, optical demultiplexer-multiplexer 13-2, optical filter 17, isolator 16-2, optical demultiplexer-multiplexer 13-3, erbium-doped-fiber 11-2, optical demultiplexer-multiplexer 13-4 and isolator 16-3 are arranged in this order from the input side.

The pump source 12-1 is connected to the optical demultiplexer-multiplexer 13-1 by way of the optical circulator 15. The optical circulator 15 is connected, in addition to the pump source 12-1, at another port thereof to the optical demultiplexer-multiplexer 13-3. Meanwhile, the reflecting mirror 14 is connected to the optical demultiplexer-multiplexer 13-2. It is to be noted that the pump source 12-2 is connected to the optical demultiplexer-multiplexer 13-4.

Each of the erbium-doped-fibers 11-1 and 11-2 functions as an optical amplification element. The pump source 12-1 is formed from a lens and an LD chip and serves as a pump source which produces pump light of, for example, the 0.98 $\mu$m band. Meanwhile, the pump source 12-2 is formed from a pair of lenses, an optical isolator (optical ISO) and an LD chip and serves as a pump source which produces pump light of, for example, the 1.47 $\mu$m band (the terminology "1.47 $\mu$m band" signifies, in the following description of the various embodiments, a band ranging from 1.45 to 1.49 $\mu$m in wavelength). It is to be noted that the reason why the pump source 12-2 which produces pump light of the 1.47 $\mu$m band includes a built-in optical isolator (optical ISO) is that it is intended to prevent noise light of the 1.55 $\mu$m band generated in the erbium-doped-fiber 11-2 upon amplification of an optical signal of the 1.55 $\mu$m band from returning to the pump source 12-2.

Where the pump light wavelengths of the pump sources 12-1 and 12-2 are selected in such a manner as described above, an optical demultiplexer-multiplexer of the 0.98 $\mu$m band is used for the optical demultiplexer-multiplexers 13-1 to 13-3, and another optical demultiplexer-multiplexer of the 1.47 bandwidth is used for the optical demultiplexer-multiplexer 13-4.

Further, while, in the arrangement shown in FIG. 16, an optical demultiplexer-multiplexer of the fusion type is used for the optical demultiplexer-multiplexers 13-1 to 13-4, naturally another optical demultiplexer-multiplexer of the bulk (dielectric multi-layer film) type may be employed alternatively. Where, for example, an optical demultiplexer-multiplexer of the bulk type is employed for the optical demultiplexer-multiplexer 13-4, the optical isolator (optical ISO) build in the pump source 12-2 can be omitted, and consequently, a pump source of the same type as that of the pump source 12-1 (but of the 1.47 µm band) is employed for the pump source 12-2 (this similarly applies to the other embodiments hereinafter described).

Meanwhile, a Faraday rotation reflecting mirror is employed for the reflecting mirror 14. Thus, residual pump light demultiplexed by the optical demultiplexer-multiplexer 13-2 is reflected using the reflecting mirror 14 so that it may be introduced back into the erbium-doped-fiber 11-1 by way of the optical demultiplexer-multiplexer 13-2.

An optical circulator of the three port type is used for the optical circulator 15. Accordingly, the optical circulator 15 is constructed equivalently to an optical circulator of the four port type shown in FIG. 53 which has no fiber connected to a port 4 thereof.

As seen in FIG. 16, the pump source 12-1 is connected to a port 1 of the optical circulator 15; the optical demultiplexer-multiplexer 13-1 is connected to another port 2 of the optical circulator 15; and the optical demultiplexer-multiplexer 13-3 is connected to the other port 3 of the optical circulator 15.

It is to be noted that the optical circulator 15 may alternatively be constructed as an optical circulator having more than three ports.

Figure 54A:
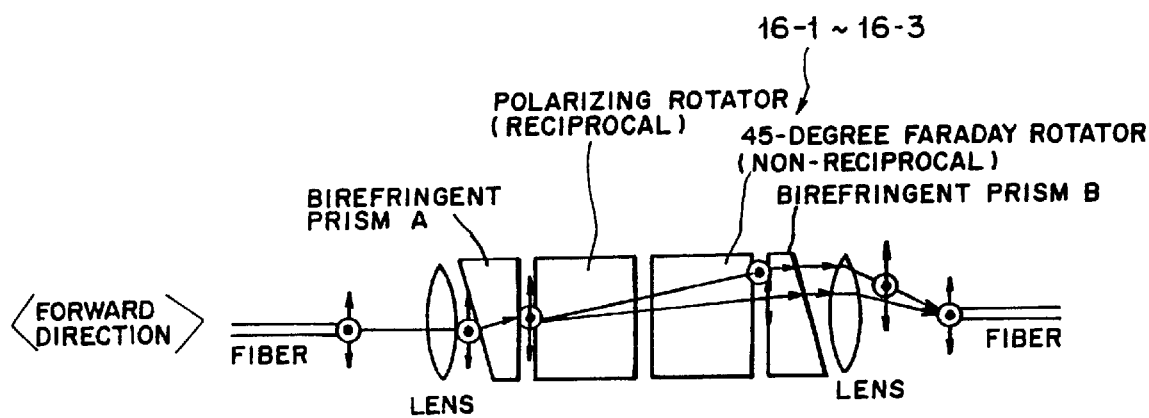
FIGS. 54(*a*) and 54(*b*) are schematic views showing a construction of an isolator.
Figure 54B:
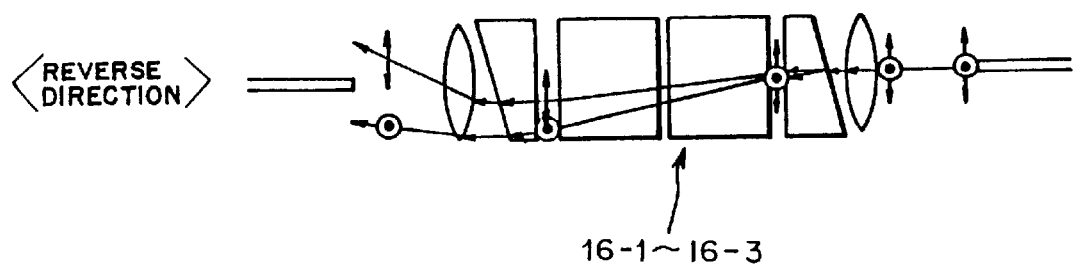

The isolators 16-1 to 16-3 allow light to pass therethrough only in the directions indicated by respective arrow marks. As seen in FIGS. 54(*a*) and 54(*b*), each of the isolators 16-1 to 16-3 includes a lens, a pair of birefringent prisms A and B, a polarizing rotator (reciprocal) and a 45-degree Faraday rotator (non-reciprocal).

When an optical signal is inputted from a fiber on the left side in FIG. 54(*a*) to any of the isolators 16-1 to 16-3, the optical signal arrives at another fiber on the right side through the optical isolator as seen in FIG. 54(*a*). However, even if an optical signal is inputted from the fiber on the right side, it does not arrive at the fiber on the left side as seen from FIG. 54(*b*) (in the embodiments described below, unless otherwise specified, each isolator has the structure illustrated in FIGS. 54(*a*) and 54(*b*)).

Referring back to FIG. 16, in the optical fiber amplifier of the present embodiment, the isolators 16-1 and 16-2 are disposed at the front and rear stages to the erbium-doped-fiber 11-1, respectively, and the isolators 16-2 and 16-3 are disposed at the front and rear stages to the erbium-doped-fiber 11-2, respectively, so that production of noise light in the erbium-doped-fibers 11-1 and 11-2 is prevented.

It is to be noted that, in an optical amplifier which includes a plurality of optical amplification elements, it is particularly important to prevent production of noise light by the erbium-doped-fiber 11-1 which is an amplification element positioned on the input side of an optical signal in order to amplify light with low noise production, and accordingly, the isolator 16-3 at the rear stage to the erbium-doped-fiber 11-2 which is an amplification element positioned on the output side of an optical signal can be omitted (this similarly applies to the other embodiments hereinafter described).

The optical filter 17 cuts a mountain-like portion of the output characteristic of ASE (Amplified Spontaneous Emission) of the erbium-doped-fiber 11-1 (for example, a portion at 1.535 µm; refer to FIG. 46) (that is, levels the mountain into a flat shape or cuts away the shorter wavelength side than 1.538 µm). The optical filter 17 includes a dielectric multi-layer film. The optical filter 17, however, may be omitted.

In the optical fiber amplifier having the construction described above, pump light from the pump source 12-1 first passes through the optical circulator 15 and is then multiplexed with signal light from the isolator 16-1 by the optical demultiplexer-multiplexer 13-1, and the thus multiplexed light is introduced into one end of the erbium-doped-fiber 11-1. Consequently, optical amplification is performed by the erbium-doped-fiber 11-1. In this instance, since the erbium-doped-fiber 11-1 has a comparatively small length so as to assure a high average pump ratio, residual pump power leaks out from the other end of the erbium-doped-fiber 11-1.

The residual pump light arriving at and leaking out from the other end of the erbium-doped-fiber 11-1 in this manner is demultiplexed from the signal light by the optical demultiplexer-multiplexer 13-2 and then reflected by the reflecting mirror 14 backwardly.

Thereafter, the reflected residual pump light is introduced into the erbium-doped-fiber 11-1 and passed on to the optical circulator 15 by way of the optical demultiplexer-multiplexer 13-1. By the optical circulator 15, the reflected residual pump light now is introduced into a different optical path so that it is introduced into the optical demultiplexer-multiplexer 13-3. Consequently, the residual pump light is multiplexed by the optical demultiplexer-multiplexer 13-3 with the signal light from the isolator 16-2 which has been amplified by the erbium-doped-fiber 11-1. The thus multiplexed light is introduced into the erbium-doped-fiber 11-2.

It is to be noted that the erbium-doped-fiber 11-2 at the rear stage receives pump light from the pump source 12-2 and optical amplifies the signal light with the pump light.

In particular, in the present first embodiment, the erbium-doped-fiber optical amplifier of the two stage construction employing the optical circulator 15 of the three port type is constructed such that pump light (for example, of 0.98 µm) is introduced into the input side of the front stage erbium-doped-fiber 11-1 through the optical demultiplexer-multiplexer 13-1 and the optical demultiplexer-multiplexer 13-2 is provided on the output side of the front stage erbium-doped-fiber 11-1 such that signal light may be inputted to the rear stage erbium-doped-fiber 11-2 through the optical filter 17 and the isolator (ISO) 16-2.

Meanwhile, the pump light is demultiplexed from the signal light by the optical demultiplexer-multiplexer 13-2 and then reflected by the reflecting mirror 14 so that it goes back through the front stage erbium-doped-fiber 11-1. The pump light is thereafter demultiplexed by the optical demultiplexer-multiplexer 13-1 and introduced by the optical circulator 15 so that it is inputted to the rear stage erbium-doped-fiber 11-2 by way of the optical demultiplexer-multiplexer 13-3.

In the optical fiber amplifier shown in FIG. 16, the pump source 12-2 is provided also on the output side of the rear stage erbium-doped-fiber 11-2, and taking possible interference between the pump sources 12-1 and 12-2 into consideration, the wavelength of the pump source 12-1 is set to 0.98 µm while the wavelength of the pump source 12-2 is set to 1.47 µm so that residual pump light of 0.98 µm is prevented from entering the pump source 12-2 by the optical demultiplexer-multiplexer 13-4.

Thus, in the first embodiment shown in FIG. 16, the optical fiber amplifier wherein the erbium-doped-fibers 11-1 and 11-2 are disposed at the two front and rear stages includes a first element for introducing pump light into one end of the erbium-doped-fiber 11-1 by way of the optical circulator 15 and the optical demultiplexer-multiplexer 13-1, a second element for demultiplexing residual pump light originating from the pump light introduced into the one end of the erbium-doped-fiber 11-1 by the first element and arriving at the other end of the erbium-doped-fiber 11-1 from signal light using the optical demultiplexer-multiplexer 13-2 and then reflecting the residual pump light using the reflection element 14 so that it is introduced back into the erbium-doped-fiber 11-1, and a third element for causing the residual pump light reflected from the reflection element 14 and returned into the erbium-doped-fiber 11-1 by the reflection element 14 to follow a different optical light by means of the optical circulator 15 so that it is introduced into and multiplexed by the optical demultiplexer-multiplexer 133 with the signal light and introducing the thus multiplexed light into the erbium-doped-fiber 11-2.

In the manner, in the present first embodiment, by introducing residual pump power, which is produced when the average pump ratio is set high, back into the erbium-doped-fiber 11-1 using the optical demultiplexer-multiplexer 13-2 and the reflecting mirror 14 provided newly so that the residual pump power may be transmitted backwardly through the erbium-doped-fiber 11-1, the pump power can be utilized efficiently, and consequently, improvement in conversion efficiency can be achieved.

Further, since the optical circulator 15 is employed in this instance, a loop can be formed to prevent the pump power from becoming unstable.

Furthermore, since a Faraday rotation reflecting mirror is employed for the reflecting mirror 14, the polarization of pump light can be rotated, and consequently, PHB (Polarization Hole Burning) can be reduced.

B1-1. First Modification to the First Embodiment

Figure 17:
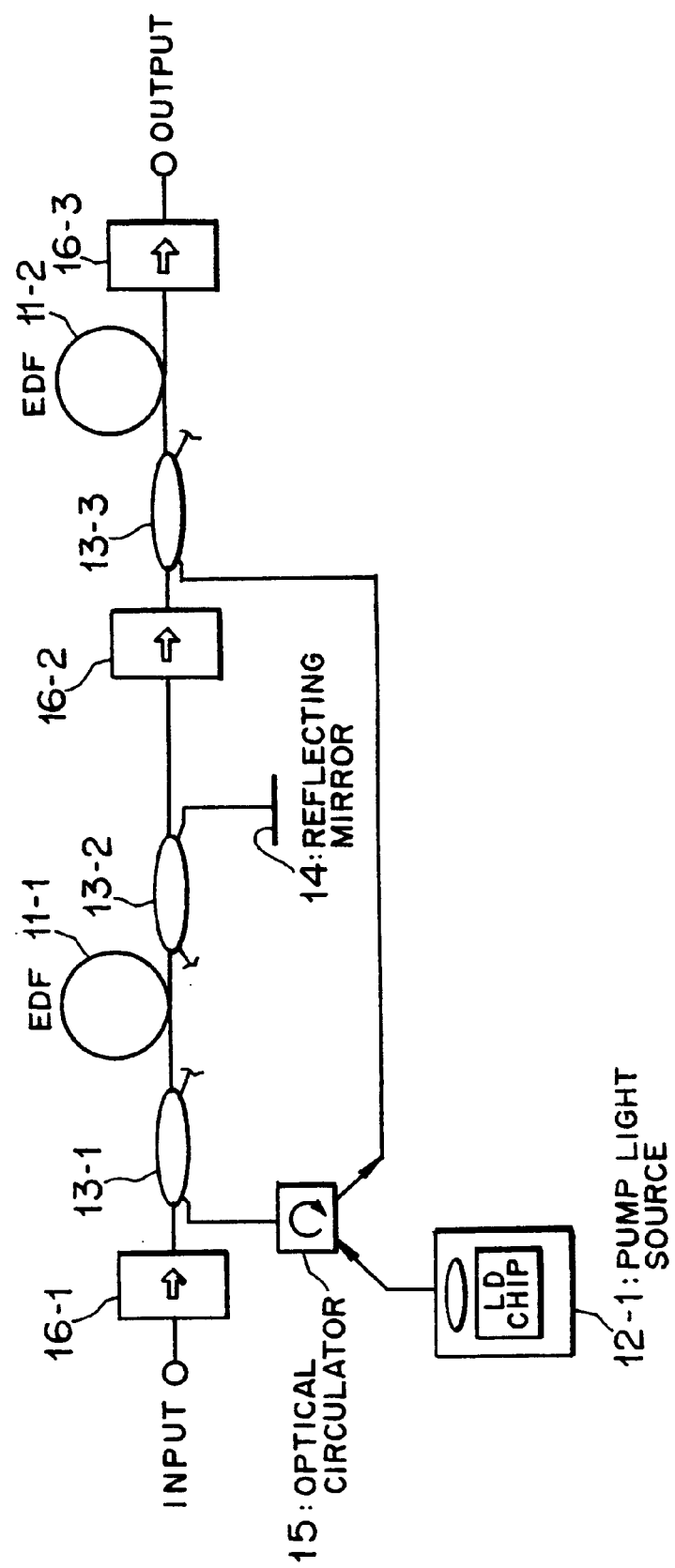
FIGS. 17 to 20 are block diagrams showing different modifications to the optical amplifier of FIG. 16.

FIG. 17 is a block diagram showing a first modification to the first embodiment of the present invention. Referring to FIG. 17, the modified optical fiber amplifier shown includes an isolator 16-1, an optical demultiplexer-multiplexer 13-1, an erbium-doped-fiber 11-1, another optical demultiplexer-multiplexer 13-2, another isolator 16-2, a further optical demultiplexer-multiplexer 13-3, another erbium-doped-fiber 11-2 and a further isolator 16-3 disposed in this order from the input side.

A pump source 12-1 is connected to the optical demultiplexer-multiplexer 13-1 by way of an optical circulator 15. The optical circulator 15 is connected, in addition to the pump source 12-1, at another port thereof to the optical demultiplexer-multiplexer 13-3. A reflecting mirror 14 is connected to the optical demultiplexer-multiplexer 13-1.

It can be seen also from the construction described above that, in the optical fiber amplifier shown in FIG. 17, the erbium-doped-fibers 11-1 and 11-2 at the front and rear stages are both pumped by the single pump source 12-1. It is to be noted that, while the optical filter 17 is omitted in the arrangement shown in FIG. 17, also the modified optical fiber amplifier may include the optical filter 17 at the position shown in FIG. 16.

Also in the modified optical fiber amplifier, pump light is introduced into one end of the erbium-doped-fiber 11-1 from the optical demultiplexer-multiplexer 13-1 by way of the optical circulator 15. Then, residual pump light originating from the pump light introduced into the erbium-doped-fiber 11-1 and arriving at the other end of the erbium-doped-fiber 11-1 is demultiplexed by the optical demultiplexer-multiplexer 13-2 and then reflected by the reflecting mirror 14 so that it is introduced back into the erbium-doped-fiber 11-1. The reflected residual light introduced into the erbium-doped-fiber 11-1 is introduced, after passing the erbium-doped-fiber 11-1, into a different optical path by the optical circulator 15 so that it is introduced into and multiplexed by the optical demultiplexer-multiplexer 13-3 with signal light, and the thus multiplexed light is introduced into and amplified by the erbium-doped-fiber 11-2. Consequently, similar advantages or effects to those of the first embodiment described hereinabove with reference to FIG. 16 can be achieved. In addition, since the pump source 12-1 is provided commonly for the two erbium-doped-fibers 11-1 and 11-2, the optical fiber amplifier is simplified in construction and reduced in cost.

B1-2. Second Modification to the First Embodiment

Figure 18:
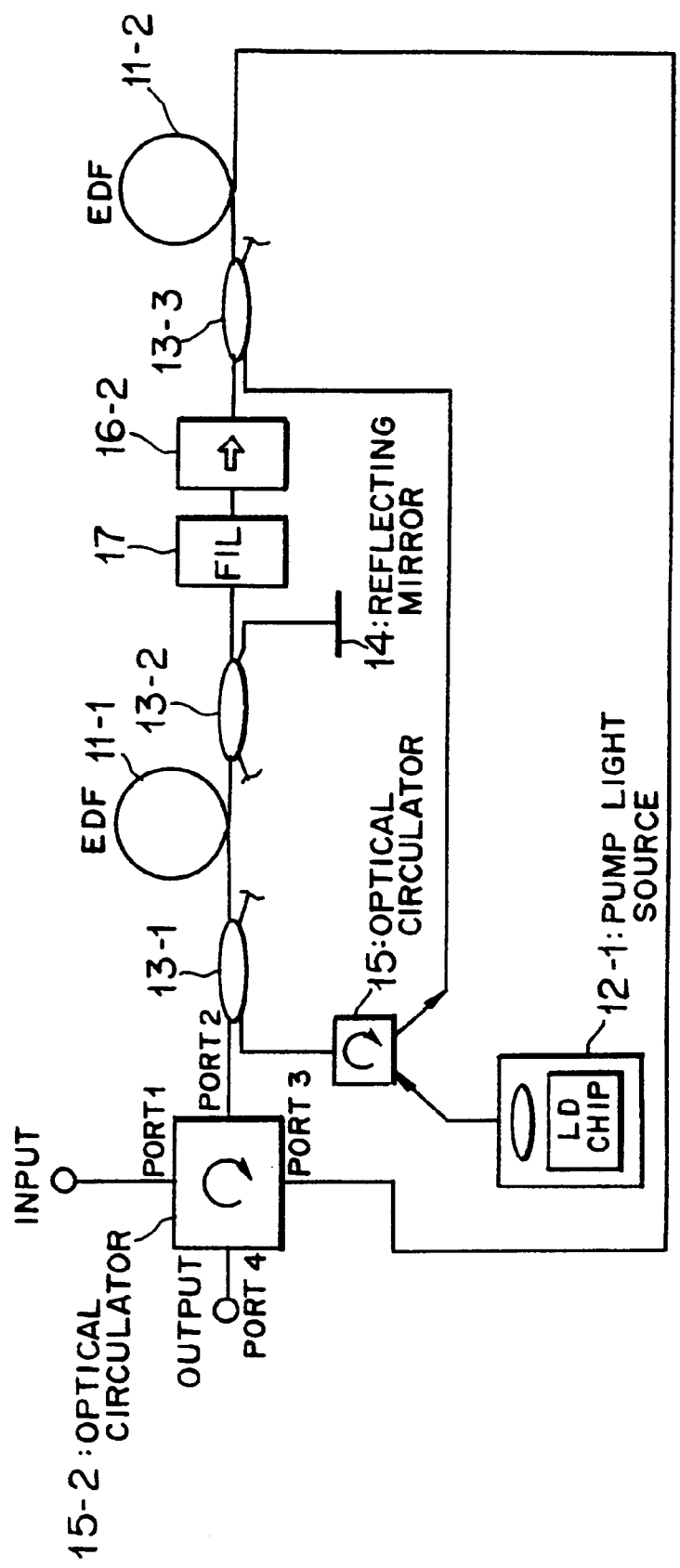

FIG. 18 is a block diagram showing a second modification to the first embodiment of the present invention. Referring to FIG. 18, the modified optical fiber amplifier shown includes an optical demultiplexer-multiplexer 13-1, an erbium-doped-fiber 11-1, another optical demultiplexer-multiplexer 13-2, an optical filter 17, an isolator 16-2, a further optical demultiplexer-multiplexer 13-3 and another erbium-doped-fiber 11-2 disposed in this order from the input side. Input signal light is inputted by way of an optical circulator 15-2 of the four port type, and also output signal light is outputted by way of the same optical circulator 15-2. A pump source 12-1 is connected to the optical demultiplexer-multiplexer 13-1 by way of another optical circulator 15. The optical circulator 15 is connected, in addition to the pump source 12-1, at another port thereof to the optical demultiplexer-multiplexer 13-3. A reflecting mirror 14 is connected to the optical demultiplexer-multiplexer 13-2.

As can be recognized also from the construction described above, the optical fiber amplifier shown in FIG. 18 includes the optical circulator 15-2 in place of the isolators at the inputting and outputting portions employed in the embodiment shown in FIG. 16 and the first modification shown in FIG. 17.

Figures 53A, 53B:
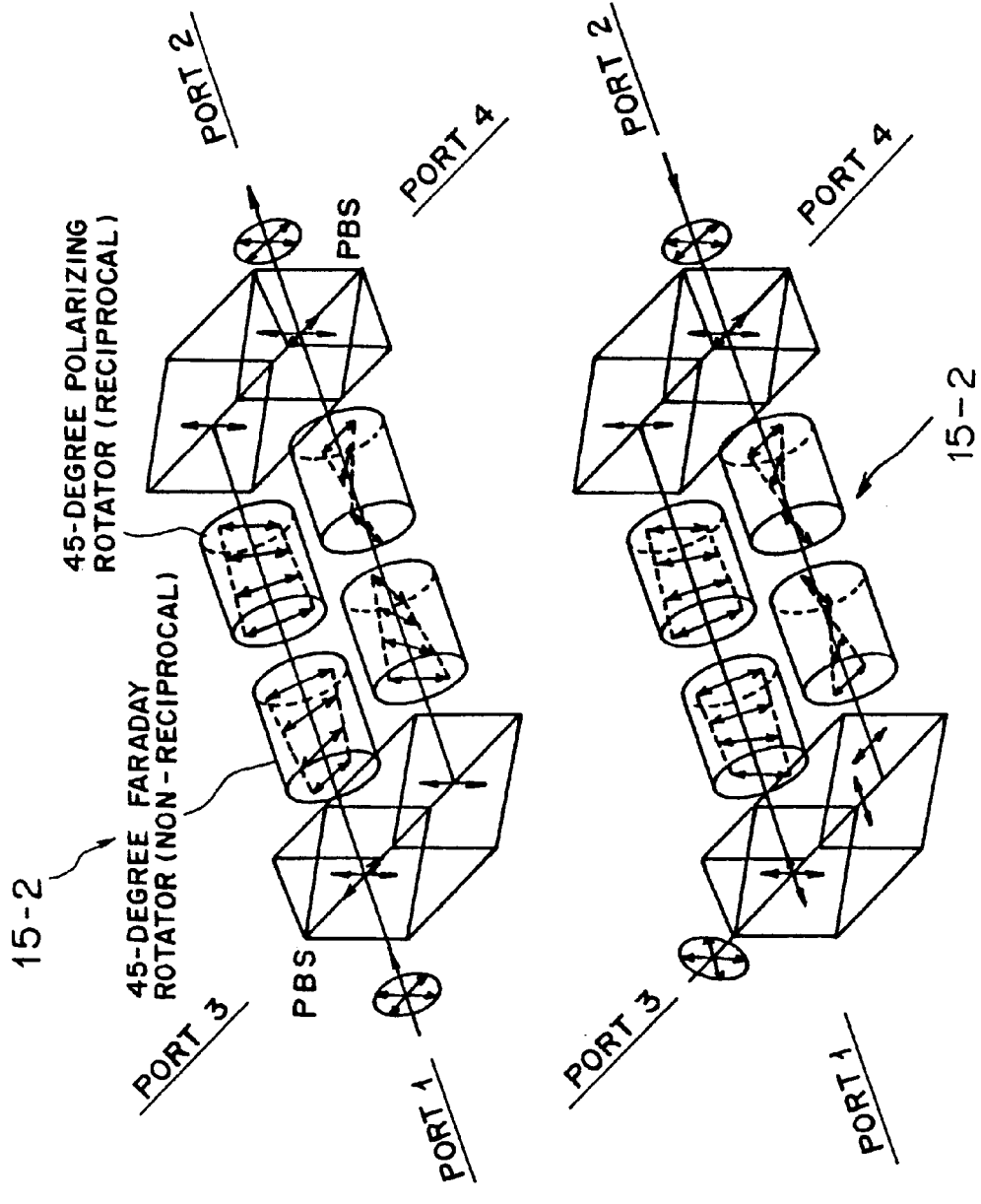
FIGS. 53(*a*) and 53(*b*) are schematic views showing a construction of an optical circulator.

The optical circulator 15-2 is such an optical circulator of the four port type as shown in FIGS. 53(*a*) and 53(*b*) which is formed from a pair of PBSs, a pair of 45-degree Faraday rotators (non-reciprocal) and a pair of 45-degree polarizing rotators (reciprocal) and has ports 1 to 4.

The optical circulator 15-2 outputs an optical signal inputted to the port 1 from the port 2 as seen in FIG. 53(*a*) but outputs an optical signal inputted to the port 2 from the port 3 as seen in FIG. 53(*b*). Further, though not shown, an optical signal inputted to the port 3 of the optical circulator 15-2 is outputted from the port 4, but an optical signal inputted to the port 4 is outputted from the port 1 (in the description of the embodiments described below, unless otherwise specified, each optical circulator has the structure shown in FIGS. 53(*a*) and 53(*b*)).

The optical circulator 15-2 shown in FIG. 18 is arranged so that an input optical signal is inputted to the port 1 and an output optical signal is outputted from the port 4. The optical demultiplexer-multiplexer 13-1 is connected to the port 2 while the erbium-doped-fiber 11-2 is connected to the port 3.

It is to be noted that the optical filter 17 may be omitted.

Also in the present arrangement, pump light is introduced into one end of the erbium-doped-fiber 11-1 from the optical demultiplexer-multiplexer 13-1 by way of the optical circulator 15. Then, residual pump light originating from the pump light inputted to the erbium-doped-fiber 11-1 and arriving at the other end of the erbium-doped-fiber 11-1 is demultiplexed from signal light by the optical demultiplexer-multiplexer 13-2. The residual pump light is reflected by the reflecting mirror 14 so that it is introduced back into the erbium-doped-fiber 11-1. Then, the reflected residual pump light introduced into the erbium-doped-fiber 11-1 is introduced, after passing the erbium-doped-fiber 11-1, into a different optical path by the optical circulator 15 so that it is thereafter multiplexed with the signal light by the optical demultiplexer-multiplexer 13-3, and the thus multiplexed light is introduced into and amplified by the erbium-doped-fiber 11-2. Consequently, similar effects to those described hereinabove in connection with the first embodiment shown in FIG. 16 can be achieved. Further, since the optical circulator 15-2 is provided at the inputting and outputting portions of the optical fiber amplifier, the number of isolators to be used can be reduced. Consequently, the modified optical fiber amplifier is advantageous also in that it can be produced at reduced cost.

B1-3. Third Modification to the First Embodiment

Figure 19:
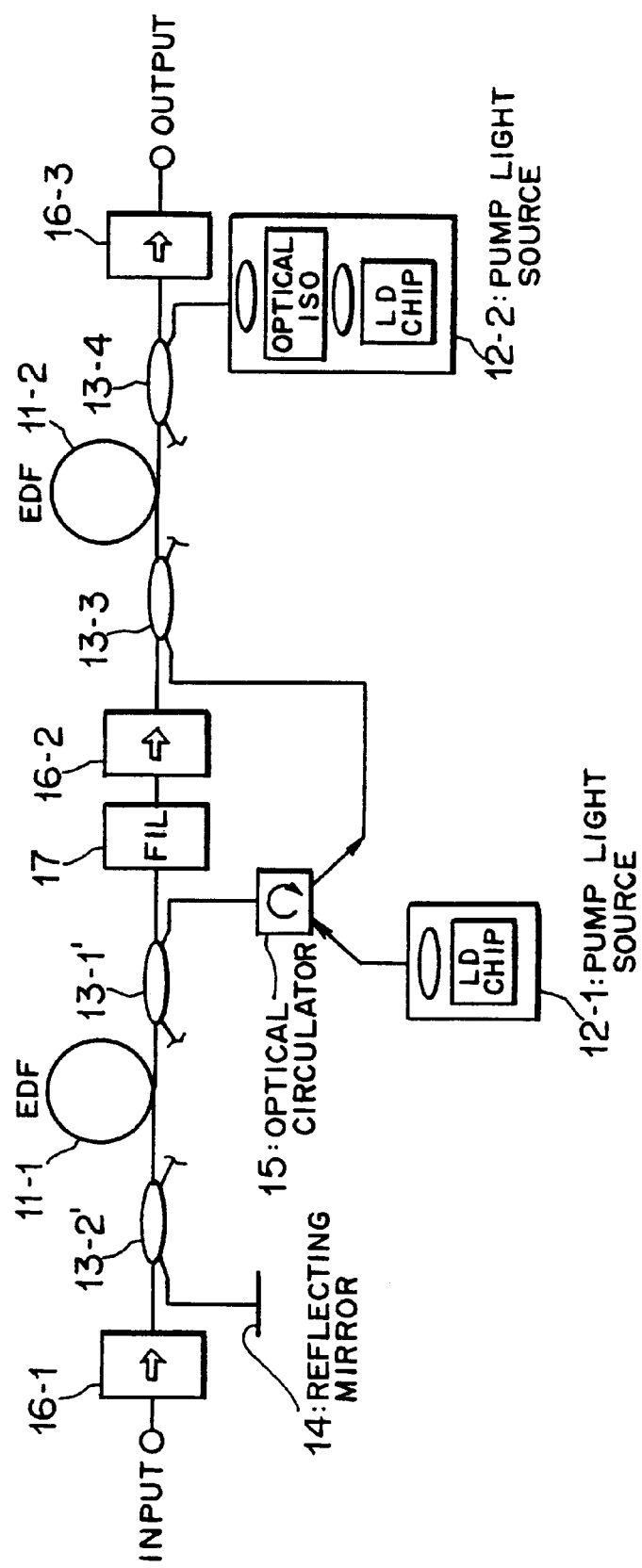

FIG. 19 is a block diagram showing a third modification to the first embodiment of the present invention. Referring to FIG. 19, the modified optical fiber amplifier shown includes an isolator 16-1, an optical demultiplexer-multiplexer (second optical coupler) 13-2', an erbium-doped-fiber 11-1, an optical demultiplexer-multiplexer (first optical coupler) 13-1', an optical filter 17, another isolator 16-2, a further optical demultiplexer-multiplexer 13-3, another erbium-doped-fiber 11-2, a still further optical demultiplexer-multiplexer 13-4 and a further isolator 16-3 disposed in this order from the input side. A pump source 12-1 is connected to the optical demultiplexer-multiplexer 13-1' by way of an optical circulator 15. The optical circulator 15 is connected, in addition to the pump source 12-1, at another port thereof to the optical demultiplexer-multiplexer 13-3. A reflecting mirror 14 is connected to the optical demultiplexer-multiplexer 13-2'. Further, another pump source 12-2 is connected to the optical demultiplexer-multiplexer 13-4.

As can be recognized also from the construction described above, in the optical fiber amplifier shown in FIG. 19, pump light is introduced into the erbium-doped-fiber 11-1 from the output side of the same. Also in the present arrangement, the optical filter 17 can be omitted.

In the optical fiber amplifier, pump light is introduced into the output end of the erbium-doped-fiber 11-1 from the optical demultiplexer-multiplexer 13-1' by way of the optical circulator 15, and residual pump light originating from the pump light introduced into the erbium-doped-fiber 11-1 and arriving at the input end of the erbium-doped-fiber 11-1 is demultiplexed by the optical demultiplexer-multiplexer 13-2'. The residual pump light is then reflected by the reflecting mirror 14 so that it is introduced back into the erbium-doped-fiber 11-1. The reflected residual light introduced into the erbium-doped-fiber 11-1 is introduced, after passing the erbium-doped-fiber 11-1, into a different optical path by the optical circulator 15 so that it is thereafter multiplexed with signal light by the optical demultiplexer-multiplexer 13-3, and the thus multiplexed light is introduced into and amplified by the erbium-doped-fiber 11-2.

Consequently, similar advantages or effects to those described hereinabove in connection with the first embodiment of the present invention shown in FIG. 16 are achieved.

B1-4. Fourth Modification to the First Embodiment

Figure 20:
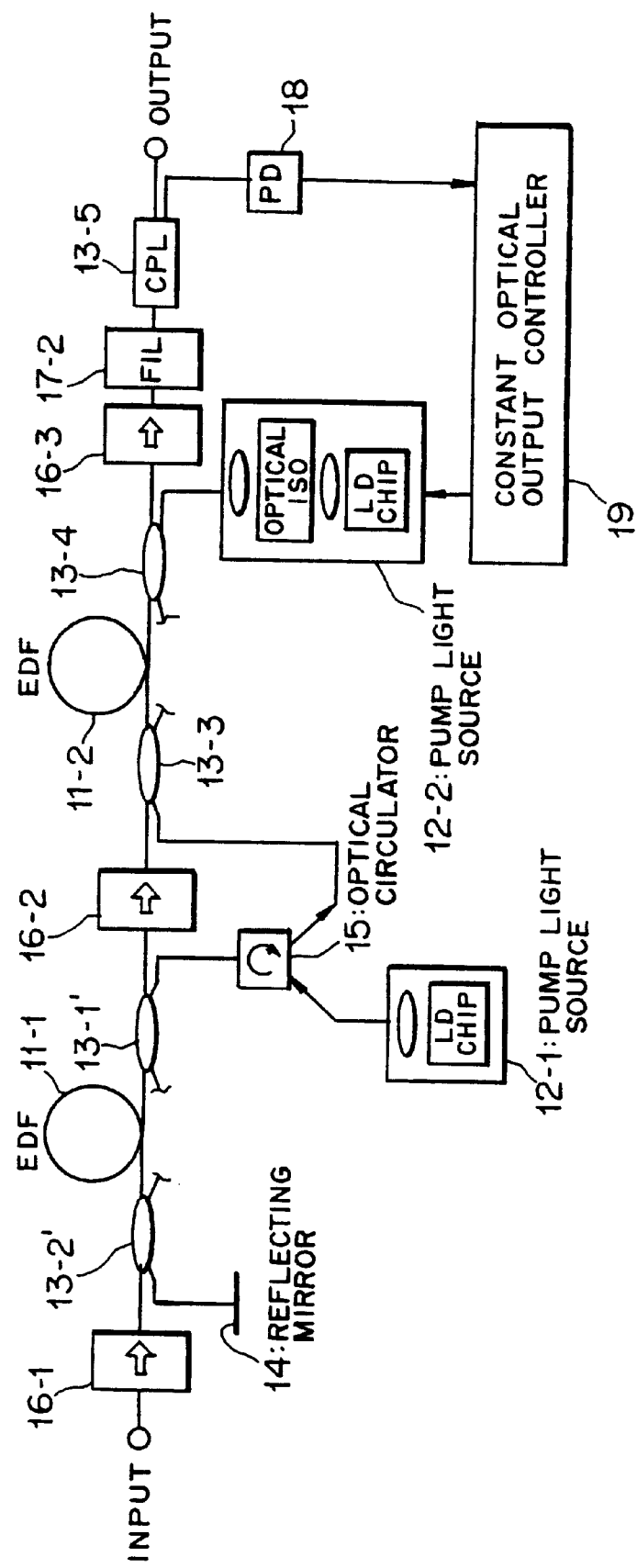

FIG. 20 is a block diagram showing a fourth modification to the first embodiment of the present invention. Referring to FIG. 20, the modified optical fiber amplifier shown includes an isolator 16-1, an optical demultiplexer-multiplexer 13-2', an erbium-doped-fiber 11-1, another optical demultiplexer-multiplexer 13-1', another isolator 16-2, a further optical demultiplexer-multiplexer 13-3, another erbium-doped-fiber 11-2, a still further optical demultiplexer-multiplexer 13-4, a further isolator 16-3, an optical filter 17-2 and a coupler 13-5 disposed in this order from the input side. Similarly as in the modified optical fiber amplifier shown in FIG. 19, a pump source 12-1 is connected to the optical demultiplexer-multiplexer 13-1' by way of an optical circulator 15, and the optical circulator 15 is connected, in addition to the pump source 12-1, at another port thereof to the optical demultiplexer-multiplexer 13-3. Further, a reflecting mirror 14 is connected to the optical demultiplexer-multiplexer 13-2'. Meanwhile, another pump source 12-2 is connected to the optical demultiplexer-multiplexer 13-4.

The optical fiber amplifier further includes an output light detector 18 for detecting output light from the coupler 13-5, and a constant optical output controller 19 for controlling the pump source 12-2 based on a result of detection of the output light detector 18 so that the output of the pump source 12-2 may be constant.

Figures 21, 22:
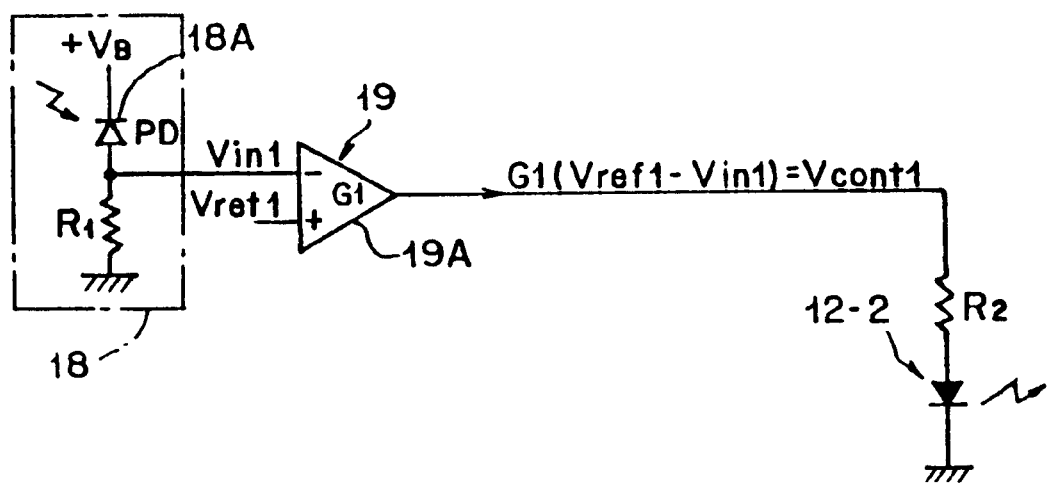
FIG. 21 is an electric circuit diagram showing a constant optical output control system shown in FIG. 20.
FIG. 22 is a table illustrating operation of the constant optical output control system of FIG. 21.

In particular, referring to FIG. 21, the output light detector 18 includes a photodiode 18A. A detection value Vin1 by the photodiode 18A is inputted to a differential amplifier 19A which forms the constant optical output controller 19. The differential amplifier 19A supplies a difference G1 between a reference value Vref1 and the detection value Vin1 as a control signal Vcont1 to a laser diode which forms the pump source 12-2.

The relationship among the output optical power, the control signal Vcont1 and the output of the laser diode is such as illustrated in FIG. 22.

As can be recognized apparently from the construction described above, the optical fiber amplifier shown in FIG. 20 is so constructed as to realize constant optical output control (ALC).

Also in the present modified optical fiber amplifier, pump light is introduced into an output end of the erbium-doped-fiber 11-1 from the optical demultiplexer-multiplexer 13-1' by way of the optical circulator 15 similarly as in the arrangement shown in FIG. 19. Residual pump light originating from the pump light introduced into the erbium-doped-fiber 11-1 and arriving at an input end of the erbium-doped-fiber 11-1 is demultiplexed by the optical demultiplexer-multiplexer 13-2'. The residual pump light is reflected by the reflecting mirror 14 so that it is introduced back into the erbium-doped-fiber 11-1. The reflected residual light introduced into the erbium-doped-fiber 11-1 is introduced, after passing the erbium-doped-fiber 11-1, into a different optical path by the optical circulator 15 so that it is thereafter multiplexed with signal light by the optical demultiplexer-multiplexer 13-3. The thus multiplexed light is introduced into and amplified by the erbium-doped-fiber 11-2. Then, constant optical output control is applied to the amplified light under the control of the constant optical output controller 19.

Consequently, similar advantages or effects to those described hereinabove in connection with the first embodiment of the present invention shown in FIG. 16 are achieved. In addition, since constant optical output control is performed, the optical output level can be set so that it exhibits a reduced accumulation of ASE and a reduced deterioration in signal to noise ratio (SNR) caused by nonlinear effects in an optical fiber transmission line.

B1-5. Others

While an erbium-doped-fiber which makes use of reflected residual pump light is disposed, in the embodiment and its modifications described above, at the front stage, the other erbium-doped-fiber provided at the rear stage may make use of reflected residual pump light.

B2. Second Embodiment

Figure 23:
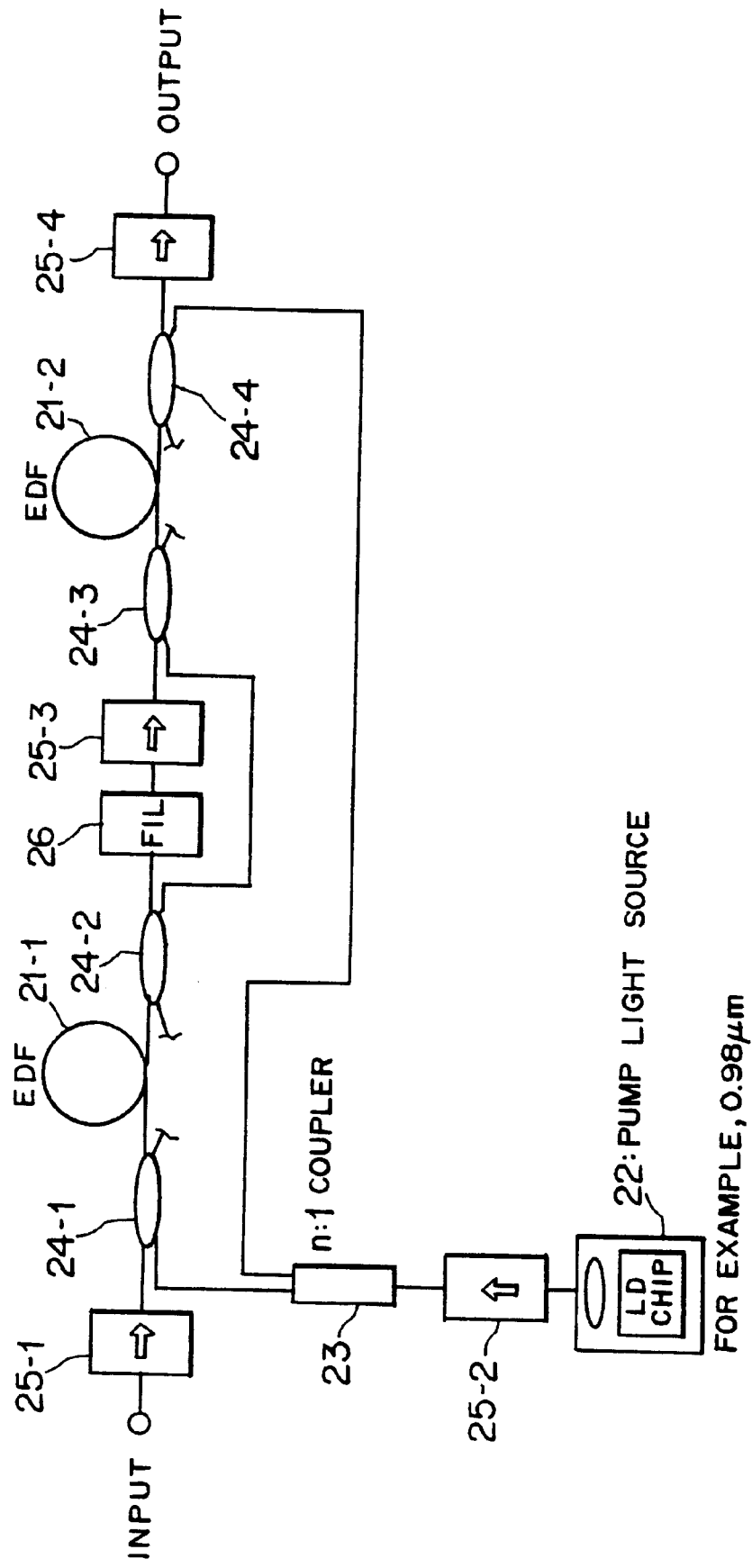
FIG. 23 is a block diagram of another optical fiber amplifier showing a second preferred embodiment of the present invention.

FIG. 23 is a block diagram showing a second preferred embodiment of the present invention. Referring to FIG. 23, the optical fiber amplifier shown includes an isolator 25-1, an optical demultiplexer-multiplexer (first coupler) 24-1, an erbium-doped-fiber (rare earth doped fiber) 21-1, another optical demultiplexer-multiplexer (second coupler) 24-2, an optical filter 26, another isolator 25-3, a further optical demultiplexer-multiplexer (third coupler) 24-3, another erbium-doped-fiber (rare earth doped fiber) 21-2, a still further optical demultiplexer-multiplexer (fourth coupler) 24-4 and a further isolator 25-4 disposed in this order from the input side.

An optical signal line including the optical filter 26 and the isolator 25-3 and a pump light line are provided in parallel between the optical demultiplexer-multiplexers 24-2 and 24-3.

A pump source 22 is connected to the optical demultiplexer-multiplexer 24-1 by way of an optical branching element 23 and a still further isolator 25-2.

The optical branching element 23 branches pump power from the pump source 22 (whose wavelength is, for example, 0.98 μm) at the ratio of n:1 (n is a real number equal to or greater than 1). The light branched by the optical branching element 23 (and having, for example, lower power) is supplied to the optical demultiplexer-multiplexer 24-1 while the other light branched by the optical branching element 23 (and having, for example, higher power) is supplied to the optical demultiplexer-multiplexer 24-4.

In particular, the optical fiber amplifier which includes the erbium-doped-fibers 21-2 and 21-2 disposed at the two front and rear stages as shown in FIG. 23 includes a first element for branching pump power at the ratio of n:1 (n is a real number equal to or greater than 1) by means of the optical branching element 23, multiplexing the pump light from one output port of the optical branching element 23 with signal light by the optical demultiplexer-multiplexer 24-1 and introducing the thus multiplexed light into one end of the erbium-doped-fiber 21-1, a second element for extracting residual pump power originating from the pump light introduced into the one end of the erbium-doped-fiber 21-1 by the first element by means of the optical demultiplexer-multiplexer 24-2 connected to the other end of the erbium-doped-fiber 21-1, multiplexing the thus extracted residual pump power with the signal light by means of the optical demultiplexer-multiplexer 24-3 and introducing the thus multiplexed light into one end of the erbium-doped-fiber 21-2, and a third element for multiplexing the pump power from another port of the optical branching element 23 branched by the optical branching element 23 with the light outputted from the other end of the erbium-doped-fiber 21-2 by means of the optical demultiplexer-multiplexer 24-4.

In the optical fiber amplifier of the second embodiment having the construction described above, pump power is branched at the ratio of n:1 (n is a real number equal to or greater than 1) by the optical branching element 23, and the pump light from one port of the optical branching element 23 is multiplexed with signal light by the optical demultiplexer-multiplexer 24-1 and then introduced into the erbium-doped-fiber 21-1 at the front stage.

After the pump light is introduced into the input end of the erbium-doped-fiber 21-1, residual pump power is extracted by the optical demultiplexer-multiplexer 24-2 connected to the output end of the erbium-doped-fiber 21-1 and then multiplexed with the signal light by the optical demultiplexer-multiplexer 24-3. The thus multiplexed light is introduced into an input end of the erbium-doped-fiber 21-2 at the rear stage. It is to be noted that, while the signal light is inputted to the erbium-doped-fiber 21-2 at the rear stage by way of the optical filter 26 and the isolator 25-3, an ASE portion of the output of the erbium-doped-fiber 21-1 which exhibits a mountain-like shape in output characteristic (for example, a portion at 1.535 μm; refer to FIG. 46) is cut by the optical filter 26 (that is, the mountain is leveled into a flat shape or the shorter wavelength side than 1.538 μm is cut away).

Thereafter, the pump power from the other port of the optical branching element 23 branched by the optical branching element 23 is multiplexed with the signal light outputted from the output end of the erbium-doped-fiber 21-2 by the optical demultiplexer-multiplexer 24-4.

In this manner, in the present second embodiment, residual pump power which is produced when the average pump ratio is raised can be supplied also to the other erbium-doped-fiber. Further, since a single pump source is used commonly for the two erbium-doped-fibers and the distribution of the pump power to the erbium-doped-fibers 21-1 and 21-2 at the front and rear stages can be set suitably when required, the pump power can be utilized with a higher degree of efficiency, and consequently, the conversion efficiency can be improved remarkably.

It is to be noted that the modified optical fiber amplifier may be further modified such that input signal light is inputted by way of an optical circulator and output signal light is outputted by way of the optical circulator in a similar manner as in the arrangement shown in FIG. 18.

B2-1. Modification to the Second embodiment

Figure 24:
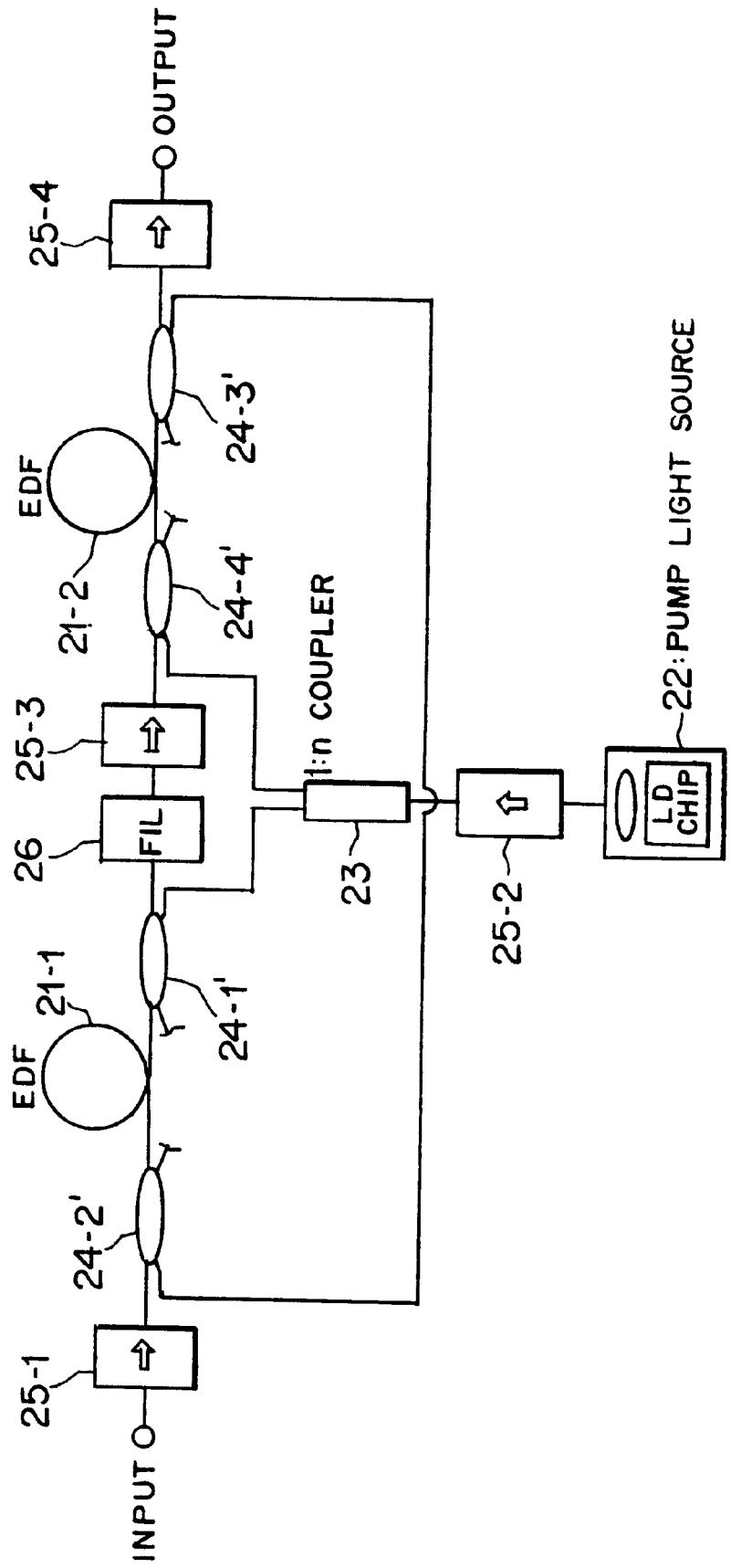
FIG. 24 is a block diagram showing a modification to the optical fiber amplifier of FIG. 23.

FIG. 24 is a block diagram showing a modification to second preferred embodiment of the present invention. Referring to FIG. 24, the modified optical fiber amplifier shown includes an isolator 25-1, an optical demultiplexer-multiplexer (second coupler) 24-2', an erbium-doped-fiber 21-1, another optical demultiplexer-multiplexer (first coupler) 24-1', an optical filter 26, another isolator 25-3, a further optical demultiplexer-multiplexer (fourth coupler) 24-4', another erbium-doped-fiber 21-2, a still further optical demultiplexer-multiplexer (third coupler) 24-3' and a further isolator 25-4 disposed in this order from the input side.

An optical signal line including the optical filter 26 and the isolator 25-3 and a pump light line are provided in parallel also between the optical demultiplexer-multiplexers 24-1' and 24-4'.

A pump source 22 is connected to the optical demultiplexer-multiplexers 24-1' and 24-4' by way of an optical branching element 23 and a still further isolator 25-2.

Thus, also the optical fiber amplifier shown in FIG. 24 includes a first element for branching pump power at the ratio of n:1 (n is a real number equal to or greater than 1) by means of the optical branching element 23, multiplexing the pump light from one output port of the optical branching element 23 with signal light by the optical demultiplexer-multiplexer 24-1' and introducing the thus multiplexed light into one end of the erbium-doped-fiber 21-1, a second element for extracting residual pump power originating from the pump light introduced into the one end of the erbium-doped-fiber 21-1 by the first element by means of the optical demultiplexer-multiplexer 24-2' connected to the other end of the erbium-doped-fiber 21-1, multiplexing the thus extracted residual pump power with the signal light by means of the optical demultiplexer-multiplexer 24-3' and introducing the thus multiplexed light into one end of the erbium-doped-fiber 21-2, and a third element for multiplexing the pump power from another port of the optical branching element 23 branched by the optical branching element 23 with the light outputted from the other end of the erbium-doped-fiber 21-2 by means of the optical demultiplexer-multiplexer 24-4'.

In the modified optical fiber amplifier shown in FIG. 24 and having the construction described above, pump power is branched at the ratio of n:1 (n is a real number equal to or greater than 1) by the optical branching element 23, and pump light from one port of the optical branching element 23 is multiplexed with signal light by the optical demultiplexer-multiplexer 24-1' and then introduced into the output end of the erbium-doped-fiber 21-1 at the front stage.

After the pump light is introduced into the output end of the erbium-doped-fiber 21-1, residual pump power is extracted by the optical demultiplexer-multiplexer 24-2' connected to the input end of the erbium-doped-fiber 21-1 and then multiplexed with the signal light by the optical demultiplexer-multiplexer 24-3'. The thus multiplexed light is introduced into the output end of the erbium-doped-fiber 21-2 at the rear stage. It is to be noted that the signal light is inputted to the erbium-doped-fiber 21-2 at the rear stage by way of the optical filter 26 and the isolator 25-3.

Thereafter, the pump power from the other port of the optical branching element 23 branched by the optical branching element 23 is multiplexed with the signal light outputted from the input end of the erbium-doped-fiber 21-2 by the optical demultiplexer-multiplexer 24-4'.

In this manner, also in the modified optical fiber amplifier, residual pump power which is produced when the average pump ratio is raised can be supplied also to the other erbium-doped-fiber. Further, since a single pump source is used commonly for the two erbium-doped-fibers and the distribution of the pump power to the erbium-doped-fibers 21-1 and 21-2 at the front and rear stages can be set suitably when required, the pump power can be utilized with a higher degree of efficiency, and consequently, the conversion efficiency can be improved remarkably.

It is to be noted that also the present modified optical fiber amplifier may be further modified such that input signal light is inputted by way of an optical circulator and output signal light is outputted by way of the same optical circulator in a similar manner as in the arrangement shown in FIG. 18.

B3. Third Embodiment

Figure 25:
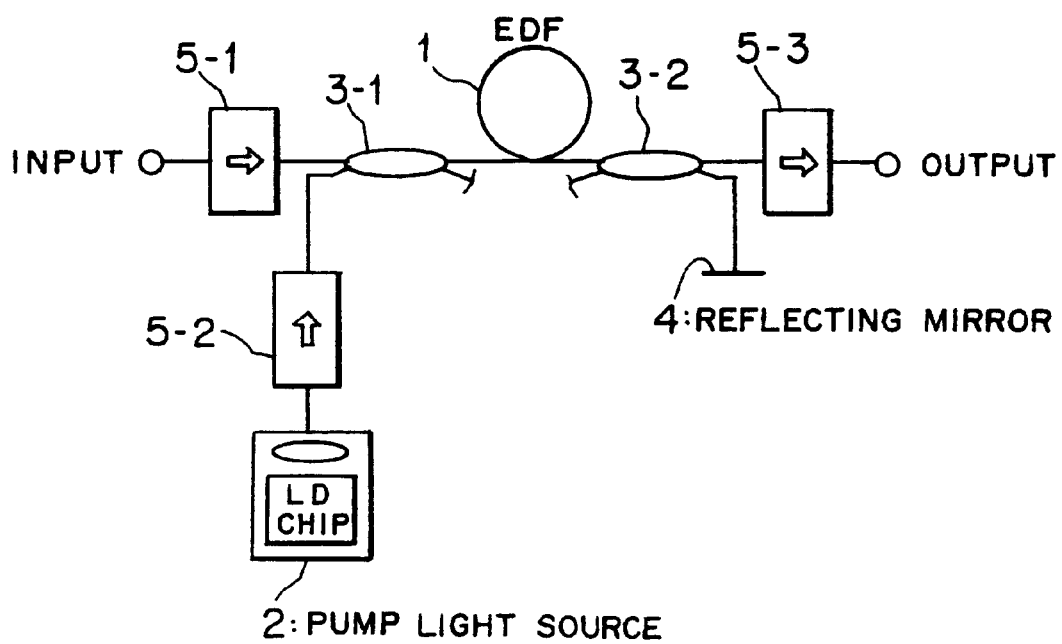
FIGS. 25 to 27 are block diagrams of further optical fiber amplifiers showing third, fourth and fifth preferred embodiment of the present invention, respectively.

FIG. 25 is a block diagram showing a third preferred embodiment of the present invention. Referring to FIG. 25, the optical fiber amplifier shown includes an isolator 5-1, an optical demultiplexer-multiplexer 3-1, an erbium-doped-fiber (rare earth doped fiber) 1, another optical demultiplexer-multiplexer 3-2, and another isolator 5-3 disposed in this order from the input side. A pump source 2 is connected to the optical demultiplexer-multiplexer 3-1 by way of a further isolator 5-2. A reflecting mirror (reflection element) 4 is connected to the optical demultiplexer-multiplexer 3-2.

In particular, the optical fiber amplifier shown in FIG. 25 includes a first element for introducing pump light into an input end of the erbium-doped-fiber 1 by means of the optical demultiplexer-multiplexer 3-1, and a second element for demultiplexing residual pump light originating from the pump light introduced into the input end of the erbium-doped-fiber 1 by the first element and arriving at the output end of the erbium-doped-fiber 1 by means of the optical demultiplexer-multiplexer 3-2 and reflecting the residual pump light by means of the reflecting element (reflecting mirror) 4 so as to introduce the residual pump light back into the erbium-doped-fiber 1.

A Faraday rotation reflecting mirror is used for the reflecting mirror 4.

In the optical fiber amplifier shown in FIG. 25 and having the construction described above, pump light is introduced into one end of the erbium-doped-fiber 1 by way of the optical demultiplexer-multiplexer 3-1, and residual pump light originating from the pump light introduced into the erbium-doped-fiber 1 and arriving at the other end of the erbium-doped-fiber 1 is demultiplexed by the optical demultiplexer-multiplexer 3-2 and then reflected by the reflecting mirror 4 so that it is introduced back into the erbium-doped-fiber 1.

Consequently, also in the present third embodiment, residual pump power which is produced when the average pump ratio is raised is reflected using the optical demultiplexer-multiplexer 3-2 and the reflecting mirror 4 prepared newly so as to go back through the erbium-doped-fiber 1. Accordingly, the pump power can be utilized efficiently, and as a result, improvement in conversion efficiency can be achieved.

Further, since a Faraday rotation reflecting mirror is used for the reflecting mirror 4, polarization of pump light can be rotated, and consequently, the PHB can be reduced.

Also the optical fiber amplifier of the present embodiment may be modified such that input signal light is inputted by way of an optical circulator and output signal light is outputted by way of the same optical circulator in a similar manner as in the arrangement shown in FIG. 18.

Further, pump light may alternatively be introduced into the output end of the erbium-doped-fiber 1 .

B4. Fourth Embodiment

Figure 26:
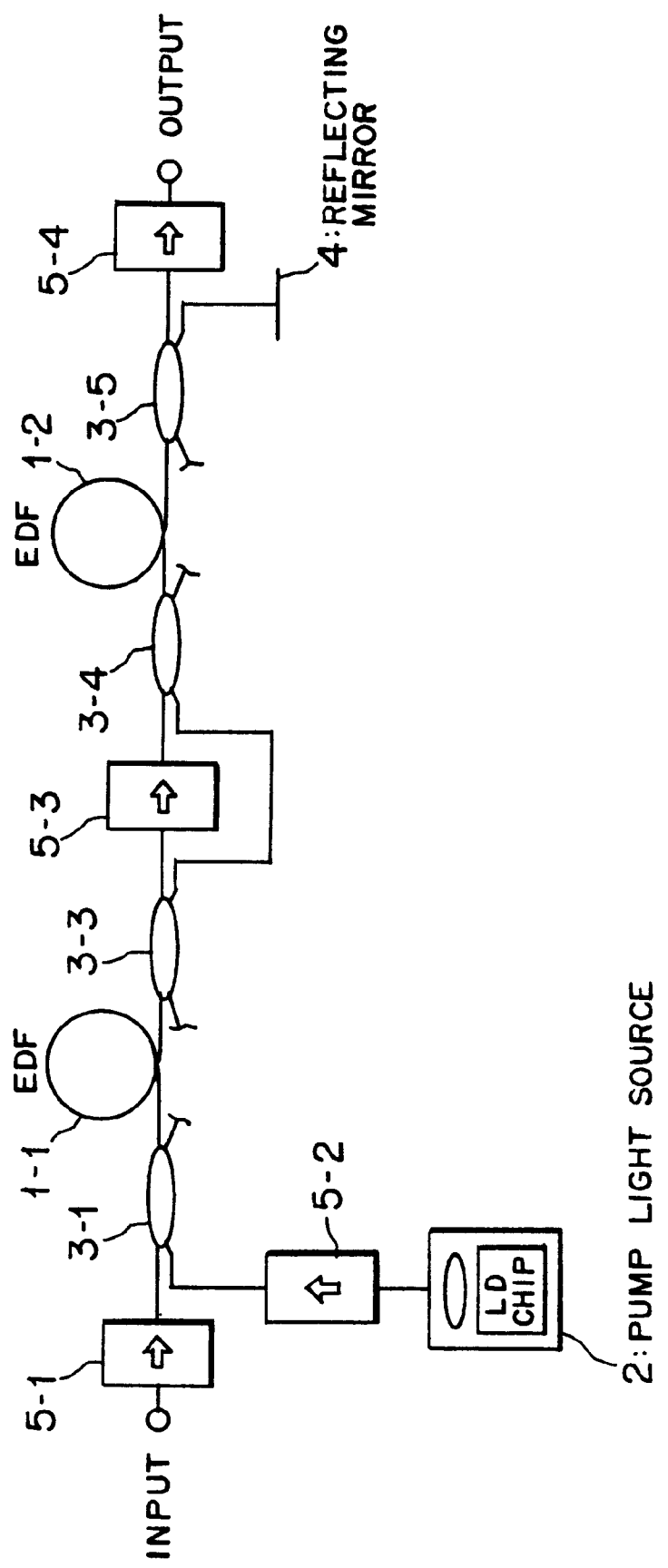

FIG. 26 is a block diagram showing a fourth preferred embodiment of the present invention. Referring to FIG. 26, the optical fiber amplifier shown includes an isolator 5-1, an optical demultiplexer-multiplexer 3-1, an erbium-doped-fiber (rare earth doped fiber) 1-1, another optical demultiplexer-multiplexer 3-3, another isolator 5-3, a further optical demultiplexer-multiplexer 3-4, another erbium-doped-fiber (rare earth doped fiber) 1-2, a still further optical demultiplexer-multiplexer 3-5, and a further isolator 5-4 disposed in this order from the input side.

An optical signal line including the isolator 5-3 and a pump light line are provided in parallel between the optical demultiplexer-multiplexers 3-3 and 3-4.

Also in the optical fiber amplifier of the present embodiment, a pump source 2 is connected to the optical demultiplexer-multiplexer 3-1 by way of a still further isolator 5-2. A reflecting mirror (Faraday rotation reflecting mirror) 4 is connected to the optical demultiplexer-multiplexer 3-5.

In the optical fiber amplifier shown in FIG. 26 and having the construction described above, pump light is introduced into the input end of the erbium-doped-fiber 1-1 by the optical demultiplexer-multiplexer 3-1. After the pump light is introduced into the input end of the erbium-doped-fiber 1-1 in this manner, residual pump power is extracted by the optical demultiplexer-multiplexer 3-3 connected to the output end of the erbium-doped-fiber 1-1 and then multiplexed with signal light by the optical demultiplexer-multiplexer 3-4. The thus multiplexed light is introduced into the input end of the erbium-doped-fiber 1-2 at the rear stage. It is to be noted that the signal light is inputted to the erbium-doped-fiber 1-2 at the rear stage by way of the isolator 5-3.

Thereafter, the residual pump light arriving at the output end of the erbium-doped-fiber 1-2 at the rear stage is demultiplexed by the optical demultiplexer-multiplexer 3-5 and then reflected by the reflecting mirror 4 so that it is introduced back into the erbium-doped-fibers 1-2 and 1-1.

Consequently, also in the present fourth embodiment, residual pump power which is produced when the average pump ratio is raised is reflected using the optical demultiplexer-multiplexer 3-5 and the reflecting mirror 4 prepared newly so as to go back through the erbium-doped-fibers 1-2 and 1-1. Accordingly, the pump power can be utilized efficiently, and as a result, improvement in conversion efficiency can be achieved.

Further, since a Faraday rotation reflecting mirror is used for the reflecting mirror 4, polarization of pump light can be rotated, and consequently, the PHB can be reduced.

Furthermore, also the optical fiber amplifier of the present embodiment may be modified such that input signal light is inputted by way of an optical circulator and output signal light is outputted by way of the same optical circulator in a similar manner as in the arrangement shown in FIG. 18.

While the erbium-doped-fiber which makes use of reflected residual pump light is provided at a front stage in the embodiment described above, naturally the other erbium-doped-fiber provided at the rear stage may make use of reflected residual pump light.

B5. Fifth Embodiment

Figure 27:
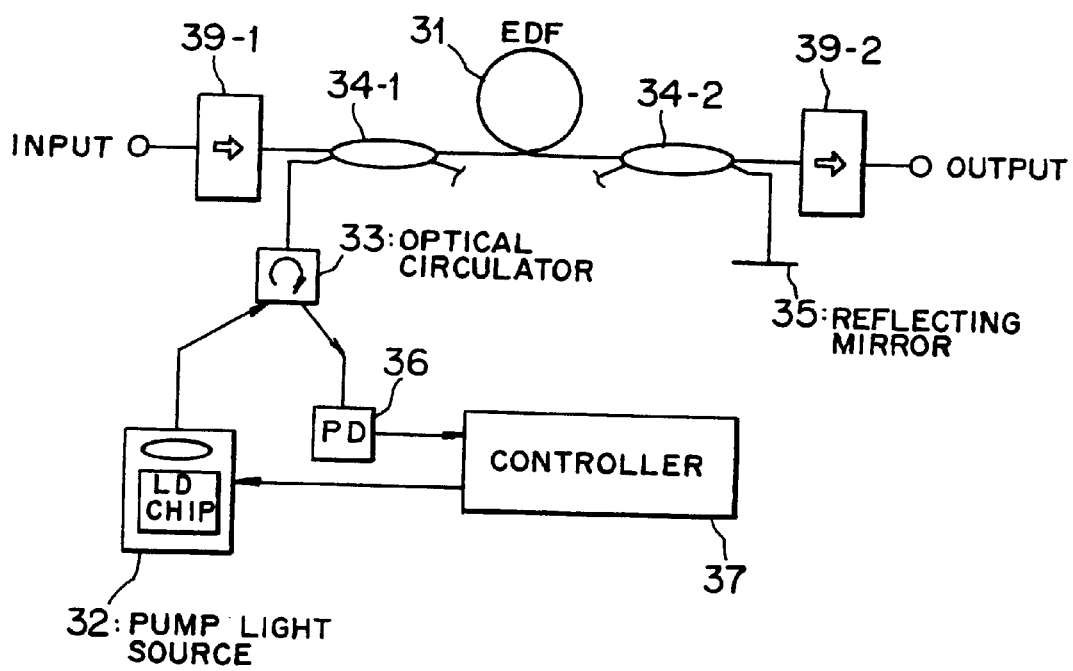

FIG. 27 is a block diagram showing a fifth preferred embodiment of the present invention. Referring to FIG. 27, also the optical fiber amplifier shown includes an isolator 39-1, an optical demultiplexer-multiplexer 34-1, an erbium-doped-fiber (rare earth doped fiber) 31, another optical demultiplexer-multiplexer 34-2, and another isolator 39-2 disposed in this order from the input side similarly as in the third embodiment described hereinabove. Further, a pump source 32 is connected to the optical demultiplexer-multiplexer 34-1 by way of an optical circulator 33 of the three port type. Furthermore, a reflecting mirror (Faraday rotation reflecting mirror) 35 is connected to the optical demultiplexer-multiplexer 34-2.

A residual pump light detector 36 is connected to the optical circulator 33 so that residual pump light returned into the erbium-doped-fiber 31 from the reflecting mirror 35 and inputted to the optical circulator 33 by way of the erbium-doped-fiber 31 and the optical demultiplexer-multiplexer 34-1 may be detected by the residual pump light detector 36.

The optical fiber amplifier further includes a controller 37 for controlling the pump source 32 so that residual pump light detected by the residual pump light detector 36 may be constant.

Figures 28, 29:
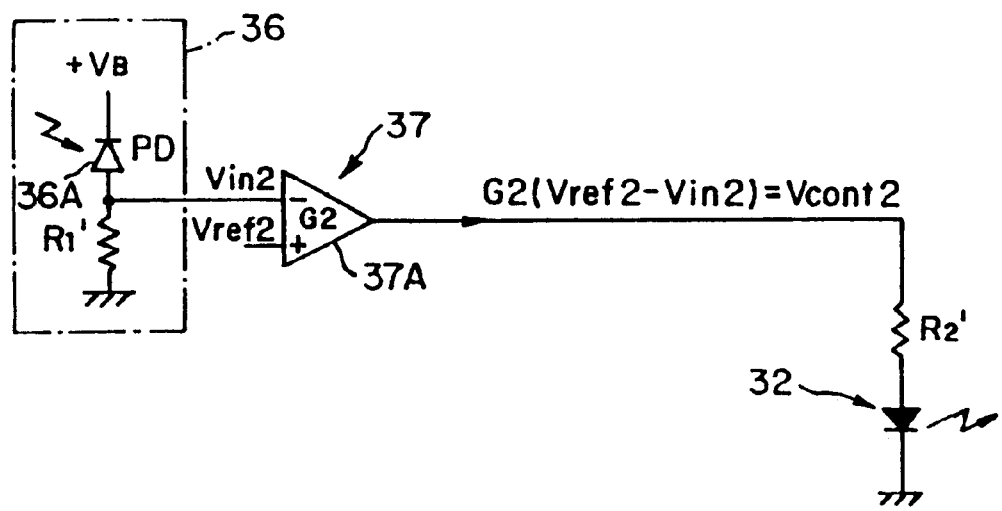
FIG. 28 is an electric circuit diagram showing a constant pump light output control system shown in FIG. 27.
FIG. 29 is a table illustrating operation of the constant pump light output control system of FIG. 28.

In particular, referring to FIG. 28, the residual pump light detector 36 includes a photodiode 36A. A detection value Vin2 by the photodiode 36A is inputted to a differential amplifier 37A which forms the controller 37. The differential amplifier 37A supplies a difference G2 between a reference value Vref2 and the detection value Vin2 as a control signal Vcont2 to a laser diode which forms the pump source 32.

The relationship among the output optical power, the control signal Vcont2 and the output of the laser diode is such as illustrated in FIG. 29.

As can be recognized apparently also from the construction described above, the optical fiber amplifier shown in FIG. 27 is so constructed as to realize such control of the pump source 32 that residual pump light detected by the residual pump light detector 36 may be constant.

Consequently, also with the present fifth embodiment, efficient utilization of the pump power can be achieved and improvement in conversion efficiency can be achieved. In addition, by monitoring the residual pump power, the average pump ratio can be kept constant to keep the wavelength dependency of the gain constant with respect to the variation of the input power.

B5-1. First Modification to the Fifth Embodiment

Figure 30:
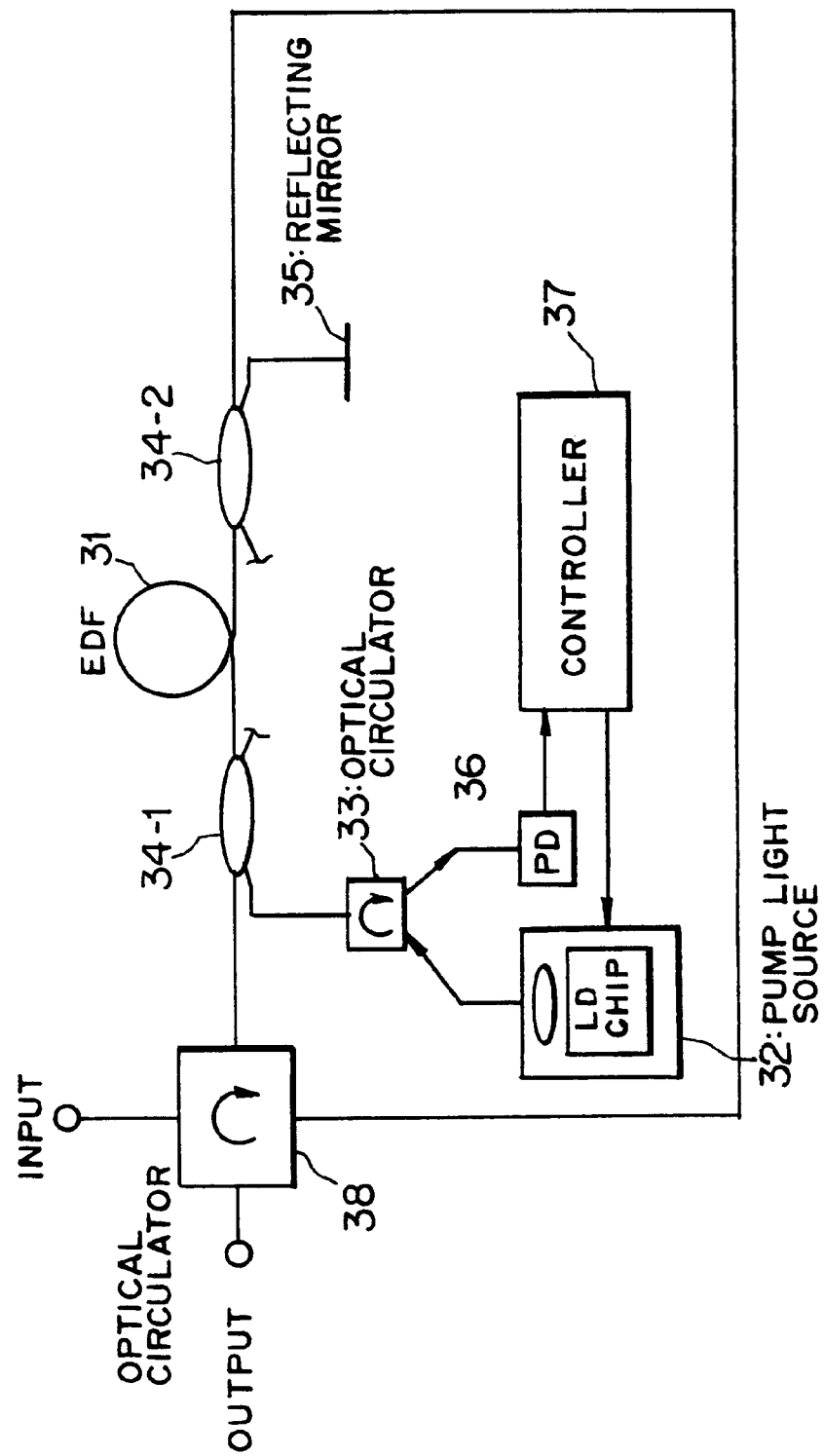
FIGS. 30 and 31 are block diagrams showing different modifications to the optical fiber amplifier of FIG. 27.

FIG. 30 is a block diagram showing a first modification to the fifth embodiment of the present invention. The modified optical fiber amplifier shown in FIG. 30 is a modification to the optical fiber amplifier of the construction shown in FIG. 27 in that input signal light is inputted by way of an optical circulator 38, which is provided additionally, and output signal light is outputted by way of the same optical circulator 38. Due to the construction, advantages or effects achieved by the fifth embodiment described above can be achieved, and besides, since the optical circulator 38 is provided at the input and output portions of the optical fiber amplifier, the modified optical fiber amplifier is advantageous in that the number of isolators to be used can be reduced and reduction in cost can be achieved.

B5-2. Second Modification to the Fifth Embodiment

Figure 31:
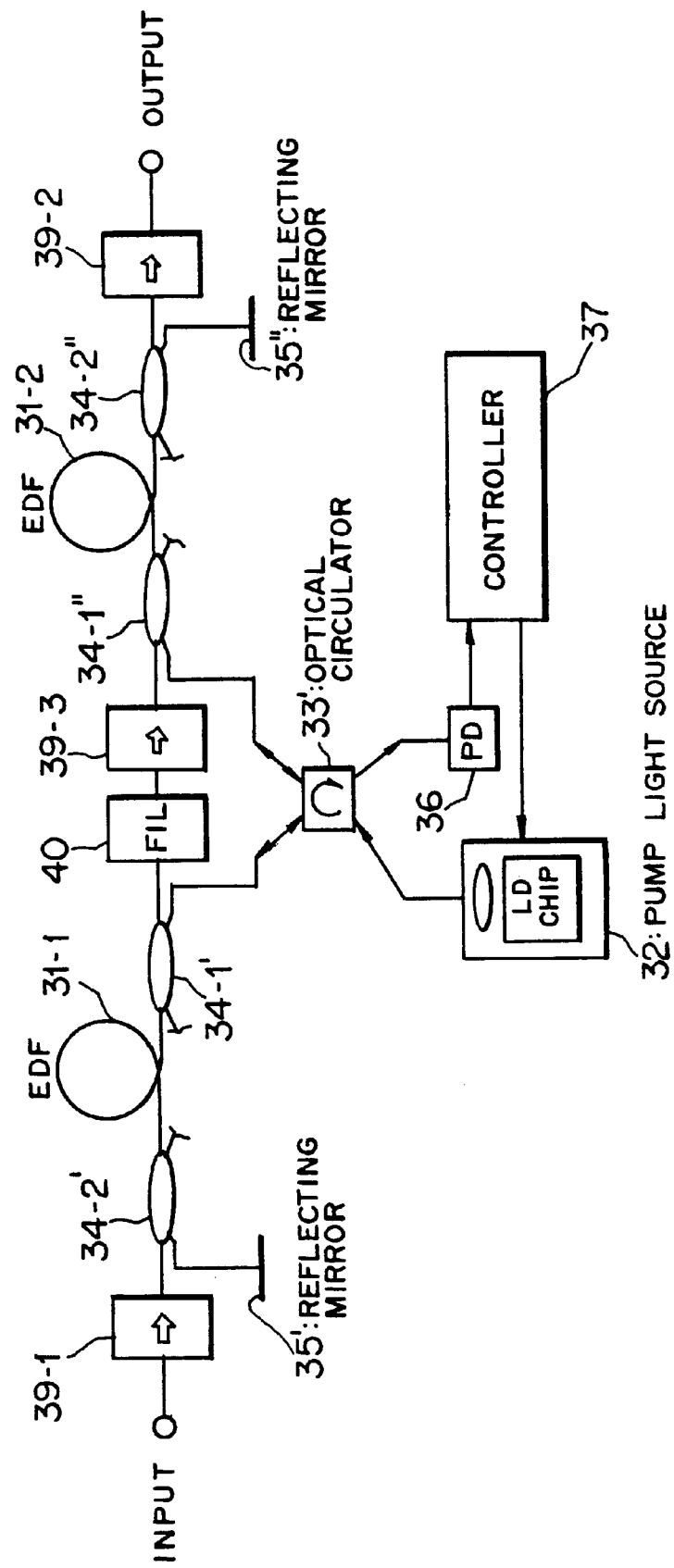

FIG. 31 is a block diagram showing a second modification to the fifth embodiment of the present invention. The modified optical fiber amplifier shown in FIG. 31 includes an isolator 39-1, an optical demultiplexer-multiplexer 34-2', an erbium-doped-fiber 31-1, another optical demultiplexer-multiplexer 34-1', an optical filter 40, another isolator 39-3, a further optical demultiplexer-multiplexer 34-1", another erbium-doped-fiber 31-2, a still further optical demultiplexer-multiplexer 34-2", and a further isolator 39-2 disposed in this order from the input side.

A pump source 32 is connected to the optical demultiplexer-multiplexers 34-1' and 34-1" by way of an optical circulator 33' of the four port type. Furthermore, a pair of reflecting mirrors (Faraday rotation reflecting mirrors) 35' and 35" are connected to the optical demultiplexer-multiplexers 34-2' and 34-2", respectively.

A residual pump light detector 36 is connected to the optical circulator 33' so that residual pump light returned into the erbium-doped-fibers 31-1 and 31-2 from the reflecting mirrors 35' and 35" and inputted to the optical circulator 33' by way of the erbium-doped-fibers 31-1 and 31-2 and the optical demultiplexer-multiplexers 34-1' and 34-1", respectively, may be detected by the residual pump light detector 36.

The optical fiber amplifier further includes a controller 37 for controlling the pump source 32 so that residual pump light detected by the residual pump light detector 36 may be constant.

As can be recognized apparently also from the construction described above, the optical fiber amplifier shown in FIG. 31 is so constructed as to realize such control of the pump source 32 that residual pump light from the erbium-doped-fibers 31-1 and 31-2 detected by the residual pump light detector 36 may be constant.

Consequently, also with the modified optical fiber amplifier, similar advantages or effects to those of the fifth embodiment described above can be achieved.

Furthermore, also the modified optical fiber amplifier may be modified such that input signal light is inputted by way of an optical circulator and output signal light is outputted by way of the same optical circulator in a similar manner as in the arrangement shown in FIG. 30.

B6. Sixth Embodiment

Figure 32:
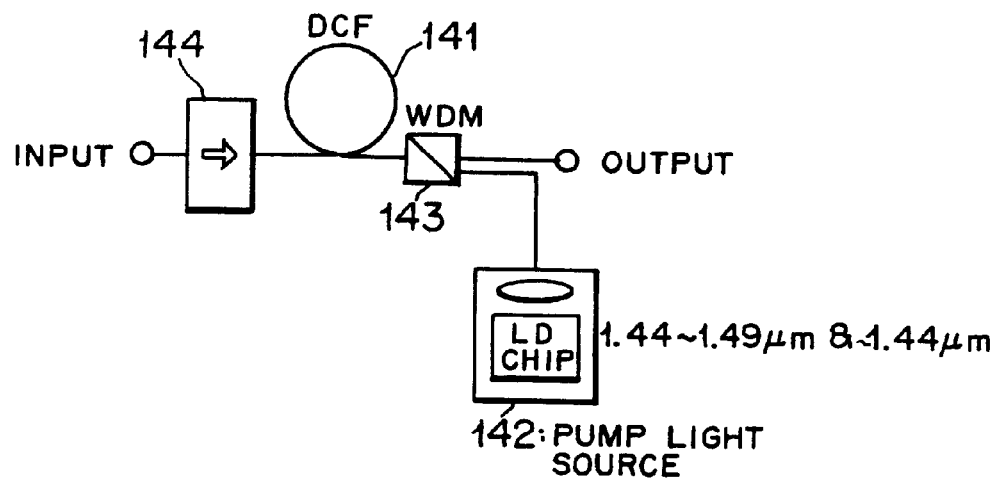
FIG. 32 is a block diagram of a still further optical fiber amplifier showing a sixth preferred embodiment of the present invention.

FIG. 32 is a block diagram showing a sixth preferred embodiment of the present invention. The optical fiber amplifier shown in FIG. 32 includes an isolator 144, a dispersion compensating fiber 141 and a optical demultiplexer-multiplexer 143 disposed in this order from the input side. A pump source 142 is connected to the optical demultiplexer-multiplexer 143.

The pump source 142 is formed from a pump source which produces pump light of a band (for example, from 1.44 to 1.49 $\mu$m) in which band compensation for erbium-doped-fiber amplification by Raman amplification can be performed. pump light from the pump source 142 is introduced into an output end of the dispersion compensating fiber 141 by way of the optical demultiplexer-multiplexer 143.

Accordingly, the optical fiber amplifier includes a dispersion compensating fiber module which includes the dispersion compensating fiber 141 and the pump source 142.

Due to the construction described above, the dispersion compensating fiber 141 can be pumped with pump light from the pump source 142 to cause Raman amplification to occur. In particular, since the mode field diameter of the dispersion compensating fiber 141 is generally small, the threshold level of the Raman amplification is low, and consequently, Raman amplification occurs readily.

By the way, the dispersion compensating fiber has the following characteristic.

In particular, the dispersion compensating fiber (DCF) is so small in diameter that the mode field diameter thereof is approximately one half that of an ordinary fiber and provides nonlinear effects (stimulated Raman scattering (SRS), stimulated Brillouin scattering (SBS), four wave mixing (FWM), self phase modulation effect (SPM) and so forth) more likely than a fiber which is used as a transmission line. It is to be noted that, since the dispersion compensating fiber is, in its form of use, not so long as a fiber which is used as a transmission line, it is known that it can be used if the optical power of light to pass it is set low. This is because also the influence of nonlinear effects increases as the length increases.

Also it is known that the the attenuation (loss) of light by the dispersion compensating fiber is not ignorable, and accordingly, the loss must be compensated for using an optical amplifier.

Meanwhile, the input power is restricted to a low value as described hereinabove, which makes it difficult to design the level as an optical amplifier.

However, some of the nonlinear effects mentioned above are harmful upon communication, but some others are useful for communication. Among the nonlinear effects, the Raman amplification is useful.

The Raman amplification may possibly be very useful in the following point. In particular, if a dispersion compensating fiber performs Raman amplification, then the dispersion compensating fiber itself acts as an optical amplifier and can compensate for the loss.

It is to be noted that the Raman amplification signifies that, making use of stimulated Raman scattering, that is, a phenomenon that, when intense monochromatic light is irradiated upon an optical fiber, it coacts with optical phonons of the optical fiber so that coherent Stokes light displaced by an intrinsic amount in wavelength is generated by stimulated emission, the wavelength of the monochromatic light is set so that the Stokes light may have an equal wavelength to that of the signal light thereby to amplify the signal light by stimulated emission.

Accordingly, by pumping the dispersion compensating fiber 141 with pump light of the band described above from the pump source 142 to cause Raman amplification to occur as described above, compensation for the loss of the dispersion compensating fiber (including leveling of a concave in gain of an erbium-doped fiber and complementary compensation for a decrease in gain of an erbium-doped-fiber) can be achieved by the Raman amplification.

It is to be noted that, in order to level a concave in gain in the 1.54 $\mu$m band of an erbium-doped-fiber, the erbium-doped-fiber is pumped with pump light of the wavelength equal to or less than 1.44 $\mu$m to cause Raman amplification to occur.

Figure 33:
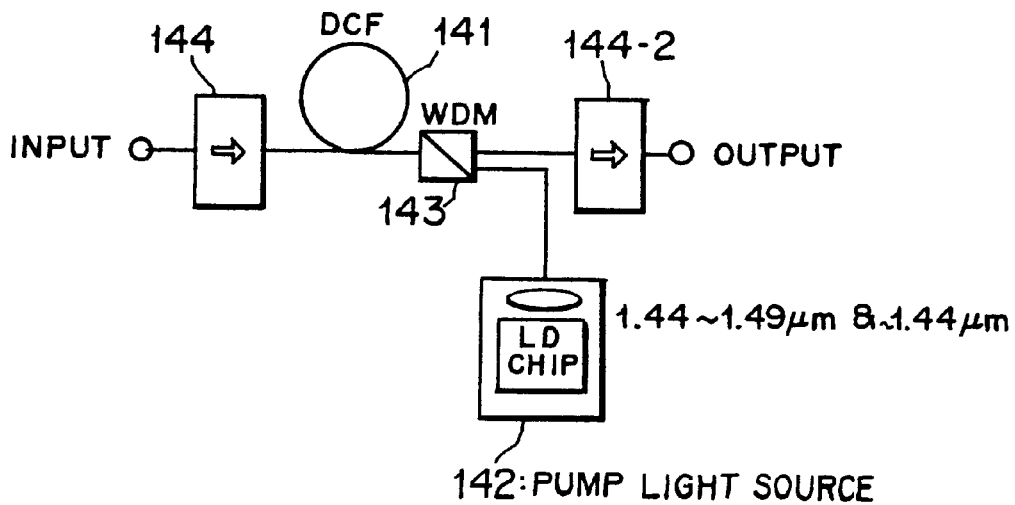
FIG. 33 is a block diagram showing a modification to the optical fiber amplifier of FIG. 32.

It is to be noted that another isolator 144-2 may be additionally provided on the output side as seen in FIG. 33.

The optical fiber amplifier of the present embodiment may be modified otherwise such that, in place of the provision of an isolator at the input portion or at both of the input and output portions of the optical fiber amplifier as seen in FIG. 32 or 33, input signal light is inputted by way of an optical circulator and output signal light is outputted by way of the same optical circulator in a similar manner as in the arrangement shown in FIG. 18 or 30.

Further, a silica-type-optical-fiber may be employed in place of the dispersion compensating fiber 141.

B7. Seventh Embodiment

Figure 34:
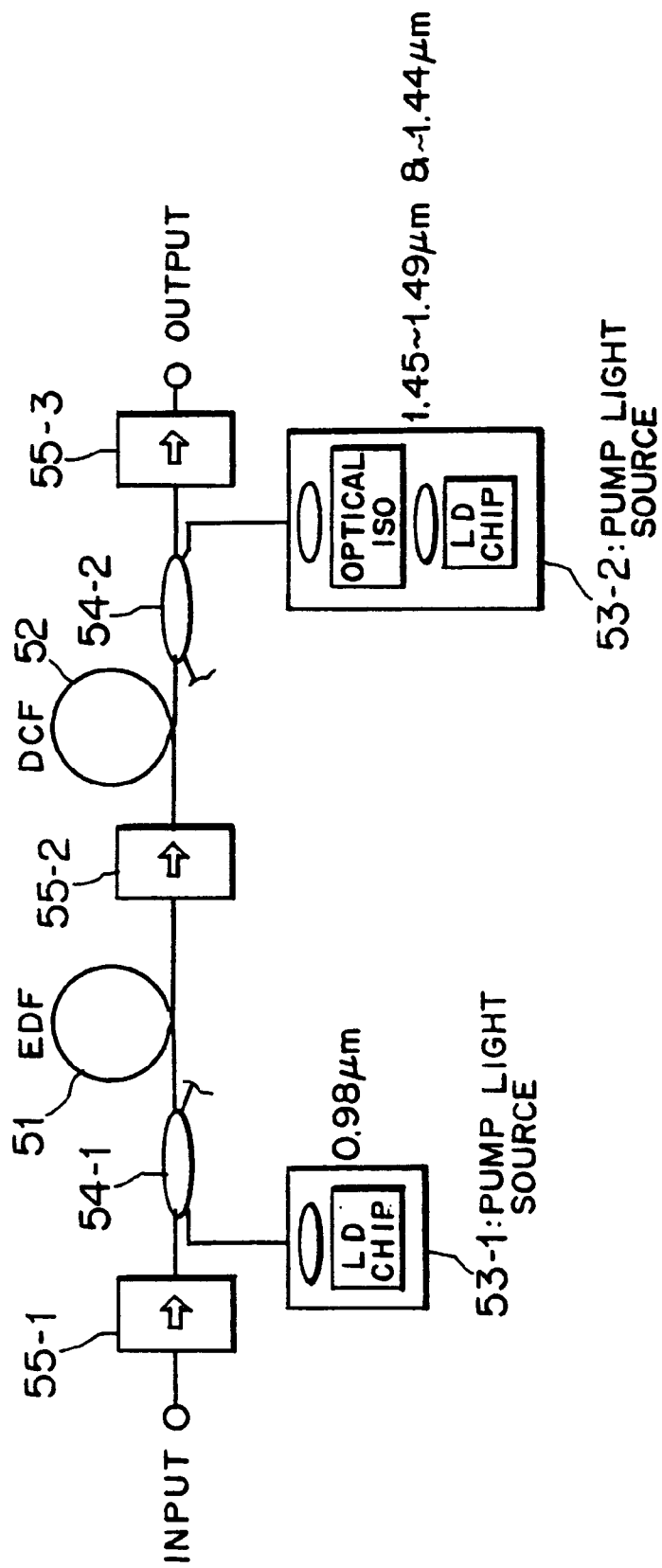
FIGS. 34 and 35 are block diagrams of yet further optical fiber amplifiers showing seventh and eighth preferred embodiments of the present invention, respectively.

FIG. 34 is a block diagram showing a seventh preferred embodiment of the present invention. Referring to FIG. 34, the optical fiber amplifier shown includes an isolator 55-1, an optical demultiplexer-multiplexer 54-1, an erbium-doped-fiber (rare earth doped fiber) 51, another isolator 55-2, a dispersion compensating fiber 52, another optical demultiplexer-multiplexer 54-2 and a further isolator 55-3 disposed in this order from the input side. Further, a pump source 53-1 is connected to the optical demultiplexer-multiplexer 54-1 while another pump source 53-2 is connected to the optical demultiplexer-multiplexer 54-2.

The pump source 53-1 produces pump light of a first wavelength band for the erbium-doped-fiber 51 (for example, the 0.98 $\mu$m band), and the pump source 53-2 produces pump light of a second wavelength band for the dispersion compensating fiber 52 (for example, the 1.47 $\mu$m band (1.45 to 1.49 $\mu$m) or the band up to 1.44 $\mu$m (equal to or less than 1.44 $\mu$m).

Consequently, the dispersion compensating fiber 52 can be pumped with pump light from the pump source 53-2 to cause Raman amplification to occur in accordance with the same principle as that of the sixth embodiment described hereinabove. Accordingly, also in the present embodiment, by pumping the dispersion compensating fiber 52 with pump light of the 1.47 $\mu$m band or the band up to 1.44 $\mu$m from the pump source 53-2 to cause Raman amplification to occur, compensation for the loss of the dispersion compensating fiber can be achieved by the Raman amplification.

Further, while the wavelength characteristic of the gain of a rare earth doped fiber optical amplifier depends upon rare earth ions, the wavelength characteristic of the gain of a Raman optical amplifier depends upon the pump wavelength and the peak value thereof is shifted if the pump wavelength is changed. Accordingly, the pump wavelength when Raman amplification is performed can be selected so that the wavelength characteristic of the gain of the rare earth doped fiber optical amplifier may be compensated for. This allows realization of an optical amplifier of a wide bandwidth.

In particular, also the Raman amplification involves an amplification band, and if the wavelength dependency of the gain by the Raman amplification is utilized, not only mere compensation for the loss of a dispersion compensating fiber can be achieved, but also the amplification bandwidth of an erbium-doped-fiber can be complemented to increase the bandwidth.

Figure 46:
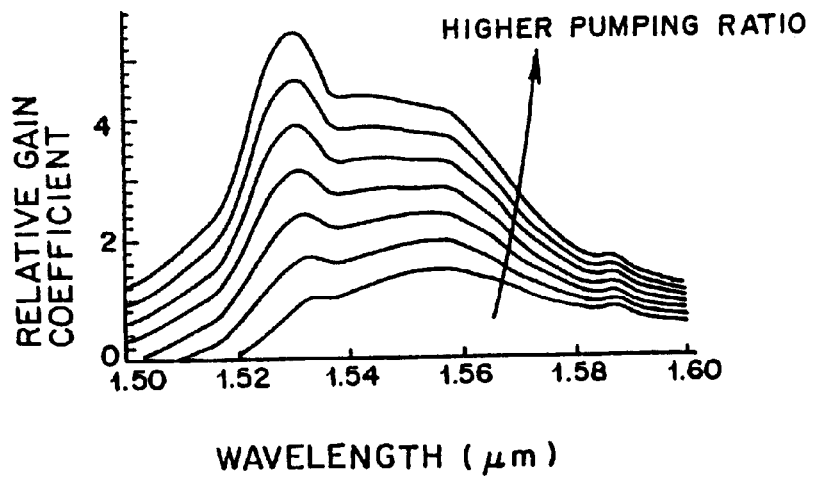
FIGS. 46 and 47 are diagrams illustrating wavelength characteristics of an optical fiber amplifier.
Figure 47:
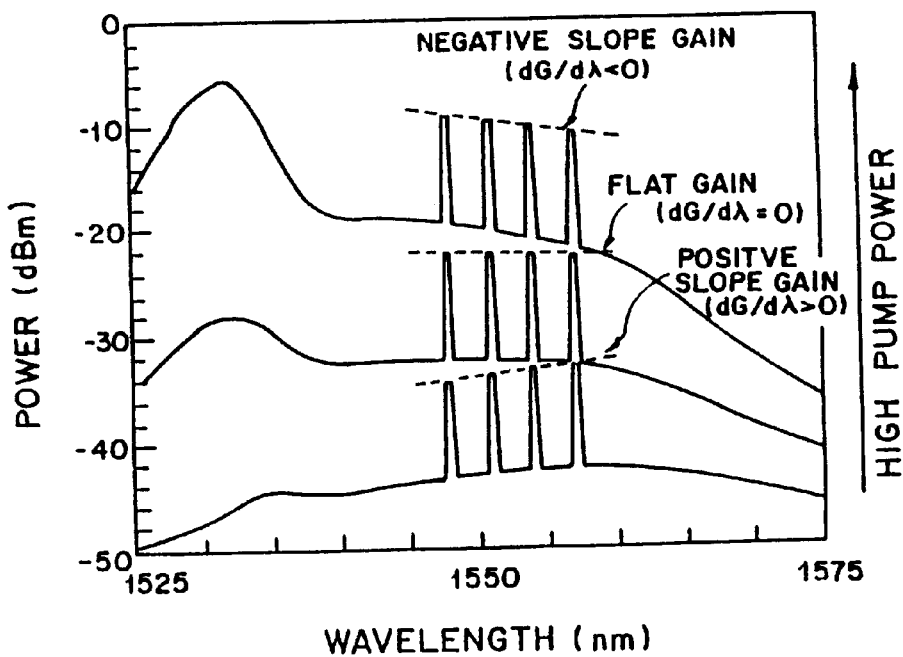

In other words, since the wavelength characteristic of an erbium-doped-fiber amplifier is not flat as seen in FIG. 46 or 47, by causing Raman amplification to occur using a dispersion compensating fiber, the unevenness of the wavelength characteristic of the erbium-doped-fiber amplifier can be leveled. As a result, a wide bandwidth optical amplifier can be realized, which is suitably used for multiple wavelength collective amplification (refer to FIG. 47) or the like.

It is to be noted that the rare earth doped fiber optical amplification element formed from an erbium-doped-fiber which is a rare earth doped fiber may be constructed as an optical amplification element having a low noise index.

Further, while the optical fiber amplifier shown in FIG. 34 is constructed such that the rare earth doped fiber optical amplification element formed from an erbium-doped-fiber is disposed as a front stage amplification element while the Raman optical amplification element formed from a dispersion compensating fiber is disposed as a rear stage amplification element, the construction of the optical fiber amplifier is not limited to the specific one described above and may be constructed otherwise such that a Raman optical amplification element formed from a dispersion compensating fiber or a silica-type-optical-fiber is disposed as a front stage amplification element while a rare earth doped fiber optical amplification element formed from an erbium-doped-fiber is disposed as a rear stage amplification element (where such Raman optical amplification element is formed from a silica-type-optical-fiber, a single pump source can be used commonly as a pump source for the silica-type-optical-fiber and another pump source for the erbium-doped-fiber).

Figure 43:
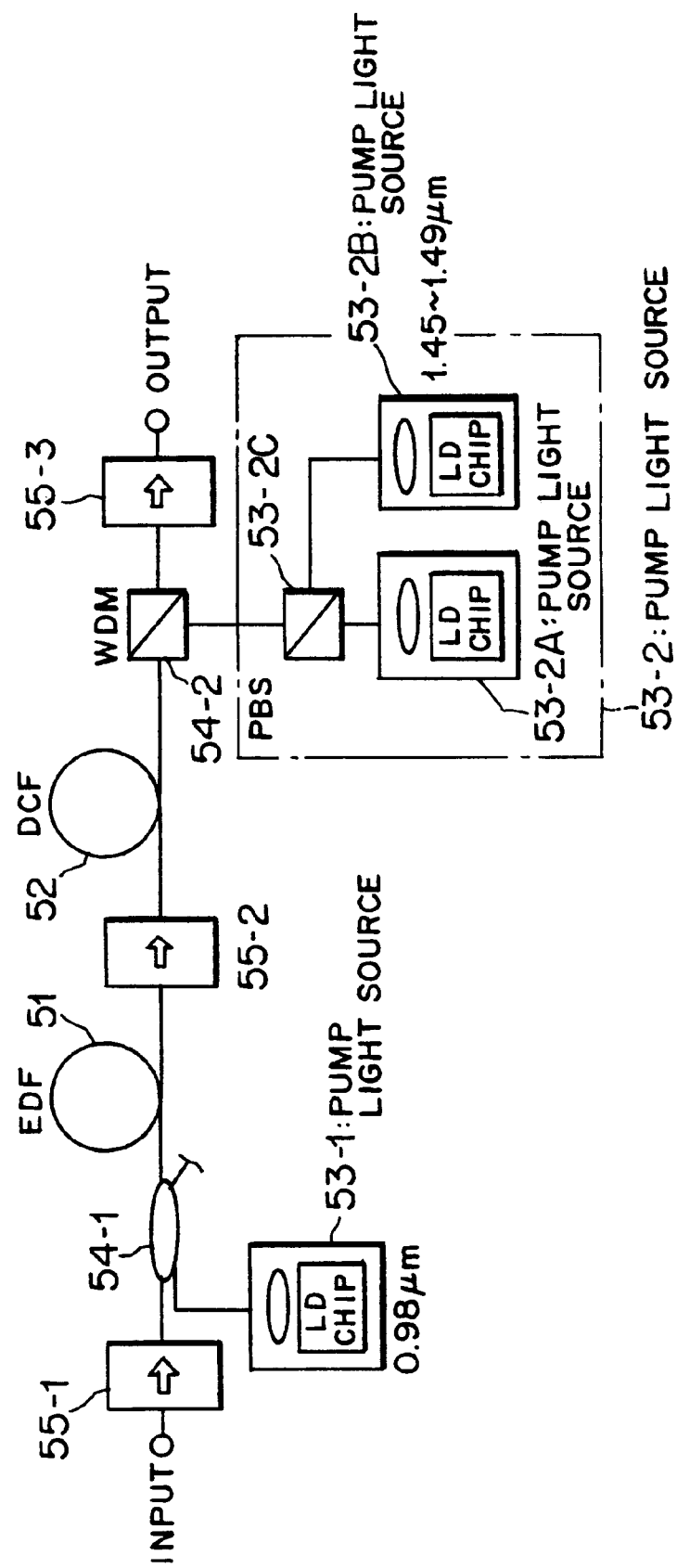
Figure 44:
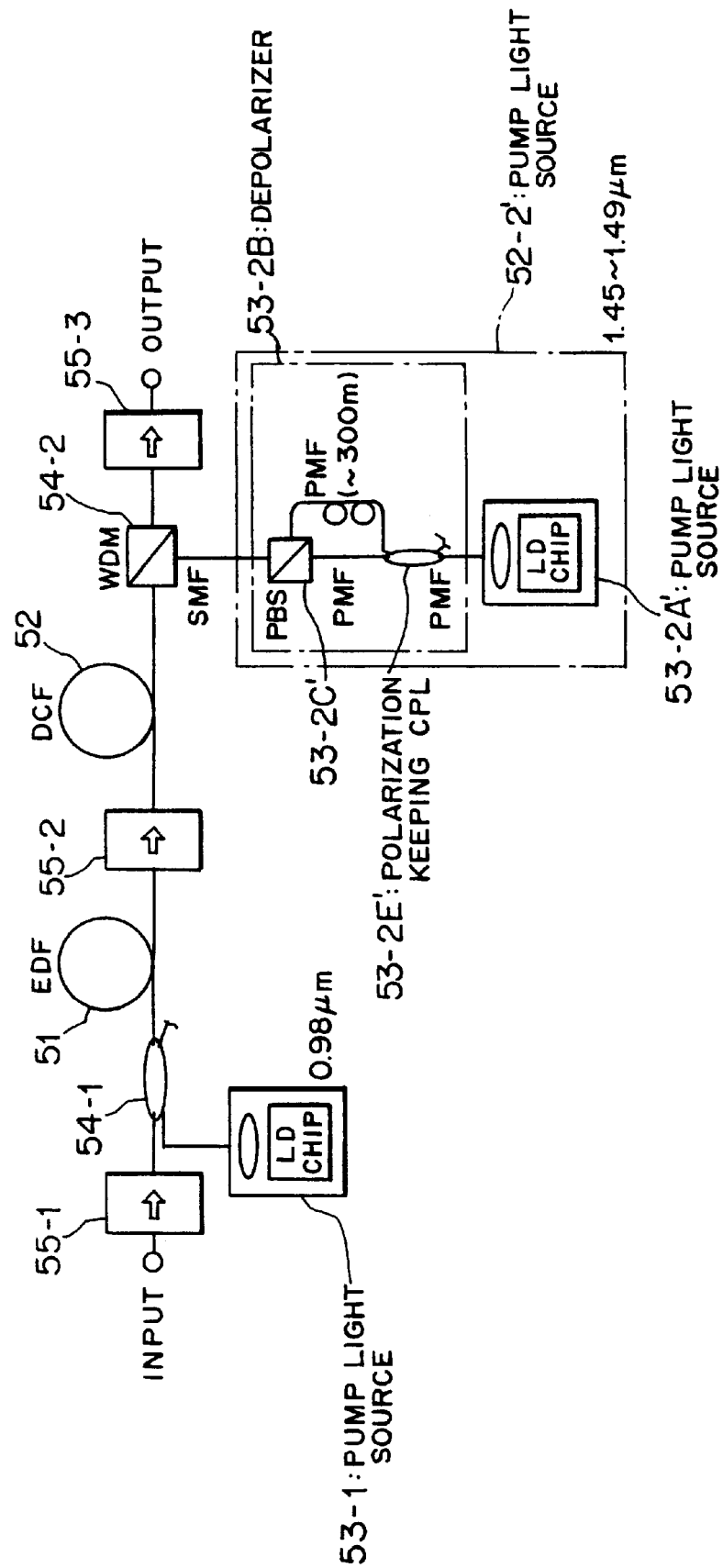
FIGS. 44 and 45 are block diagrams showing different modifications to the optical fiber amplifier of FIG. 43.
Figure 45:
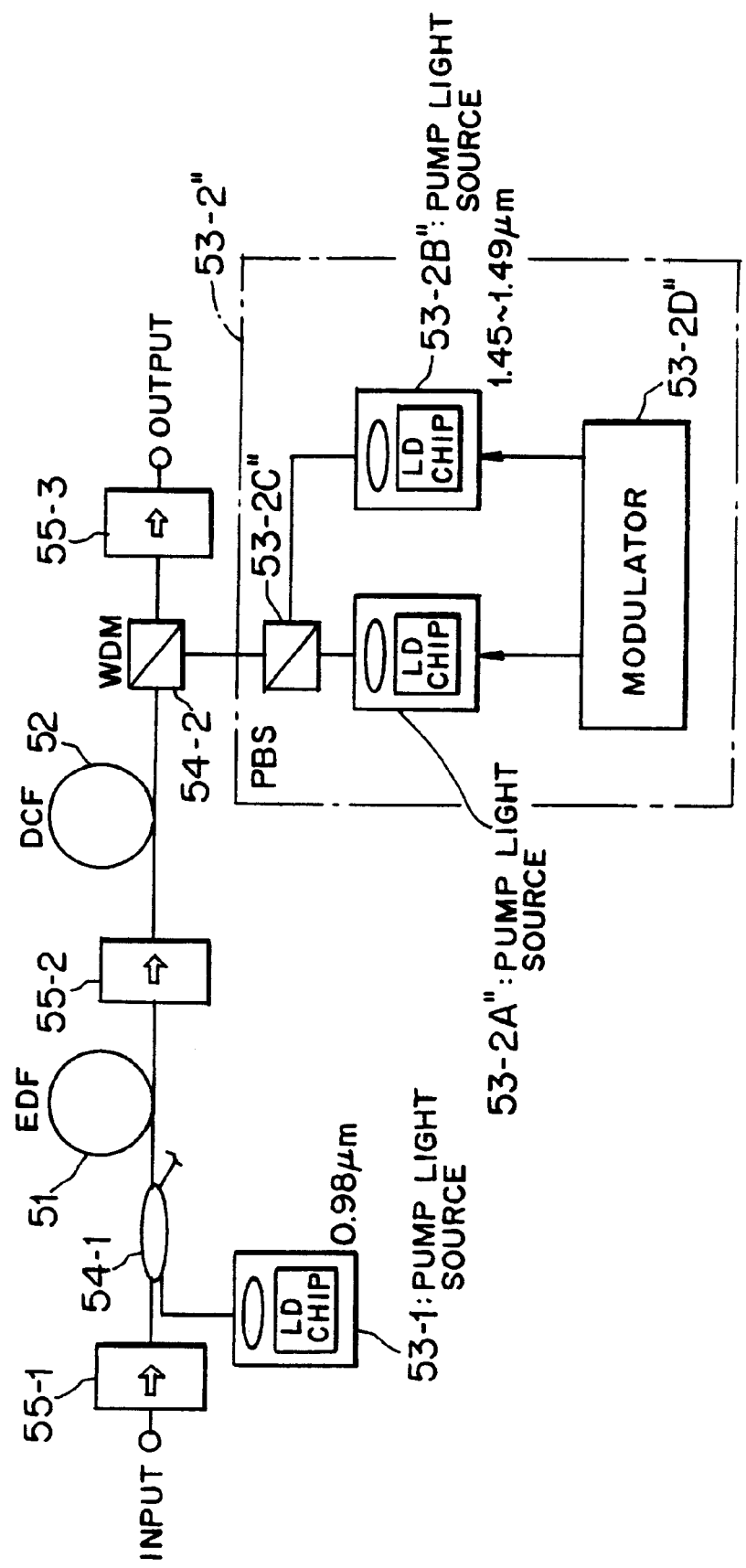

Further, the pump source 53-2 may be formed, for example, from a pair of pump sources and a polarizing multiplexer for orthogonally polarizing and multiplexing pump light from the pump sources similarly to pump sources 53-2, 53-2' and 53-2" shown in FIGS. 43 to 45. Or the pump source 53-2 may otherwise be formed from a combination of a pump source and a depolarizer by which pump light is depolarized or else may be formed so as to generate modulated pump light.

It is to be noted that the pump sources 53-2, 53-2' and 53-2" shown in FIGS. 43 to 45 will be hereinafter described in connection with a fourteenth embodiment of the present invention and first and second modifications to the fourteenth embodiment, respectively.

B8. Eighth Embodiment

Figure 35:
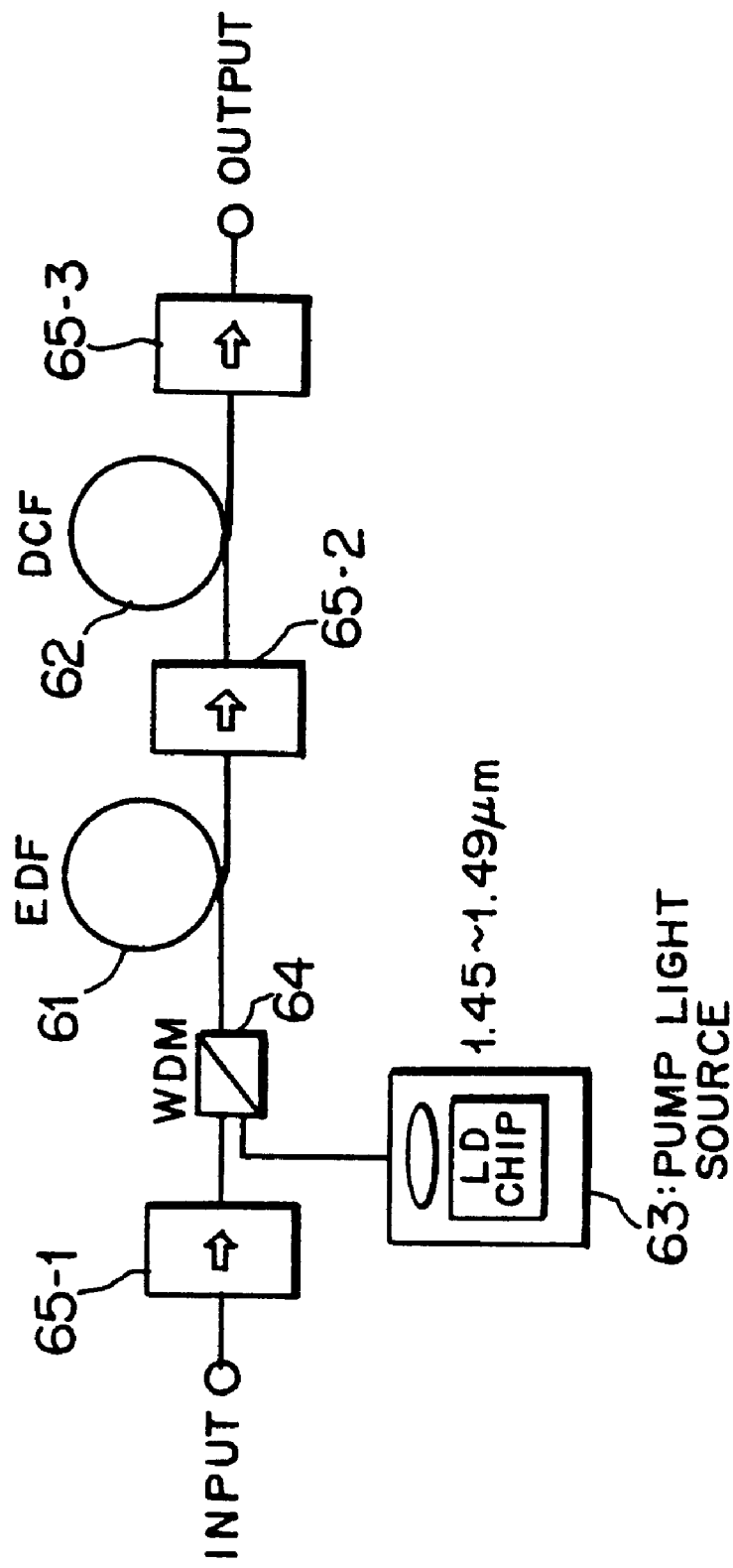

FIG. 35 is a block diagram showing an eighth preferred embodiment of the present invention. Referring to FIG. 35, the optical fiber amplifier shown includes an isolator 65-1, an optical demultiplexer-multiplexer 64, an erbium-doped-fiber (rare earth doped fiber) 61, another isolator 65-2, a dispersion compensating fiber 62, and a further isolator 65-3 disposed in this order from the input side. A pump source 63 is connected to the optical demultiplexer-multiplexer 64.

The pump source 63 produces pump light, for example, of the 1.47 μm band (1.45 to 1.49 μm).

In the optical fiber amplifier shown in FIG. 35 and having the construction described above, pump light is introduced into one end of the erbium-doped-fiber 61 from the optical demultiplexer-multiplexer 64 to pump the erbium-doped-fiber 61 to amplify signal light. Consequently, residual pump light arrives at the other end of the erbium-doped-fiber 61. Thereafter, the residual pump light is supplied by way of the isolator 65-2 to the dispersion compensating fiber 62 so that Raman amplification may occur in the dispersion compensating fiber 62.

The reason why signal light can be amplified by both of the erbium-doped-fiber and the dispersion compensating fiber using the common pump source to them is such as follows.

In particular, the pump wavelength band when signal light of the 1.55 μm band is Raman amplified is the 1.47 μm band (1.45 to 1.49 μm) which is the pump wavelength band of the erbium-doped-fiber (EDF), and accordingly, Raman amplification can be caused to occur using residual pump power when the EDF is pumped with light of the 1.47 band. From this reason, while optical amplification is performed by the erbium-doped-fiber 61, the loss of the dispersion compensating fiber 62 can be compensated for.

Consequently, similarly as in the seventh embodiment described hereinabove, a wide bandwidth optical amplifier wherein the unevenness of the wavelength characteristic of the erbium-doped-fiber amplifier is leveled can be realized, and the wide bandwidth optical amplifier can be suitably applied to multiple wavelength collective amplification. Further, since the single pump source is involved, the optical fiber amplifier can be constructed in simplified structure and at a reduced cost.

Also the optical fiber amplifier of the present embodiment may be modified such that, in place of the provision of an isolator at the input portion or at both of the input and output portions of the optical fiber amplifier, input signal light is inputted by way of an optical circulator and output signal light is outputted by way of the optical circulator in a similar manner as in the arrangement shown in FIG. 18 or 30.

Further, the pump source 63 may alternatively be formed from two pump sources and a polarizing multiplexer which orthogonally polarizes and multiplexes pump light from the pump sources or may otherwise be formed from a combination of a pump source and a depolarizer by means of which pump light is depolarized or else may generate modulated pump light.

B8-1. First Modification to the Eighth Embodiment

Figure 36:
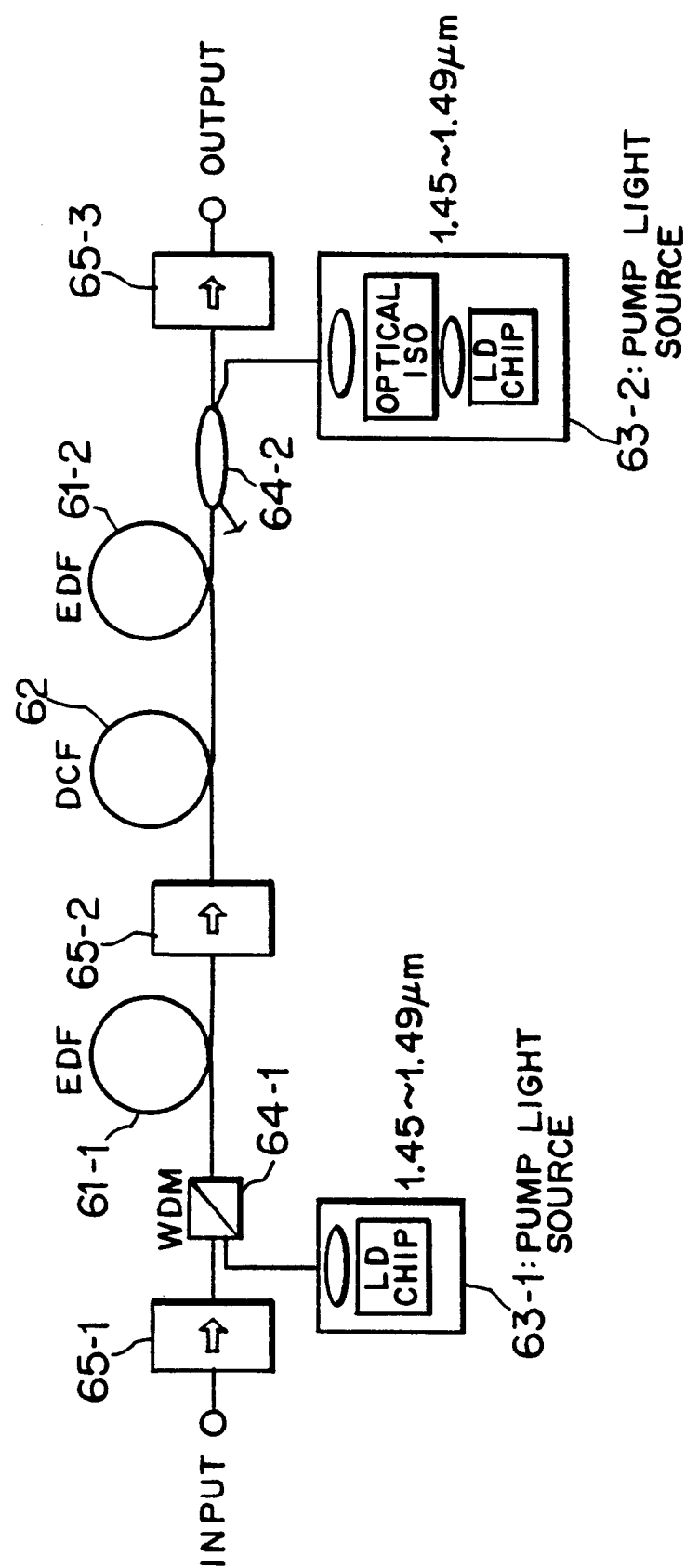
FIGS. 36 and 37 are block diagrams showing different modifications to the optical fiber amplifier of FIG. 35.

FIG. 36 is a block diagram showing a first modification to the eighth embodiment of the present invention. Referring to FIG. 36, the optical fiber amplifier shown includes an isolator 65-1, an optical demultiplexer-multiplexer 64-1, an erbium-doped-fiber (rare earth doped fiber) 61-1, another isolator 65-2, a dispersion compensating fiber 62, another erbium-doped-fiber (rare earth doped fiber) 61-2, another optical demultiplexer-multiplexer 64-2 and a further isolator 65-3 disposed in this order from the input side. A pump source 63-1 is connected to the optical demultiplexer-multiplexer 64-1, and another pump source 63-2 is connected to the optical demultiplexer-multiplexer 64-2.

The pump source 63-1 and 63-2 both produce pump light of, for example, the 1.47 μm band (1.45 to 1.49 μm).

In the optical fiber amplifier shown in FIG. 36 and having the construction described above, pump light from the pump source 63-1 is introduced into an input end of the erbium-doped-fiber 61-1 from the optical demultiplexer-multiplexer 64-1 to pump the erbium-doped-fiber 61-1 to amplify signal light. Consequently, residual pump light arrives at the other end of the erbium-doped-fiber 61-1. Thereafter, the residual pump light is supplied by way of the isolator 65-2 to the dispersion compensating fiber 62 so that Raman amplification may occur in the dispersion compensating fiber 62.

Meanwhile, pump light from the pump source 63-2 is introduced into an output end of the erbium-doped-fiber 61-2 by way of the optical demultiplexer-multiplexer 64-2 to pump the erbium-doped-fiber 61-2 to amplify the signal light. Also in this instance, residual pump light arrives at an input end of the erbium-doped-fiber 61-2. Further, also the residual pump light is supplied to the dispersion compensating fiber 62 so that Raman amplification may occur in the dispersion compensating fiber 62.

In this instance, since the dispersion compensating fiber 62 causes Raman amplification to occur using the residual pump light from the erbium-doped-fibers 61-1 and 61-2 on the front and rear sides, the dispersion compensating fiber 62 exhibits a higher compensation effect as much. Consequently, a wide bandwidth optical amplifier can be realized while achieving simplification in structure and reduction in cost.

Also the present modified optical fiber amplifier may be further modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, a pump source and an optical demultiplexer-multiplexer for the dispersion compensating fiber 62 may be provided additionally.

In particular, similarly as in the optical fiber amplifier of FIG. 12, an optical fiber amplifier may be constructed using pump sources 133-1 to 133-3 of the 0.98 µm band and optical demultiplexer-multiplexers 134-1 to 134-3.

Furthermore, a silica-type-optical-fiber may be employed in place of the dispersion compensating fiber 62.

B8-2. Second Modification to the Eighth Embodiment

Figure 37:
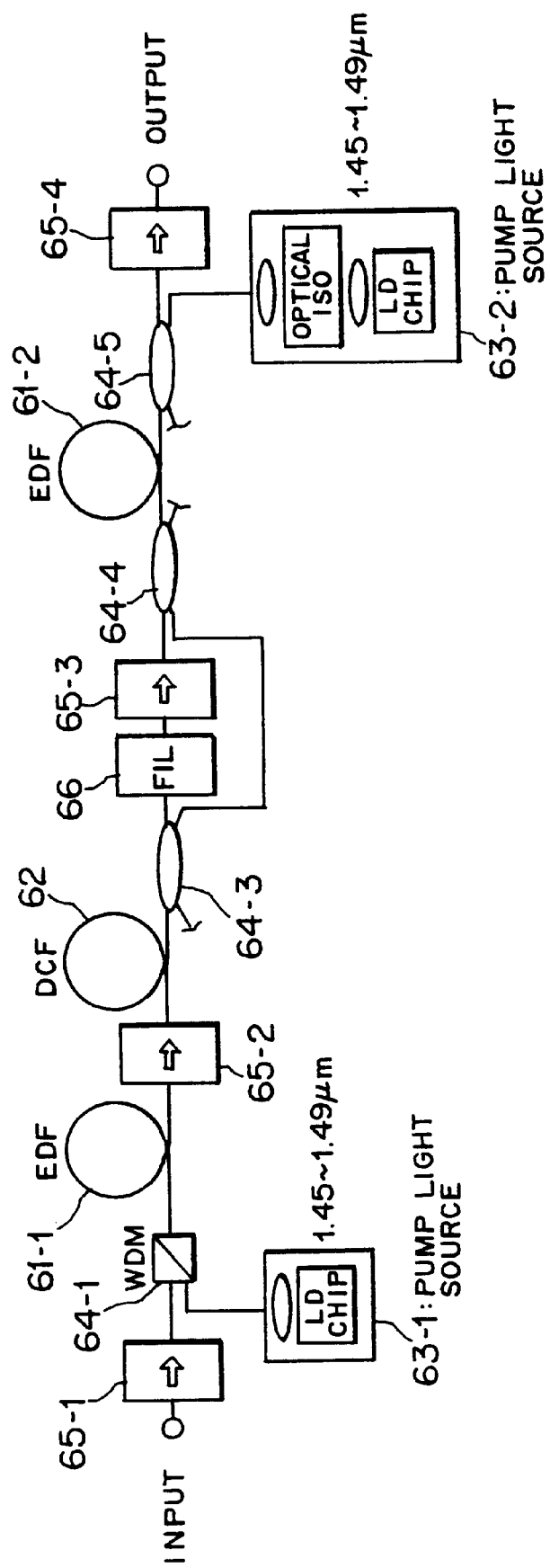

FIG. 37 is a block diagram showing a second modification to the eighth embodiment of the present invention. Referring to FIG. 37, the optical fiber amplifier shown includes an isolator 65-1, an optical demultiplexer-multiplexer 64-1, an erbium-doped-fiber 61-1, another isolator 65-2, a dispersion compensating fiber 62, another optical demultiplexer-multiplexer 64-3, an optical filter 66, a further isolator 65-3, a further optical demultiplexer-multiplexer 64-4, another erbium-doped-fiber 61-2, a still further optical demultiplexer-multiplexer 64-5, and a still further isolator 65-4 disposed in this order from the input side. A pump source 63-1 is connected to the optical demultiplexer-multiplexer 64-1, and another pump source 63-2 is connected to the optical demultiplexer-multiplexer 64-5.

The pump sources 63-1 and 63-2 both produce pump light, for example, of the 1.47 µm band (1.45 to 1.49 µm).

An optical signal line including the optical filter 66 and the isolator 65-3 and a pump light line are disposed in parallel between the optical demultiplexer-multiplexers 64-3 and 64-4.

In the optical fiber amplifier shown in FIG. 37 and having the construction described above, pump light from the pump source 63-1 is introduced into an input end of the erbium-doped-fiber 61-1 by way of the optical demultiplexer-multiplexer 64-1 to pump the erbium-doped-fiber 61-1 to amplify signal light. Thereupon, residual pump light arrives at the other end of the erbium-doped-fiber 61-1. The residual pump light is supplied to the dispersion compensating fiber 62 by way of the isolator 65-2 to cause Raman amplification to occur.

Simultaneously, pump light from the pump source 63-2 is introduced into an output end of the erbium-doped-fiber 61-2 by way of the optical demultiplexer-multiplexer 64-5 to pump the erbium-doped-fiber 61-2 to amplify the signal light. In this instance, residual pump light arrives at the input end of the erbium-doped-fiber 61-2. Also the residual pump light is supplied by way of the optical demultiplexer-multiplexers 64-4 and 64-3 to the dispersion compensating fiber 62 to cause Raman amplification to occur.

Also in the present modified optical fiber amplifier, since the dispersion compensating fiber 62 causes Raman amplification to occur using the residual pump light from the erbium-doped-fibers 61-1 and 61-2 at the front and the rear to the dispersion compensating fiber 62, the dispersion compensating fiber 62 exhibits a higher compensation effect as much. Thus, a wide bandwidth optical amplifier can be realized while achieving simplification in structure and reduction in cost.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, a pump source and an optical demultiplexer-multiplexer for the dispersion compensating fiber 62 may be provided additionally.

In particular, similarly as in the optical fiber amplifier of FIG. 12, an optical fiber amplifier may be constructed using pump sources 133-1 to 133-3 of the 0.98 µm band and optical demultiplexer-multiplexers 134-1 to 134-3.

Furthermore, a silica-type-optical-fiber may be employed in place of the dispersion compensating fiber 62.

B9. Ninth Embodiment

Figure 38:
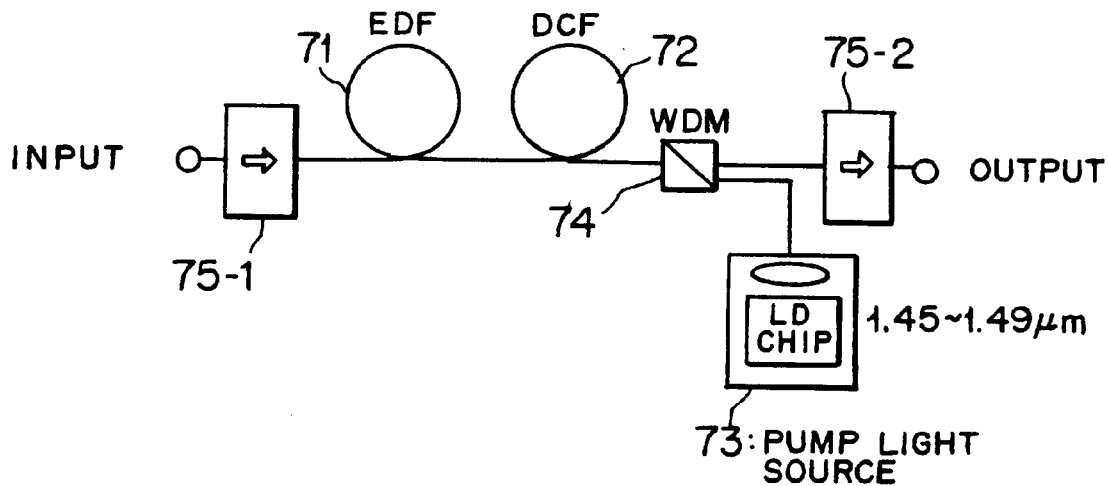
FIGS. 38 to 43 are block diagrams of yet further optical fiber amplifiers showing ninth, tenth, eleventh, twelfth, thirteenth and fourteenth preferred embodiments of the present invention, respectively.

FIG. 38 is a block diagram showing a ninth preferred embodiment of the present invention. Referring to FIG. 38, the optical fiber amplifier shown includes an isolator 75-1, an erbium-doped-fiber (rare earth doped fiber) 71, a dispersion compensating fiber 72, an optical demultiplexer-multiplexer 74, and another isolator 75-2 disposed in this order from the input side. A pump source 73 is connected to the optical demultiplexer-multiplexer 74.

The pump source 73 produces pump light, for example, of the 1.47 µm band (1.45 to 1.49 µm).

In the optical fiber amplifier shown in FIG. 38 and having the construction described above, pump light is introduced into an output side of the dispersion compensating fiber 72 by way of the optical demultiplexer-multiplexer 74 to cause Raman amplification to occur. Then, residual pump light from the dispersion compensating fiber 72 is introduced into an output end of the erbium-doped-fiber 71 to pump the erbium-doped-fiber 71 to amplify signal light.

By pumping the erbium-doped-fiber 71 reversely with residual pump light upon Raman amplification in this manner, the unevenness of the wavelength characteristic of the erbium-doped-fiber can be leveled to realize a wide bandwidth optical amplifier similarly as in the seventh embodiment described above. The wide bandwidth optical amplifier can be applied suitably to multiple wavelength collective amplification. Further, since the only single pump source is required, the optical fiber amplifier of the present embodiment is simplified in structure and reduced in cost.

The reason why the erbium-doped-fiber and the dispersion compensating fiber can amplify signal light using the pump source common to them is the same as described above.

Also the optical fiber amplifier of the present embodiment may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Meanwhile, the pump source 73 may be formed from a pair of pump sources, and a polarizing multiplexer for orthogonally polarizing and multiplexing pump light from the pump sources or may be formed from a combination of a pump source and a depolarizer by which pump light is depolarized or else may generate modulated pump light.

B10. Tenth Embodiment

Figure 39:
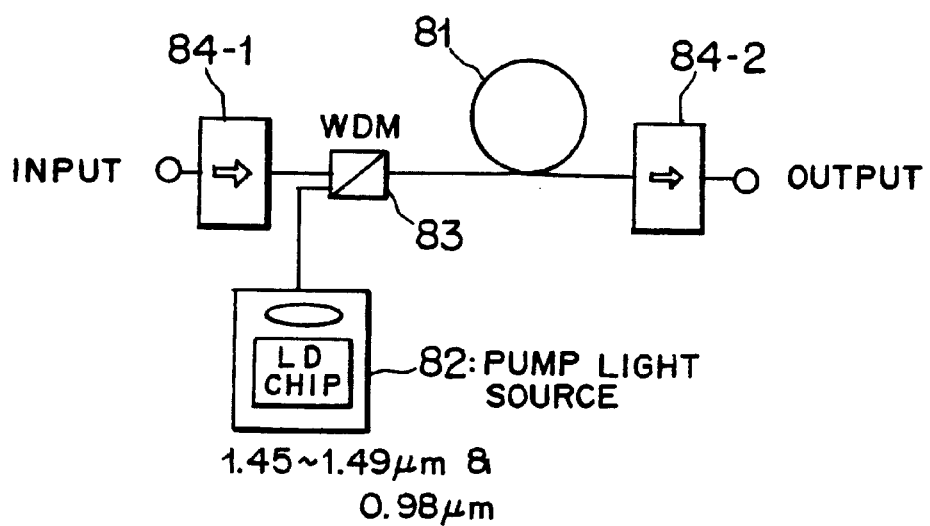

FIG. 39 is a block diagram showing a tenth preferred embodiment of the present invention. Referring to FIG. 39, the optical fiber amplifier shown includes an isolator 84-1, an optical demultiplexer-multiplexer 83, a dispersion compensating fiber 81 (hereinafter referred to as erbium doped dispersion compensating fiber) doped with erbium (rare earth element) ions, and another isolator 84-2 disposed in this order from the input side. A pump source 82 which produces pump light of, for example, the 1.47 μm band (1.45 to 1.49 μm) or 0.98 μm is connected to the optical demultiplexer-multiplexer 83.

In the optical fiber amplifier shown in FIG. 39 and having the construction described above, pump light is introduced into one end of the erbium doped dispersion compensating fiber 81 by way of the optical demultiplexer-multiplexer 83 to pump the erbium doped dispersion compensating fiber 81 to amplify signal light.

Where the core of the dispersion compensating fiber is doped with Er ions in this manner, the pump light is attenuated rapidly in the erbium doped dispersion compensating fiber 81, and consequently, Raman amplification does not occur and the loss of the erbium doped dispersion compensating fiber 81 is compensated for in individual small sections. Consequently, a good signal to noise ratio can be maintained.

Also the optical fiber amplifier of the present embodiment may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, the pump source 82 may be formed from a pair of pump sources, and a polarizing multiplexer for orthogonally polarizing and multiplexing pump light from the pump sources or may be formed from a combination of a pump source and a depolarizer by which pump light is depolarized or else may generate modulated pump light.

B11. Eleventh Embodiment

Figure 40:
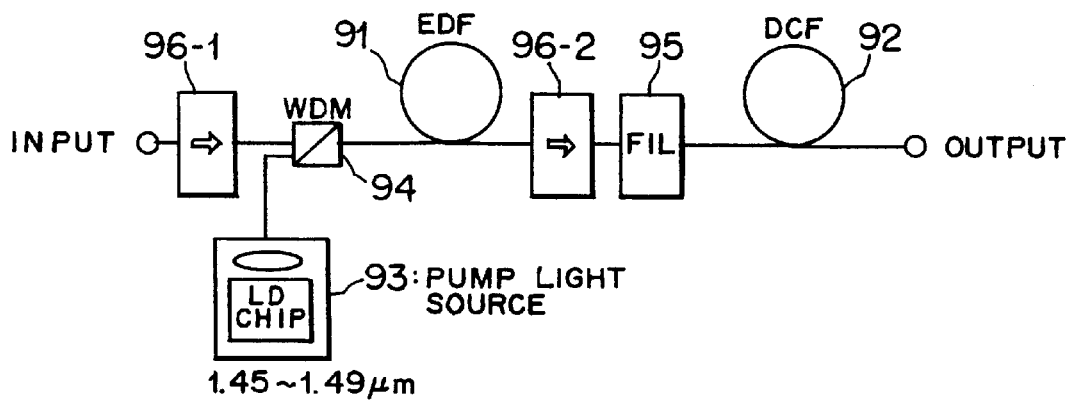

FIG. 40 is a block diagram showing an eleventh preferred embodiment of the present invention. Referring to FIG. 40, the optical fiber amplifier shown includes an isolator 96-1, an optical demultiplexer-multiplexer 94, an erbium-doped-fiber (rear earth doped fiber) 91, another isolator 96-2, an optical filter 95, and a dispersion compensating fiber 92 disposed in this order from the input side. A pump source 93 which produces pump light of, for example, the 1.47 μm band (1.45 to 1.49 μm) is connected to the optical demultiplexer-multiplexer 94.

The optical filter 95 intercepts residual pump light of the 1.47 μm band coming out from the erbium-doped-fiber 91.

In the optical fiber amplifier shown in FIG. 40 and having the construction described above, pump light is introduced into one end of the erbium-doped-fiber 91 by way of the optical demultiplexer-multiplexer 94 to pump the erbium-doped-fiber 91 to amplify signal light. Thereupon, residual pump light arrives at the other end of the erbium-doped-fiber 91. Then, the residual pump light is intercepted by the optical filter 95.

If light of the 1.47 μm band is unnecessarily transmitted through the dispersion compensating fiber 92, then it will disturb the wavelength characteristic of the level diagram designing or the optical amplifier due to Raman amplification. Therefore, in this instance, light of the 1.47 μm band is intercepted by the optical filter 95 so that it may be prevented from being inputted to the dispersion compensating fiber 92.

Accordingly, the dispersion compensating fiber 92 is used to principally compensate for the dispersion of the transmission line.

Also the optical fiber amplifier of the present embodiment may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, the pump source 93 may be formed from a pair of pump sources, and a polarizing multiplexer for orthogonally polarizing and multiplexing pump light from the pump sources or may be formed from a combination of a pump source and a depolarizer by which pump light is depolarized or else may generate modulated pump light.

B12. Twelfth Embodiment

Figure 41:
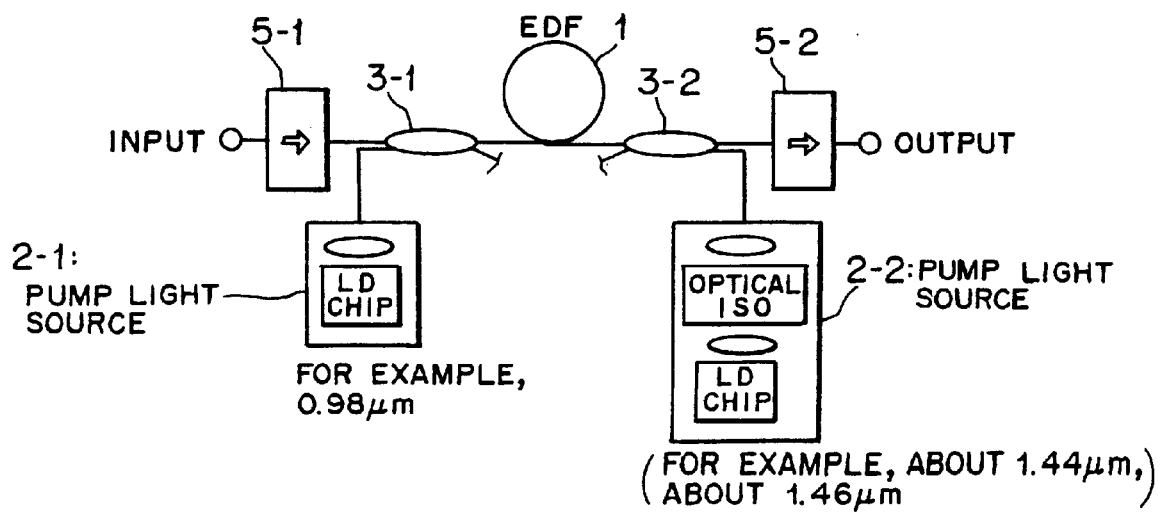

FIG. 41 is a block diagram showing a twelfth preferred embodiment of the present invention. Referring to FIG. 41, the optical fiber amplifier shown includes an isolator 5-1, an optical demultiplexer-multiplexer 3-1, an erbium-doped-fiber (rare earth doped fiber) 1 containing silica as a host component, another optical demultiplexer-multiplexer 3-2, and another isolator 5-2 disposed in this order from the input side. A pump source 2-1 for producing pump light of, for example, the 0.98 μm band is connected to the optical demultiplexer-multiplexer 3-1. Meanwhile, another pump source 2-2 which produces pump light of, for example, approximately 1.44 μm or approximately 1.46 μm is connected to the optical demultiplexer-multiplexer 3-2.

Here, the reason why an optical demultiplexer-multiplexer not of the bulk type but of the fusion type is used for the optical demultiplexer-multiplexer 3-1 and a pump source of the type which does not have a built-in optical isolator (optical ISO) is used for the pump source 2-1 is that noise light of the 1.55 μm band which is produced in the erbium-doped-fiber 1 when an optical signal of the 1.55 μm band is amplified does not return into the pump source 2-1 by which pump light of the 0.98 μm band is produced (this similarly applies to the embodiments hereinafter described).

In the optical fiber amplifier shown in FIG. 41 and having the construction described above, pump light of the 0.98 μm band is introduced into one end of the erbium-doped-fiber 1 by way of the optical demultiplexer-multiplexer 3-1 to pump the erbium-doped-fiber 1 to amplify signal light. Further, pump light of 1.44 μm or pump light of 1.46 μm is introduced into an output end of the erbium-doped-fiber 1 by way of the optical demultiplexer-multiplexer 3-2 to cause Raman amplification to occur in the erbium-doped-fiber 1.

It is known that Raman amplification occurs with an erbium-doped-fiber such as the erbium-doped-fiber 1 when intense light is inputted to it.

By amplifying signal light with an ordinary pump wavelength (for example, 0.98 μm (or alternatively 1.47 μm)) using the erbium-doped-fiber 1 which contains silica as a host component and Raman amplifying the signal light with the wavelength equal to or less than 1.44 μm, a concave (refer to FIG. 46) of the gain of the 1.54 μm band of the erbium-doped-fiber can be leveled. Further, by Raman amplifying the signal light with the wavelength of equal to or less than 1.46 μm, the decrease in gain (refer to FIG. 46) of the erbium-doped-fiber in the proximity of 1.57 μm can be compensated for to level the characteristic thereby to realize an optical fiber amplifier of a wide bandwidth.

Also the optical fiber amplifier of the present embodiment may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

B13. Thirteenth Embodiment

Figure 42:
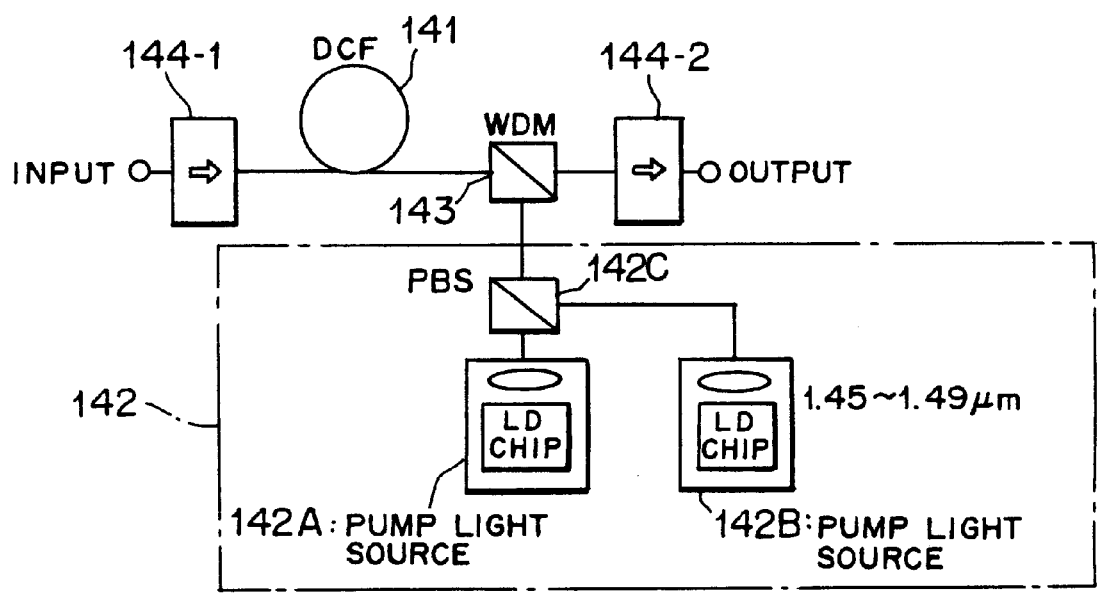

FIG. 42 is a block diagram showing a thirteenth preferred embodiment of the present invention. Referring to FIG. 42, the optical fiber amplifier shown includes an isolator 144-1, a dispersion compensating fiber 141, a polarization keeping optical demultiplexer-multiplexer 143 and another isolator 144-2 disposed in this order from the input side. A polarization keeping pump source 142 is connected to the optical demultiplexer-multiplexer 143.

The pump source 142 is formed from a pair of pump sources 142A and 142B, and a polarizing multiplexer (PBS) 142C for orthogonally polarizing and multiplexing pump light from the pump sources 142A and 142B.

The pump sources 142A and 142B have an equal pump power and output pump light of, for example, 1.45 to 1.49 µm (or 1.45 to 1.48 µm).

It is to be noted that an optical demultiplexer-multiplexer of the optical film type is used for the optical demultiplexer-multiplexer 143 so that multiplexing or demultiplexing of light may be performed while maintaining polarization conditions of the light.

In the optical fiber amplifier shown in FIG. 42 and having the construction described above, orthogonally polarized multiplexed pump light is introduced into an output end of the dispersion compensating fiber 141 by way of the optical demultiplexer-multiplexer 143 so that Raman amplification may occur effectively in the dispersion compensating fiber 141. Thus, the loss of the dispersion compensating fiber can be compensated for by such Raman amplification.

Also the optical fiber amplifier of the present embodiment may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, the dispersion compensating fiber 141 may be replaced by a silica-type-optical-fiber.

Furthermore, the pump source 142 may be constructed, for example, from a combination of a pump source and a depolarizer so that pump light may be depolarized similarly to the pump source 53-2' or 53-2" shown in FIG. 44 or 45 or may generate modulated pump light.

It is to be noted that the pump sources 53-2' and 53-2" shown in FIGS. 44 and 45 will be described below in connection with first and second modifications to a fourteenth embodiment of the present embodiment.

B14. Fourteenth Embodiment

FIG. 43 is a block diagram showing a fourteenth preferred embodiment of the present invention. Referring to FIG. 43, the optical fiber amplifier shown includes an isolator 55-1, an optical demultiplexer-multiplexer 54-1, an erbium-doped-fiber (rare earth doped fiber) 51, another isolator 55-2, a dispersion compensating fiber 52, a polarization keeping optical demultiplexer-multiplexer 54-2 and a further isolator 55-3 disposed in this order from the input side. Further, a pump source 53-1 is connected to the optical demultiplexer-multiplexer 54-1 while a pump source 53-2 of the polarization multiplexing type is connected to the optical demultiplexer-multiplexer 54-2.

The pump source 53-1 outputs pump light of, for example, the 0.98 µm band. Meanwhile, the pump source 53-2 is formed from a pair of pump sources 53-2A and 53-2B, and a polarizing multiplexer (PBS) 53-2C for orthogonally polarizing and multiplexing pump light from the pump sources 53-2A and 53-2B.

Also in this instance, the pump sources 53-2A and 53-2B have an equal pump power and both output pump light of, for example, 1.45 to 1.49 µm (or 1.45 to 1.48 µm).

It is to be noted that an optical demultiplexer-multiplexer of the fusion type which has no polarization keeping function is used for the optical demultiplexer-multiplexer 54-1 while another optical demultiplexer-multiplexer of the optical film type is used for the optical demultiplexer-multiplexer 54-2 so that multiplexing or demultiplexing of light may be performed while keeping polarization conditions of the light.

In the optical fiber amplifier shown in FIG. 43 and having the construction described above, pump light from the pump source 53-1 is inputted to one end of the erbium-doped-fiber 51 from the optical demultiplexer-multiplexer 54-1 together with signal light. Consequently, the signal light is amplified in the erbium-doped-fiber 51.

Meanwhile, orthogonally polarized multiplexed pump light is introduced into an output end of the dispersion compensating fiber 52 by way of the optical demultiplexer-multiplexer 54-2 to cause Raman amplification to occur effectively in the dispersion compensating fiber 52. Thus, the loss of the dispersion compensating fiber 52 is compensated for by such Raman amplification.

Similar advantages or effects to those of the thirteenth embodiment described above can be achieved also by the optical fiber amplifier of the present embodiment.

Also the optical fiber amplifier of the present embodiment may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, the rare earth doped fiber optical amplification element formed from an erbium-doped-fiber may be formed as an optical amplification element which has a low noise figure. Or, a Raman optical amplification element formed from a dispersion compensating fiber may be disposed as a front stage amplification element while a rare earth doped fiber optical amplification element formed from an erbium-doped-fiber is disposed as a rear stage amplification element.

B14-1. First Modification to the Fourteenth Embodiment

FIG. 44 is a block diagram showing a first modification to the fourteenth embodiment of the present invention. Referring to FIG. 44, the optical fiber amplifier shown includes an isolator 55-1, an optical demultiplexer-multiplexer 54-1, an erbium-doped-fiber (rare earth doped fiber) 51, another isolator 55-2, a dispersion compensating fiber 52, a polarization keeping optical demultiplexer-multiplexer 54-2 and a further isolator 55-3 disposed in this order from the input side. Further, a pump source 53-1 is connected to the optical demultiplexer-multiplexer 54-1 while a pump source 53-2' of the depolarization multiplexing type is connected to the optical demultiplexer-multiplexer 54-2.

The pump source 53-1 produces pump light of, for example, 0.98 µm. Meanwhile, the pump source 53-2' is formed from a single pump source 53-2A', and a depolarizer 53-2B' for depolarizing pump light from the pump source 53-2A'.

The depolarizer 53-2B' reduces the polarization dependency of the Raman optical amplifier formed from the dispersion compensating fiber 52 and is formed from a polarization keeping coupler 53-2E' for demultiplexing pump light from the pump source 53-2A', and a polarizing multiplexer (PBS) 53-2C' for orthogonally polarizing and multiplexing pump light demultiplexed by the polarization keeping coupler 53-2E' and pump light delayed by a delay line.

Also in the modified optical fiber amplifier, the pump source 53-2A' outputs pump light of, for example, 1.45 to 1.49 µm (or 1.45 to 1.48 µm).

It is to be noted that an optical demultiplexer-multiplexer of the fusion type which has no polarization keeping function is used for the optical demultiplexer-multiplexer 54-1 while another optical demultiplexer-multiplexer of the optical film type is used for the optical demultiplexer-multiplexer 54-2 so that multiplexing or demultiplexing of light may be performed while keeping polarization conditions of the light.

In the optical fiber amplifier shown in FIG. 44 and having the construction described above, pump light from the pump source 53-1 is inputted to one end of the erbium-doped-fiber 51 from the optical demultiplexer-multiplexer 54-1 together with signal light. Consequently, the signal light is amplified in the erbium-doped-fiber 51.

Meanwhile, depolarized pump light is introduced into an output end of the dispersion compensating fiber 52 by way of the optical demultiplexer-multiplexer 54-2 to cause Raman amplification to occur effectively in the dispersion compensating fiber 52. Thus, the loss of the dispersion compensating fiber 52 is compensated for by such Raman amplification.

By the construction described above, similar advantages or effects to those of the fourteenth embodiment described above can be achieved while decreasing the polarization dependency of the dispersion compensating fiber 52.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, the rare earth doped fiber optical amplification element formed from an erbium-doped-fiber may be formed as an optical amplification element which has a low noise figure. Or, a Raman optical amplification element formed from a dispersion compensating fiber may be disposed as a front stage amplification element while a rare earth doped fiber optical amplification element formed from an erbium-doped-fiber is disposed as a rear stage amplification element.

B14-2. Second Modification to the Fourteenth Embodiment

FIG. 45 is a block diagram showing a second modification to the fourteenth embodiment of the present invention. Referring to FIG. 45, the optical fiber amplifier shown includes an isolator 55-1, an optical demultiplexer-multiplexer 54-1, an erbium-doped-fiber (rare earth doped fiber) 51, another isolator 55-2, a dispersion compensating fiber 52, a polarization keeping optical demultiplexer-multiplexer 54-2 and a further isolator 55-3 disposed in this order from the input side. Further, a pump source 53-1 is connected to the optical demultiplexer-multiplexer 54-1 while a pump source 53-2" of the modulation polarization multiplexing type is connected to the optical demultiplexer-multiplexer 54-2.

The pump source 53-1 produces pump light of, for example, 0.98 $\mu$m. Meanwhile, the pump source 53-2" is formed from a pair of pump sources 53-2A" and 53-2B", a polarizing multiplexer (PBS) 53-2C" for orthogonally polarizing and multiplexing pump light from the pump sources 53-2A" and 53-2B", and a modulator 53-2D" for modulating the pump sources 53-2A" and 53-2B" with a frequency of several hundreds kHz to 1 MHz.

Also in the present modified optical fiber amplifier, the pump sources 53-2A" and 53-2B" have an equal pump power and both output pump light of, for example, 1.45 to 1.49 $\mu$m (or 1.45 to 1.48 $\mu$m).

It is to be noted that an optical demultiplexer-multiplexer of the fusion type which has no polarization keeping function is used for the optical demultiplexer-multiplexer 54-1 while another optical demultiplexer-multiplexer of the optical film type is used for the optical demultiplexer-multiplexer 54-2 so that multiplexing or demultiplexing of light may be performed while keeping polarization conditions of the light.

In the optical fiber amplifier shown in FIG. 45 and having the construction described above, pump light from the pump source 53-1 is inputted to one end of the erbium-doped-fiber 51 from the optical demultiplexer-multiplexer 54-1 together with signal light. Consequently, the signal light is amplified in the erbium-doped-fiber 51.

Meanwhile, modulated and orthogonally polarized multiplexed pump light having a spectrum of several hundreds kHz or more (the spectral line width of the pump light can be widened) is introduced into an output end of the dispersion compensating fiber 52 by way of the optical demultiplexer-multiplexer 54-2 to cause Raman amplification to occur effectively in the dispersion compensating fiber 52. Thus, the loss of the dispersion compensating fiber 52 is compensated for by such Raman amplification.

By the construction described above, similar advantages or effects to those of the fourteenth embodiment described above can be achieved while raising the threshold level for stimulated Brillouin scattering and decreasing unfavorable nonlinear effects.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, the rare earth doped fiber optical amplification element formed from an erbium-doped-fiber may be formed as an optical amplification element which has a low noise figure. Or, a Raman optical amplification element formed from a dispersion compensating fiber may be disposed as a front stage amplification element while a rare earth doped fiber optical amplification element formed from an erbium-doped-fiber is disposed as a rear stage amplification element.

B15. Fifteenth Embodiment

Figure 48:
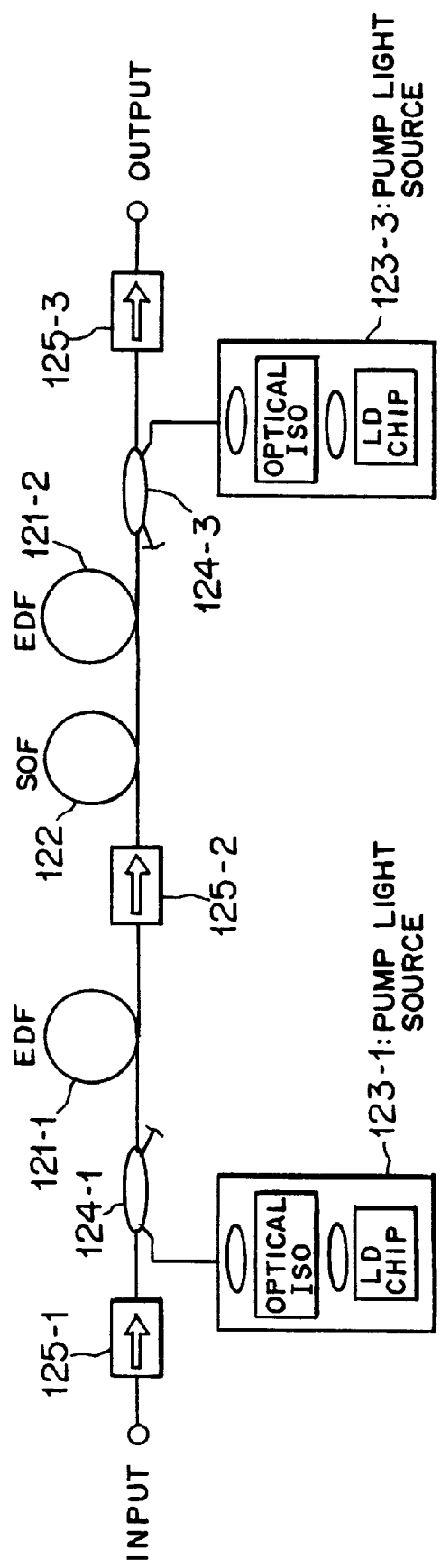
FIG. 48 is a block diagram of a yet further optical fiber amplifier showing a fifteenth preferred embodiment of the present invention.

FIG. 48 is a block diagram showing a fifteenth preferred embodiment of the present invention. Referring to FIG. 48, the optical fiber amplifier shown includes an isolator 125-1, an optical demultiplexer-multiplexer 124-1, an erbium-doped-fiber (rare earth doped fiber) 121-1, another isolator 125-2, a silica-type-optical-fiber 122, another erbium-doped-fiber (rare earth doped fiber) 121-2, another optical demultiplexer-multiplexer 124-3, and a further isolator 125-3 disposed in this order from the input side. A pair of pump sources 123-1 and 123-3 for producing pump light of, for example, the 1.47 $\mu$m band (1.45 to 1.49 $\mu$m) are connected to the optical demultiplexer-multiplexers 124-1 and 124-3, respectively.

The silica-type-optical-fiber 122 functions as a Raman optical amplifier whose amplification frequency band can be varied with a pump wavelength. The band characteristic of the silica-type-optical-fiber 122 depends upon the silica of the host glass and the doping material and the concentration of the core.

Meanwhile, each of the erbium-doped-fibers 121-1 and 121-2 functions as a rare earth doped fiber optical amplifier whose amplification frequency band and band characteristic depend upon the host glass and the doping material of the core.

In the present embodiment, the silica-type-optical-fiber 122 has a small mode field diameter. Where the noise figure of the Raman optical amplifier formed from the silica-type-optical-fiber 122 is higher than that of the rare earth doped fiber optical amplifiers formed from the erbium-doped-fibers 121-1 and 121-2, one of the rare earth doped fiber optical amplifier is used as the front stage amplification element and the Raman optical amplifier is used as the middle stage amplification element while the other rare earth doped fiber optical amplifier is used as the rear stage amplification element in which the signal power is high, and they are connected in cascade connection to realize an optical fiber amplifier which is low in noise and has a flat band characteristic or a wide amplification frequency band.

In particular, by using a rare earth doped fiber optical amplifier having a low noise figure (such as an erbium-doped-fiber optical amplifier pumped with light of the 1.47 $\mu$m band) as the front stage amplification element, very low signal light is amplified in a low noise condition. Further, in order to reduce nonlinear effects which deteriorate the signal to noise ratio (SNR) (here, the "nonlinear effects" signifies effects which deteriorate the signal to noise ratio (SNR) such as self-phase modulation (SPM) of signal light, four wave mixing (FWM), and cross-phase modulation (XPM)), a Raman optical amplifier for which a silica-type-optical-fiber having a low signal power is employed is used as the middle stage amplification element.

In the optical fiber amplifier shown in FIG. 48 and having the construction described above, pump light from the pump source 123-1 is introduced into one end of the erbium-doped-fiber 121-1 by way of the optical demultiplexer-multiplexer 124-1 to pump the erbium-doped-fiber 121-1 to amplify signal light. Thereupon, residual pump light is produced in the erbium-doped-fiber 121-1, and the silica-type-optical-fiber 122 is pumped with the residual pump light so that Raman amplification may occur similarly as in a dispersion compensating fiber.

Meanwhile, pump light from the pump source 123-3 is introduced into an output end of the erbium-doped-fiber 121-2 by way of the optical demultiplexer-multiplexer 124-3 to pump the erbium-doped-fiber 121-2 to amplify the signal light. Thereupon, residual pump light is produced in the erbium-doped-fiber 121-2, and the silica-type-optical-fiber 122 is pumped with the residual pump light to cause Raman amplification to occur.

Since the optical fiber amplifier shown in FIG. 48 employs the pump sources 123-1 and 123-3 of the 1.47 $\mu$m band in this manner, all of the erbium-doped-fibers 121-1 and 121-2 and the silica-type-optical-fiber 122 can be pumped. Consequently, the pump source 123-2 in the optical fiber amplifier shown in FIG. 11 can be omitted. Accordingly, the optical fiber amplifier is simplified in construction and improved in efficiency of the pump power.

Also the optical fiber amplifier of the present embodiment may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Or, an isolator may be interposed between the silica-type-optical-fiber 122 and the erbium-doped-fiber 121-2.

Further, a pump source and an optical demultiplexer-multiplexer for the silica-type-optical-fiber 122 may be provided additionally.

In particular, similary as in the optical fiber amplifier of FIG. 11, an optical fiber amplifier may be constructed using pump sources 123-1 to 123-3 of the 0.98 $\mu$m band and optical demultiplexer-multiplexers 1241 to 124-3.

Furthermore, the silica-type-optical-fiber 122 may be replaced by a dispersion compensating fiber.

B15-1. Modification to the Fifteenth Embodiment

Figure 49:
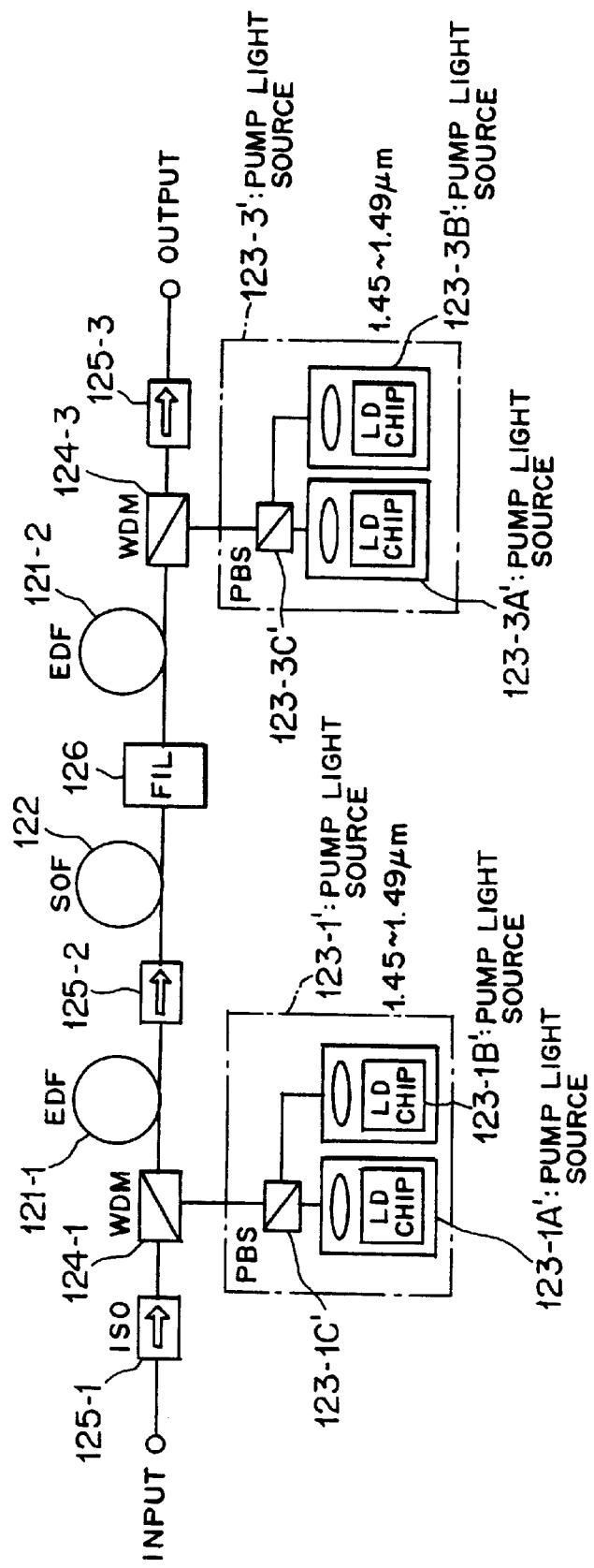
FIG. 49 is a block diagram showing a modification to the optical fiber amplifier of FIG. 48.

FIG. 49 is a block diagram showing a modification to the fifteenth embodiment of the present invention. Referring to FIG. 49, the optical fiber amplifier shown includes an isolator 125-1, an optical demultiplexer-multiplexer 124-1, an erbium-doped-fiber (rare earth doped fiber) 121-1, another isolator 125-2, a silica-type-optical-fiber 122, an optical filter 126, another erbium-doped-fiber (rare earth doped fiber) 121-2, another optical demultiplexer-multiplexer 124-3, and a further isolator 125-3 disposed in this order from the input side. A pair of polarization multiplexing pump sources 123-1' and 123-3' are connected to the optical demultiplexer-multiplexers 124-1 and 124-3, respectively.

The pump source 123-1' is formed from a pair of pump sources 123-1A' and 123-1B', and a polarizing multiplexer (PBS) 123-1C' for orthogonally polarizing and multiplexing pump light from the pump sources 123-1A' and 123-1B'. The pump sources 123-1A' and 123-1B' have an equal pump power and both output pump light of, for example, 1.45 to 1.49 $\mu$m (or 1.45 to 1.48 $\mu$m).

Meanwhile, the pump source 123-3' is formed from a pair of pump sources 123-3A' and 123-3B', and a polarizing multiplexer (PBS) 123-3C' for orthogonally polarizing and multiplexing pump light from the pump sources 123-3A' and 123-3B'. Here, since the pump source 123-3' is constructed as a pump source which orthogonally polarizes and multiplexes pump light in order to merely increase the pump power, the pump wavelengths and the pump powers of the pump sources 123-3A' and 123-3B' may be different from each other.

Further, in order that a depolarized condition of orthogonally polarized multiplexed pump light may be kept also in the silica-type-optical-fiber 122, the erbium-doped-fiber 121-1 and the silica-type-optical-fiber 122 are either secured firmly to bobbins or like elements or accommodated in a housing so that they may not be influenced by external air and so forth.

It is to be noted that the isolators 125-1 to 125-3 are optical isolators of the non-polarization dependent type. Further, the optical filter 126 is used to remove or level an ASE peak in the proximity of 1.535 $\mu$m produced in the erbium-doped-fiber 121-1, and it can be omitted.

In the optical fiber amplifier shown in FIG. 49 and having the construction described above, pump light of the 1.47 $\mu$m band from the pump source 123-1' is introduced into one end of the erbium-doped-fiber 121-1 by way of the optical demultiplexer-multiplexer 124-1 to pump the erbium-doped-fiber 121-1 to amplify signal light. Thereupon, residual pump light is produced, and the silica-type-optical-fiber 122 is pumped with the residual pump light to cause Raman amplification to occur.

Meanwhile, pump light of 1.47 $\mu$m from the pump source 123-3' is introduced into an output end of the erbium-doped-fiber 121-2 by way of the optical demultiplexer-multiplexer 124-3 to pump the erbium-doped-fiber 121-2 to amplify the signal light. Thereupon, residual pump light is produced, and the silica-type-optical-fiber 122 is pumped with the residual pump light to cause Raman amplification to occur.

In the optical fiber amplifier shown in FIG. 49, by employing the pump sources 123-1' and 123-3' of the 1.47 $\mu$m band in this manner, all of the erbium-doped-fibers 121-1 and 121-2 and the silica-type-optical-fiber 122 can be pumped. Consequently, the pump source 123-2 in the optical fiber amplifier shown in FIG. 11 can be omitted.

Accordingly, the optical fiber amplifier is simplified in construction and improved in efficiency of the pump power.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, a pump source and an optical demultiplexer-multiplexer for the silica-type-optical-fiber 122 may be provided additionally.

In particular, similary as in the optical fiber amplifier of FIG. 11, an optical fiber amplifier may be constructed using pump sources 123-1 to 123-3 of the 0.98 μm band and optical demultiplexer-multiplexers 124-1 to 124-3.

Furthermore, an isolator may be interposed between the silica-type-optical-fiber 122 and the erbium-doped-fiber 121-2.

Furthermore, the silica-type-optical-fiber 122 may be replaced by a dispersion compensating fiber.

B16. Sixteenth Embodiment

Figure 50:
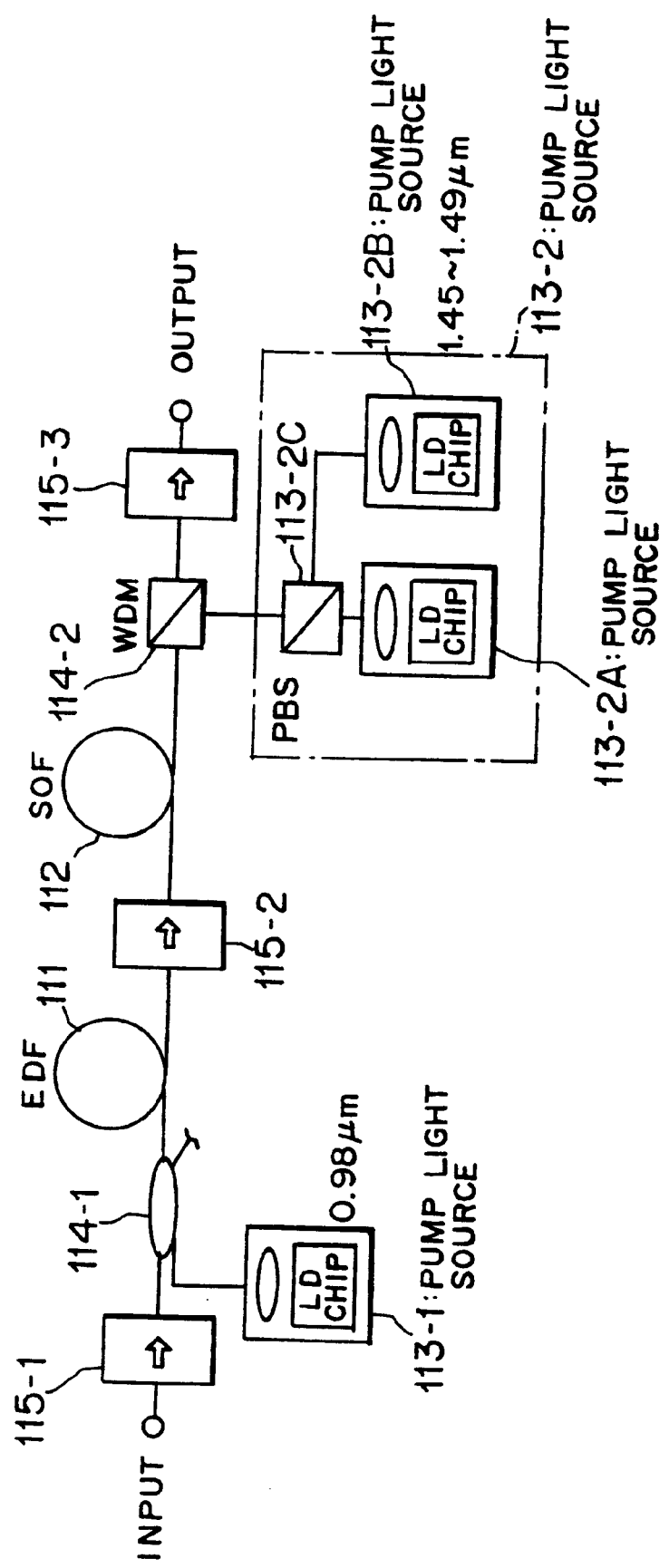
FIG. 50 is a block diagram of a yet further optical fiber amplifier showing a sixteenth preferred embodiment of the present invention.

FIG. 50 is a block diagram showing a sixteenth preferred embodiment of the present invention. Referring to FIG. 50, the optical fiber amplifier shown includes an isolator 115-1, an optical demultiplexer-multiplexer 114-1, an erbium-doped-fiber (rare earth doped fiber) 111, another isolator 115-2, a silica-type-optical-fiber 112, a polarization keeping optical demultiplexer-multiplexer 114-2, and a further isolator 115-3 disposed in this order from the input side. A pump source 113-1 is connected to the optical demultiplexer-multiplexer 114-1, and a polarization multiplexing pump source 113-2 is connected to optical demultiplexer-multiplexer 114-2.

Thus, in the optical fiber amplifier shown in FIG. 50, the rare earth doped fiber optical amplifier and the Raman optical amplifier are employed so as to compensate for each other so that a further flattened band characteristic or a further widened amplification frequency band can be obtained. Then, the rare earth doped fiber optical amplifier (such as an erbium-doped-fiber amplifier pumped with 0.98 μm band or pumped with 1.47 μm) having a low noise figure is used as the front stage amplification element and the Raman optical amplifier formed from a silica-type-optical-fiber is used as the rear stage amplification element, and they are connected in cascade connection so that an optical fiber amplifier has a low noise characteristic and has a further flattened band characteristic or a further widened amplification frequency band.

In particular, where the noise figure of the Raman optical amplifier is higher than that of the rare earth doped fiber optical amplifier, the rare earth doped fiber optical amplifier is used as the front amplification element while the Raman optical amplifier is used as the rear stage amplification element and they are connected in cascade connection to realize a low noise optical fiber amplifier.

Further, the pump source 113-1 outputs pump light of, for example, 0.98 μm. Meanwhile, the pump source 113-2 is formed from a pair of pump sources 113-2A and 113-2B, and a polarizing multiplexer (PBS) 113-2C for orthogonally polarizing and multiplexing pump light from the pump sources 113-2A and 113-2B.

Also in the present optical fiber amplifier, the pump sources 113-2A and 113-2B have an equal pump power and both output pump light of, for example, 1.45 to 1.49 μm (or 1.45 to 1.48 μm)

It is to be noted that an optical demultiplexer-multiplexer of the fusion type which has no polarization keeping function is used for the optical demultiplexer-multiplexer 114-1 while another optical demultiplexer-multiplexer of the optical film type is used for the optical demultiplexer-multiplexer 114-2 so that multiplexing or demultiplexing of light may be performed while keeping polarization conditions of the light.

In the optical fiber amplifier shown in FIG. 50 and having the construction described above, pump light from the pump source 113-1 is inputted to one end of the erbium-doped-fiber 111 by way of the optical demultiplexer-multiplexer 114-1 together with signal light. Consequently, the signal light is amplified in the erbium-doped-fiber 111.

Meanwhile, orthogonally polarized multiplexed pump light is introduced into an output end of the silica-type-optical-fiber 112 by way of the optical demultiplexer-multiplexer 114-2 to cause Raman amplification to occur effectively in the silica-type-optical-fiber 112. Thus, the loss of the silica-type-optical-fiber 112 is compensated for by such Raman amplification.

Also by the construction described above, similar advantages or effects to those of the fourteenth embodiment described above can be achieved.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Alternatively, a single pump source which produces pump light of the 1.47 μm band may be provided so that it may serve as both of the pump source for the silica-type-optical-fiber and the pump source for the erbium-doped-fiber.

On the other hand, where a high output cannot be obtained from the Raman optical amplifier, a Raman optical amplifier formed from a silica-type-optical-fiber or a dispersion compensating fiber is used as the amplification element on the input side (front stage amplification element) while a rare earth doped fiber optical amplifier formed from an erbium-doped-fiber is used as the amplification element on the output side (rear stage amplification element), and they are connected in cascade connection.

Particularly, where the pump wavelength of the pump source for the Raman optical amplifier is approximately 1.44 μm, the concave of the gain which appears in the proximity of approximately 1.54 μm of the rare earth doped fiber optical amplifier can be compensated for by Raman optical amplification. On the hand, where the pump wavelength of the pump source for the Raman optical amplifier is approximately 1.46 μm, a decrease in gain which occurs in the longer wavelength side of the rare earth doped fiber optical amplifier than approximately 1.57 μm can be compensated for by the Raman optical amplification. Consequently, further leveling or widening of the band characteristic of the optical fiber amplifier can be achieved.

Further, the optical fiber amplifier can be constructed in the following manner so that it may have a further flattened band characteristic or a further wider amplification frequency band. In particular, in order to reduce the pump power (threshold pump power) at which a Raman optical amplifier for which a silica-type-optical-fiber or a dispersion compensating fiber is used begins to produce a gain, a silica-type-optical-fiber having a reduced mode field diameter is used, and in order to reduce an influence of nonlinear effects which increases as a result of the reduction of the mode field diameter, a Raman optical amplifier formed from a silica-type-optical-fiber is employed as the amplification element on the input side (front stage amplification element) in which the signal power is low while a rare earth doped fiber optical amplifier formed from an erbium-doped-fiber is used as the amplification element on the output side (rear stage amplification element) in which the signal power is high, and they are connected in cascade connection.

B16-1. First Modification to the Sixteenth Embodiment

Figure 51:
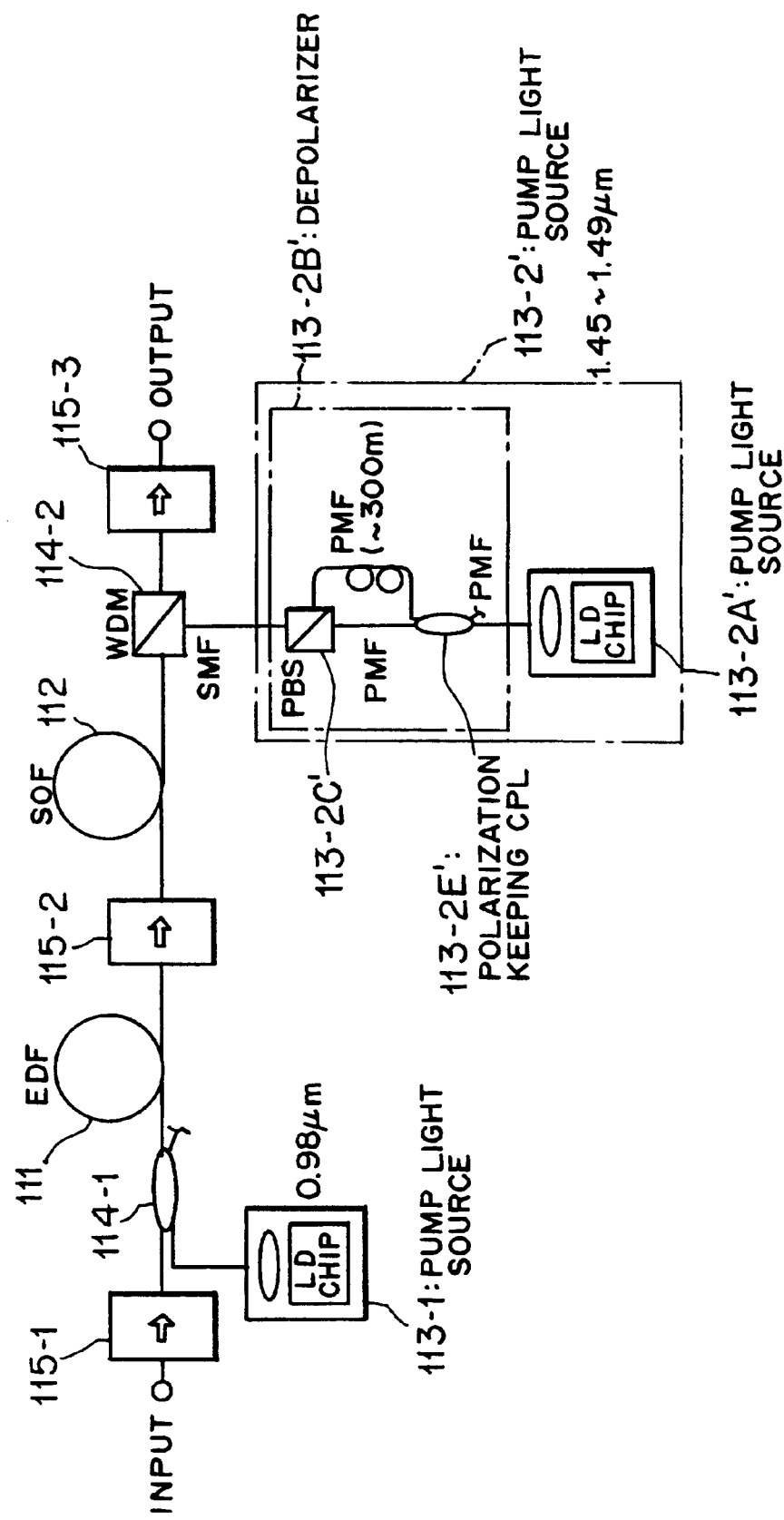
FIGS. 51 and 52 are block diagrams showing different modifications to the optical fiber amplifier of FIG. 50.

FIG. 51 is a block diagram showing a first modification to the sixteenth embodiment of the present invention. Referring to FIG. 51, the optical fiber amplifier shown includes an isolator 115-1, an optical demultiplexer-multiplexer 114-1, an erbium-doped-fiber (rare earth doped fiber) 111, another isolator 115-2, a silica-type-optical-fiber 112, a polarization keeping optical demultiplexer-multiplexer 114-2, and a further isolator 115-3 disposed in this order from the input side. A pump source 113-1 is connected to the optical demultiplexer-multiplexer 114-1, and a depolarizing polarization multiplexing pump source 113-2' is connected to the optical demultiplexer-multiplexer 114-2.

The pump source 113-1 outputs pump light of, for example, 0.98 μm. The pump source 113-2' is formed from a single pump source 113-2A', and a depolarizer 113-2B' for depolarizing pump light from the pump source 113-2A'.

The depolarizer 113-2B' reduces the polarization dependency of a Raman optical amplifier formed from the silica-type-optical-fiber 112. The depolarizer 113-2B' is formed from a polarization keeping coupler 113-2E' for demultiplexing pump light from the pump source 1132A', and a polarizing multiplexer (PBS) 113-2C' for orthogonally polarizing and multiplexing the pump light demultiplexed by the polarization keeping coupler 113-2E' and the pump light delayed by a delay line.

Also in the modified optical fiber amplifier, the pump source 113-2A' outputs pump light of, for example, 1.45 to 1.49 μm (or 1.45 to 1.48 μm).

It is to be noted that an optical demultiplexer-multiplexer of the fusion type which has no polarization keeping function is used for the optical demultiplexer-multiplexer 114-1 while another optical demultiplexer-multiplexer of the optical film type is used for the optical demultiplexer-multiplexer 114-2 so that multiplexing or demultiplexing of light may be performed while keeping polarization conditions of the light.

In the optical fiber amplifier shown in FIG. 51 and having the construction described above, pump light from the pump source 113-1 is inputted to one end of the erbium-doped-fiber 111 by way of the optical demultiplexer-multiplexer 114-1 together with signal light. Consequently, the signal light is amplified in the erbium-doped-fiber 111.

Meanwhile, depolarized pump light from the pump source 113-2' is introduced into an output end of the silica-type-optical-fiber 112 by way of the optical demultiplexer-multiplexer 114-2 to cause Raman amplification to occur effectively in the silica-type-optical-fiber 112. Thus, the loss of the silica-type-optical-fiber 112 is compensated for by such Raman amplification.

Also by the construction described above, similar advantages or effects to those of the sixteenth embodiment described above can be achieved while decreasing the polarization dependency of the silica-type-optical-fiber 112.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Alternatively, a single pump source which produces pump light of the 1.47 μm band may be provided so that it may serve as both of the pump source for the silica-type-optical-fiber and the pump source for the erbium-doped-fiber.

B16-2. Second Modification to the Sixteenth Embodiment

Figure 52:
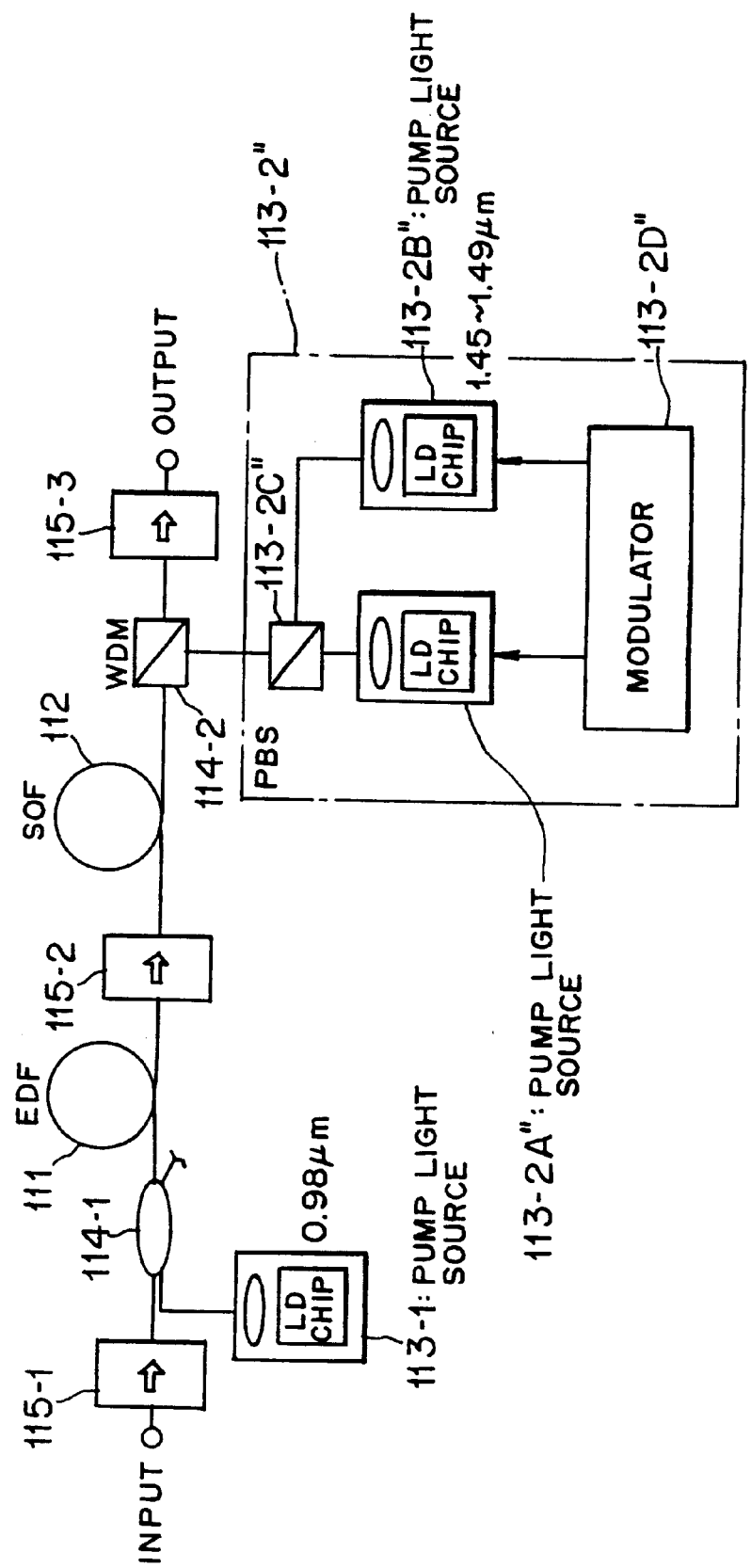

FIG. 52 is a block diagram showing a second modification to the sixteenth embodiment of the present invention. Referring to FIG. 52, the optical fiber amplifier shown includes an isolator 115-1, an optical demultiplexer-multiplexer 114-1, an erbium-doped-fiber (rare earth doped fiber) 111, another isolator 115-2, a silica-type-optical-fiber 112, a polarization keeping optical demultiplexer-multiplexer 114-2, and a further isolator 115-3 disposed in this order from the input side. A pump source 113-1 is connected to the optical demultiplexer-multiplexer 114-1, and a modulating polarization multiplexing pump source 113-2" is connected to optical demultiplexer-multiplexer 114-2.

The pump source 113-1 outputs pump light of, for example, 0.98 μm. The pump source 113-2" is formed from a pair of pump sources 113-2A" and 113-2B", a polarizing multiplexer (PBS) 113-2C" for orthogonally polarizing and multiplexing pump light from the pump sources 113-2A" and 113-2B", and a modulator 113-2D" for modulating the pump sources 113-2A" and 113-2B" with a frequency of several hundreds kHz to 1 MHz.

Also in the modified optical fiber amplifier, the pump sources 113-2A" and 113-2B" have an equal pump power and both output pump light of, for example, 1.45 to 1.49 μm (or 1.45 to 1.48 μm).

It is to be noted that an optical demultiplexer-multiplexer of the fusion type which has no polarization keeping function is used for the optical demultiplexer-multiplexer 114-1 while another optical demultiplexer-multiplexer of the optical film type is used for the optical demultiplexer-multiplexer 114-2 so that multiplexing or demultiplexing of light may be performed while keeping polarization conditions of the light.

In the optical fiber amplifier shown in FIG. 52 and having the construction described above, pump light from the pump source 113-1 is inputted to one end of the erbium-doped-fiber 111 by way of the optical demultiplexer-multiplexer 114-1 together with signal light. Consequently, the signal light is amplified in the erbium-doped-fiber 111.

Meanwhile, modulated and orthogonally polarized multiplexed pump light having a spectrum of several hundreds kHz or more (the spectral line width of the pump light can be widened) from the pump source 113-2" is introduced into an output end of the silica-type-optical-fiber 112 by way of the optical demultiplexer-multiplexer 114-2 to cause Raman amplification to occur effectively in the silica-type-optical-fiber 112. Thus, the loss of the silica-type-optical-fiber 112 is compensated for by such Raman amplification.

By the construction described above, similar advantages or effects to those of the sixteenth embodiment described above can be achieved while raising the threshold level for stimulated Brillouin scattering and decreasing unfavorable nonlinear effects.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Alternatively, a single pump source which produces pump light of the 1.47 μm band may be provided so that it may serve as both of the pump source for the silica-type-optical-fiber and the pump source for the erbium-doped-fiber.

B17. Seventeenth Embodiment

Figure 55:
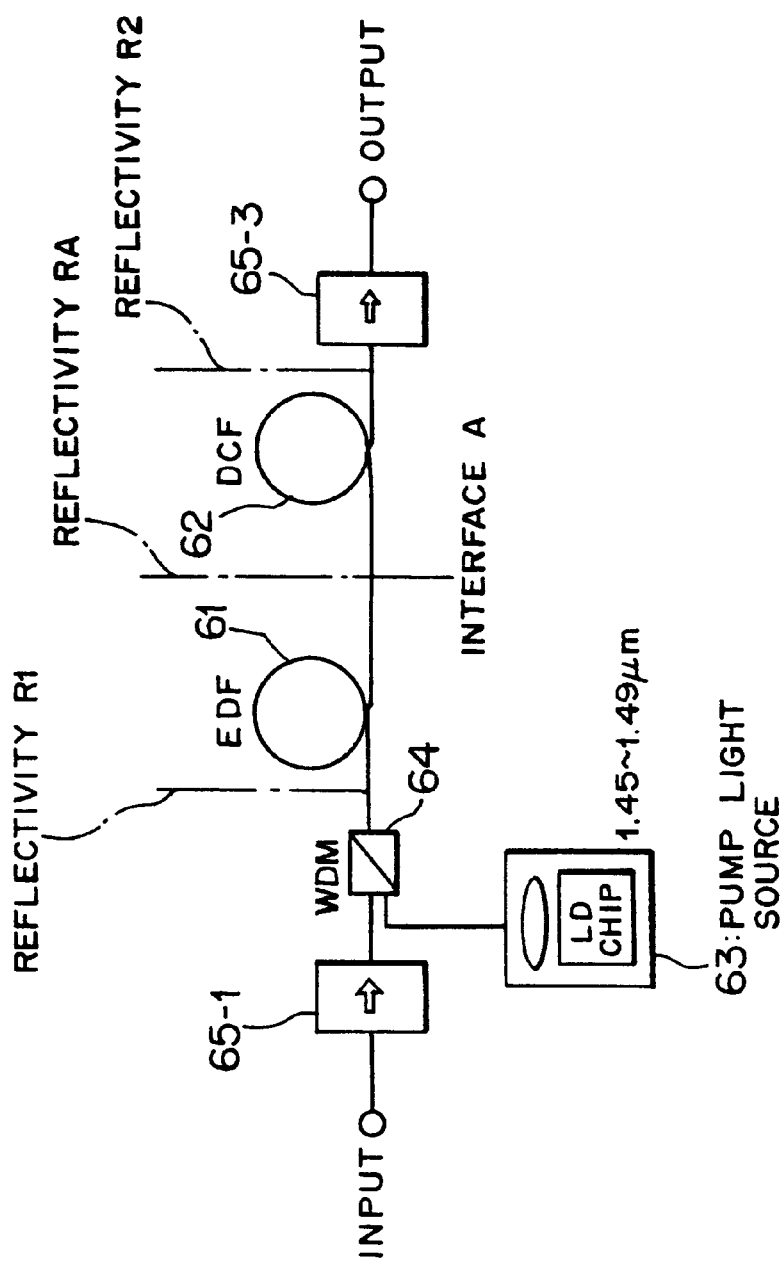
FIG. 55 is a block diagram of a yet further optical fiber amplifier showing a seventeenth preferred embodiment of the present invention.

FIG. 55 is a block diagram showing a seventeenth preferred embodiment of the present invention. Referring to FIG. 55, the optical fiber amplifier shown includes an isolator 65-1, an optical demultiplexer-multiplexer 64, an erbium-doped-fiber (rare earth doped fiber amplification element) 61, a dispersion compensating fiber (optical fiber attenuation element) 62, and another isolator 65-3 disposed in this order from the input side. A pump source 63 is connected to the optical demultiplexer-multiplexer 64.

The pump source 63 produces pump light, for example, of the 1.47 µm band (1.45 to 1.49 µm).

A rare earth doped fiber optical amplifier having a high gain sometimes suffers from unnecessary oscillations which are produced when it performs optical amplification. If such unnecessary oscillations are produced, the rare earth doped fiber optical amplifier operates but unstably.

For example, in an erbium-doped-fiber optical amplifier, spontaneous emission light (ASE) of 1.53 to 1.57 µm in wavelength is produced when optical amplification is performed, and since the ASE is repetitively reflected at reflection points in the erbium-doped-fiber optical amplifier, unnecessary oscillations are liable to be produced. Particularly with an erbium-doped-fiber optical amplifier adjusted for multiple wavelength collective amplification (that is, an erbium-doped-fiber optical amplifier having a high pump rate), since it has a high gain in the proximity of 1.53 µm, unnecessary oscillations are liable to be produced at this wavelength. When such unnecessary oscillations are produced, the erbium-doped-fiber optical amplifier operates unstably.

In order to suppress such unstable operation, it is effective to provide a medium (which is called loss medium) for causing signal light to lose its power (for attenuating signal light) (the principle will be hereinafter described).

In such an optical fiber amplifier as shown in FIG. 55, the dispersion compensating fiber 62 is pumped with remaining pump light introduced into it through the erbium-doped fiber 61 to compensate for signal light against the loss (attenuation) caused by the dispersion compensating fiber 62. Actually, however, it is difficult to compensate against the overall loss and some loss remains, and accordingly, the dispersion compensating fiber 62 functions as a loss medium.

Here, the principle of suppression of unstable operation arising from the provision of a loss medium will be described.

Generally, where the gain of an erbium-doped-fiber is represented by G, the reflectivities at the opposite ends (front end and rear end) of the erbium-doped-fiber are represented by R1 and R2 (here, the reflectivity R1 is a reflectivity in reflection from all parts located forwardly of the front end of the erbium-doped-fiber, and the reflectivity R2 is a reflectivity in reflection from all parts located rearwardly of the rear end of the erbium-doped-fiber), and the geometrical mean of R1 and R2 is represented by R ($R=(R1R2)^{1/2}$), CR can be regarded as a parameter indicating the degree of stability of operation of the erbium-doped-fiber. When GR is high, the erbium-doped-fiber operates unstably, and particularly when GR is higher than 1, oscillations are produced in the erbium-doped-fiber. Therefore, GR must be low, and particularly, GR is set lower than 0.02 as a target.

If the dispersion compensating fiber 62 (whose loss is represented by $\eta(0 \leq \eta \leq 1)$) is provided at the following stage (output side of signal light) to the erbium-doped-fiber 61 (whose gain is represented by G), for example, by fusion connection, then an interface A appears between the erbium-doped-fiber 61 and the dispersion compensating fiber 62 as seen in FIG. 55.

In this instance, as seen in FIG. 55, the reflectivity at the rear end of the erbium-doped-fiber 61 is represented by R1 and the reflectivity at the front end of the dispersion compensating fiber 62 is represented by R2 (here, the reflectivity R1 is a reflectivity in reflection from all parts located forwardly of the front end of the erbium-doped-fiber 61, and the reflectivity R2 is a reflectivity in reflection from all parts located rearwardly of the rear end of the dispersion compensating fiber 62). Further, where the reflectivity in reflection caused by a difference in reflectivity at the interface A between the erbium-doped-fiber 61 and the dispersion compensating fiber 62 is represented by RA (RA<<R1, R2; this condition is satisfied where the loss medium is an optical fiber), the parameter indicating the degree of stability of operation of the erbium-doped-fiber changes from GR to (Gη)R. In other words, GR is considered to be a gain in one way when light takes a round. Where a loss medium is provided, since the net gain when light takes a round is given by $(R1 \times G \times \eta) \times (R2 \times \eta \times G) = (G\eta)^2 R1R2$, the net gain in one way is given by $G\eta(R1R2)^{1/2} = (G\eta)R$. It is to be noted that, since RA <<R1, R2, the influence of the reflectivity RA can be ignored. Here, since $0 \leq \eta \leq 1$, GR is equivalently low.

Since the parameter GR indicating the degree of stability of operation of the erbium-doped-fiber becomes low by the provision of a loss medium in this manner, unstable operation of the erbium-doped-fiber 61 can be suppressed.

In the optical fiber amplifier according to the present embodiment, by pumping the dispersion compensating fiber 62 provided at the following stage to the erbium-doped-fiber 61 as shown in FIG. 55 with residual pump light from the erbium-doped-fiber 61, the dispersion compensating fiber 62 is compensated for against the loss (including leveling of the concave of the gain of the erbium-doped-fiber 61 and compensation against the reduction of the gain of the erbium-doped-fiber 61) and unstable operation of the erbium-doped-fiber 61 is simultaneously suppressed by the remaining loss.

In the optical fiber amplifier shown in FIG. 55 and having the construction described above, pump light is introduced into one end of the erbium-doped-fiber 61 from the optical demultiplexer-multiplexer 64 to pump the erbium-doped-fiber 61 to amplify signal light. Consequently, residual pump light arrives at the other end of the erbium-doped-fiber 61. Thereafter, the residual pump light is supplied to the dispersion compensating fiber 62 so that Raman amplification may occur in the dispersion compensating fiber 62.

The reason why signal light can be amplified by both of the erbium-doped-fiber and the dispersion compensating fiber using the common pump source to them is such as follows.

In particular, the pump wavelength band when signal light of the 1.55 µm band is Raman amplified is the 1.47 µm band (1.45 to 1.49 µm) which is the pump wavelength band of the erbium-doped-fiber (EDF), and accordingly, Raman amplification can be caused to occur using residual pump power when the EDF is pumped with light of the 1.47 µm band. From this reason, while optical amplification is performed by the erbium-doped-fiber 61, the dispersion compensating fiber 62 can be compensated for against the loss.

Consequently, similarly as in the seventh embodiment described hereinabove, a wide bandwidth optical amplifier wherein the unevenness of the wavelength characteristic of the erbium-doped-fiber amplifier is leveled can be realized, and the wide bandwidth optical amplifier can be suitably applied to multiple wavelength collective amplification.

Further, since the single pump source is involved, the optical fiber amplifier can be constructed in simplified structure and at a reduced cost.

Further, in the optical fiber amplifier, suppression of unstable operation of the erbium-doped-fiber 61 by means of the loss of the dispersion compensating fiber 62 is achieved simultaneously. Consequently, unnecessary oscillating operation of a rare earth doped fiber optical amplifier adjusted for wavelength multiplexing (WDM) can be prevented to achieve stabilized optical amplification.

It is to be noted that, where the pump source 63 generates pump light of 0.98 $\mu$m, the dispersion compensating fiber 62 does not perform Raman amplification, and accordingly, compensation against the loss of the dispersion compensating fiber 62 does not take place.

It is also to be noted that the reflectivity of the dispersion compensating fiber due to Rayleigh backscattering is ignored in the above discussion. The reflectivity depends on the length of the dispersion compensating fiber. Therefore, if the reflectivity cannot be ignored, an optical isolator should be added to the configuration shown in FIG. 55, for example, between the erbium-doped-fiber 61 and the dispersion compensating fiber 62. The addition of an optical isolator is normally effective where the Rayleigh backscattering cannot be ignored.

Also the optical fiber amplifier of the present embodiment may be modified such that, in place of the provision of an isolator at the input portion or at both of the input and output portions of the optical fiber amplifier, input signal light is inputted by way of an optical circulator and output signal light is outputted by way of the optical circulator in a similar manner as in the arrangement shown in FIG. 18 or 30.

Further, the pump source 63 may alternatively be formed from two pump sources and a polarizing multiplexer which orthogonally polarizes and multiplexes pump light from the pump sources or may otherwise be formed from a combination of a pump source and a depolarizer by means of which pump light is depolarized or else may generate modulated pump light.

B17-1. First Modification to the Seventeenth Embodiment

Figure 56:
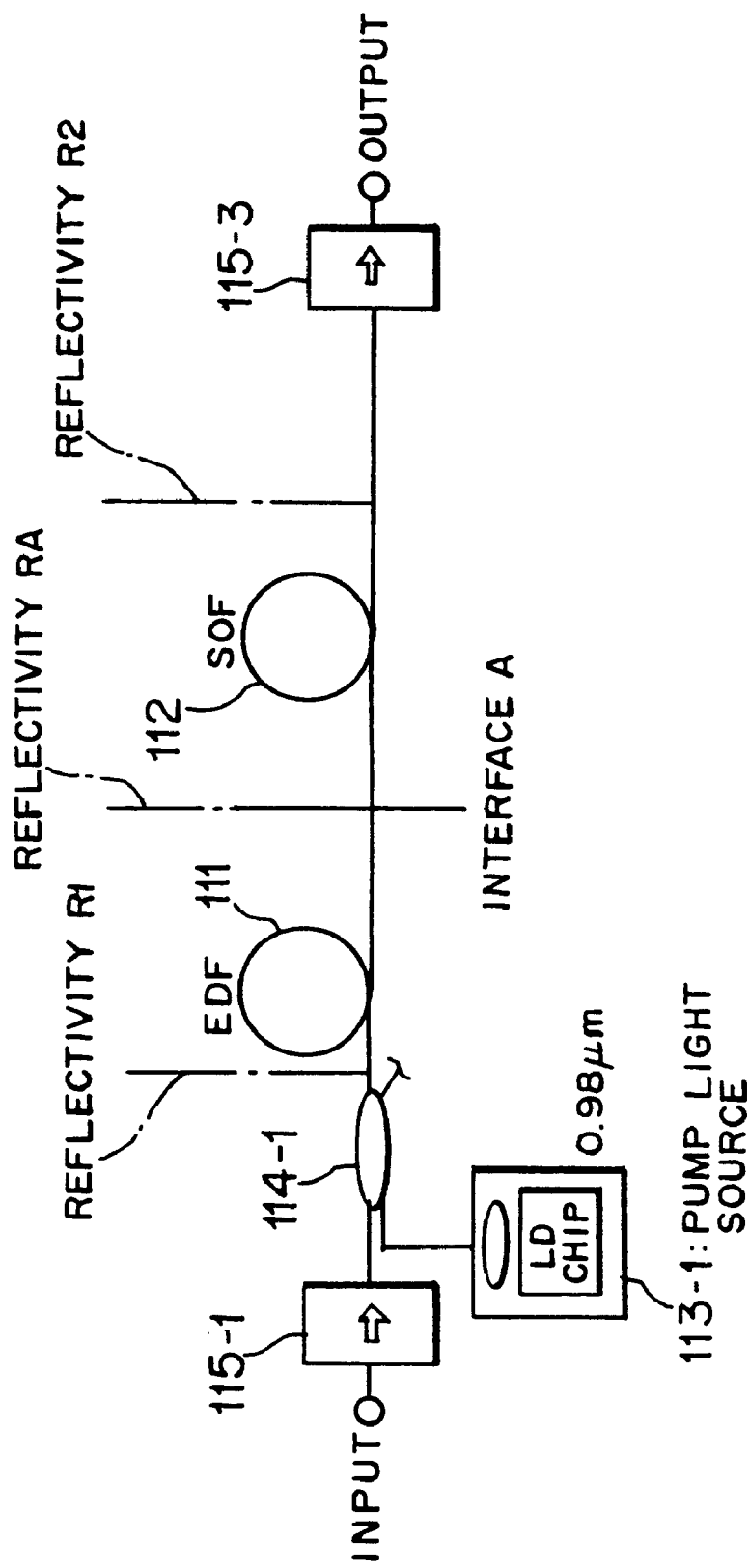
FIGS. 56 to 58 are block diagrams showing different modifications to the optical fiber amplifier of FIG. 55.

FIG. 56 is a block diagram showing a first modification to the seventeenth embodiment of the present invention. Referring to FIG. 56, the optical fiber amplifier shown includes an isolator 115-1, an optical demultiplexer-multiplexer 114-1, an erbium-doped-fiber (rare earth doped fiber amplification element) 111, a silica-type-optical-fiber (optical fiber attenuation element) 112, and another isolator 115-3 disposed in this order from the input side. A pump source 113-1 is connected to the optical demultiplexer-multiplexer 114-1.

Further, the pump source 113-1 outputs pump light of, for example, the 1.47 $\mu$m band (1.45 to 1.49 $\mu$m). Meanwhile, an optical demultiplexer-multiplexer, for example, of the fusion connection type is employed for the optical demultiplexer-multiplexer 114-1.

As described hereinabove in connection with the seventeenth embodiment, a rare earth doped fiber optical amplifier having a high gain sometimes suffers from unnecessary oscillations which are produced when it performs optical amplification, and if such unnecessary oscillations are produced, the rare earth doped fiber optical amplifier operates unstably.

Therefore, also in the optical fiber amplifier shown in FIG. 56, similarly as in the optical fiber amplifier shown in FIG. 55, the silica-type-optical-fiber 112 as a loss medium is provided at the following stage to the erbium-doped-fiber 111 as a rare earth doped fiber optical amplifier so as to suppress unstable operation of the erbium-doped-fiber 111.

It is to be noted that, also in FIG. 56, reference characters R1, R2 and RA represent reflectivities, and A represents an interface.

Similarly as in the seventeenth embodiment described above, in the optical fiber amplifier shown in FIG. 56, by pumping the silica-type-optical-fiber 112 provided at the following stage to the erbium-doped-fiber 111 with residual pump light from the erbium-doped-fiber 111, the silica-type-optical-fiber 112 is compensated for against the loss (including leveling of the concave of the gain of the erbium-doped-fiber 111 and compensation against the reduction of the gain of the erbium-doped-fiber 111) and unstable operation of the erbium-doped-fiber 111 is simultaneously suppressed by the remaining loss.

In the optical fiber amplifier shown in FIG. 56 and having the construction described above, pump light from the pump source 113-1 is inputted to one end of the erbium-doped-fiber 111 by way of the optical demultiplexer-multiplexer 114-1 together with signal light. Consequently, the signal light is amplified in the erbium-doped-fiber 111.

Further, residual pump light which is produced in this instance is used to pump the silica-type-optical-fiber 112 so as to perform Raman amplification similarly as in a dispersion compensating fiber, and the silica-type-optical-fiber 112 is compensated for against the loss by the Raman amplification.

In this manner, in the optical fiber amplifier shown in FIG. 56, by employing the pump source 113-1 of the 1.47 $\mu$m band, both of the erbium-doped-fiber 111 and the silica-type-optical-fiber 112 can be pumped. Consequently, simplification of an optical fiber amplifier and improvement in efficiency of the pump power can be achieved.

Further, in the optical fiber amplifier, removal of unnecessary oscillations originating in the erbium-doped-fiber 111 by means of the loss of the silica-type-optical-fiber 112 is achieved simultaneously. Consequently, unnecessary oscillating operation of a rare earth doped fiber optical amplifier adjusted for wavelength multiplexing (WDM) can be prevented to achieve stabilized optical amplification.

It is to be noted that, where the pump source 113-1 generates pump light of 0.98 $\mu$m, the silica-type-optical-fiber 112 does not perform Raman amplification, and accordingly, the silica-type-optical-fiber 112 is not compensated for against the loss.

It is also to be noted that the reflectivity of the dispersion compensating fiber due to Rayleigh backscattering is ignored in the above discussion. The reflectivity depends on the length of the dispersion compensating fiber. Therefore, if the reflectivity cannot be ignored, an optical isolator should be added to the configuration shown in FIG. 56, for example, between the erbium-doped-fiber 111 and the silica-type-optical-fiber 122. The addition of an optical isolator is normally effective where the Rayleigh backscattering cannot be ignored.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

B17-2. Second Modification to the Seventeenth Embodiment

Figure 57:
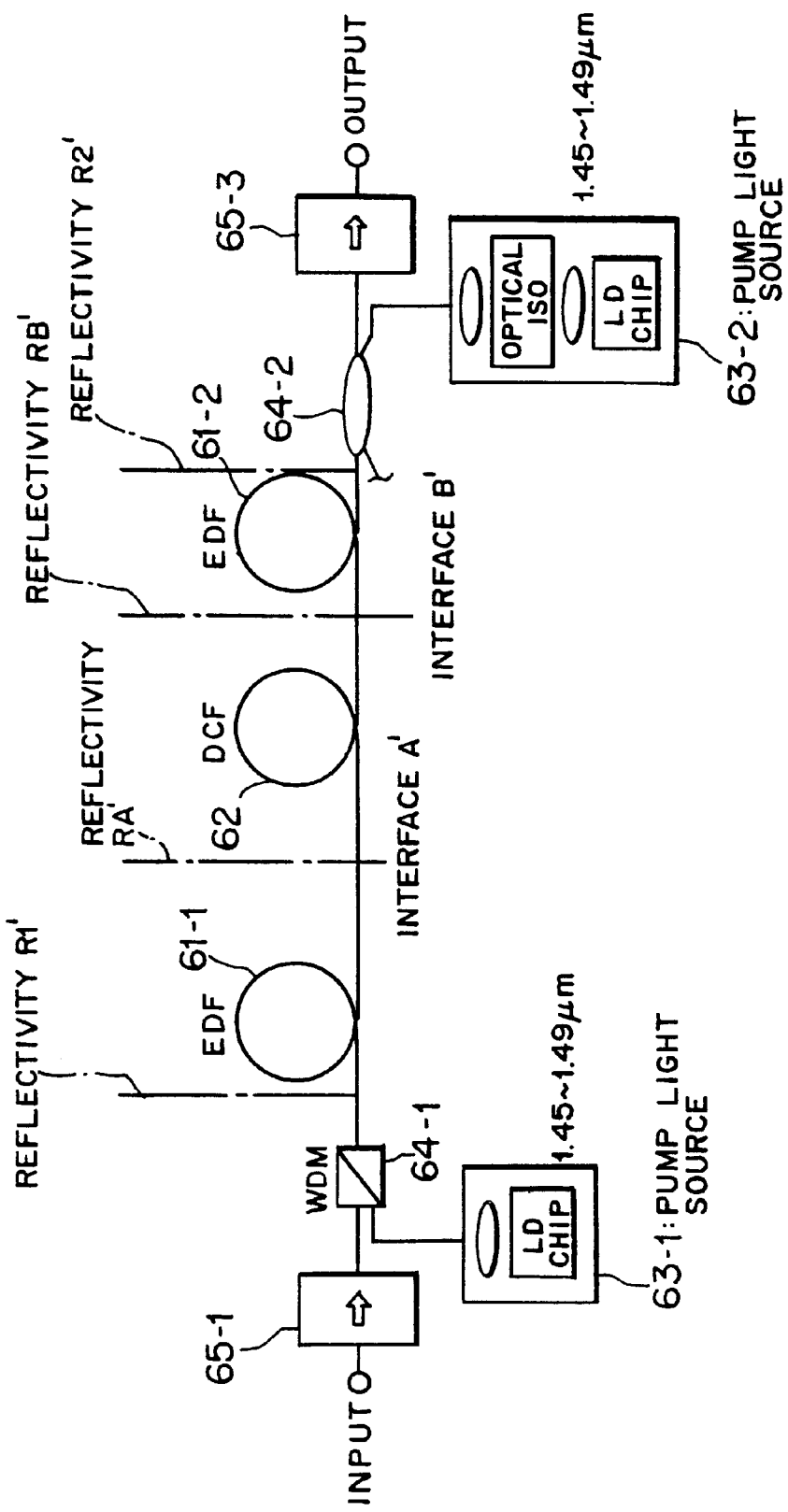

FIG. 57 is a block diagram showing a second modification to the seventeenth embodiment of the present invention. Referring to FIG. 57, the optical fiber amplifier shown includes an isolator 65-1, an optical demultiplexer-multiplexer 64-1, an erbium-doped-fiber (front stage optical amplification element formed as a rare earth doped fiber amplification element) 61-1, a dispersion compensating fiber (optical fiber attenuation element) 62, another erbium-doped-fiber (rear stage optical amplification element formed as a rare earth doped fiber amplification element) 61-2, another optical demultiplexer-multiplexer 64-2 and another isolator 65-3 disposed in this order from the input side. A pump source 63-1 is connected to the optical demultiplexer-multiplexer 64-1, and another pump source 63-2 is connected to the optical demultiplexer-multiplexer 64-2.

The pump sources 63-1 and 63-2 both generate pump light of, for example, the 1.47 μm band (1.45 to 1.49 μm).

As described hereinabove in connection with the seventeenth embodiment, a rare earth doped fiber optical amplifier having a high gain sometimes suffers from unnecessary oscillations which are produced when it performs optical amplification, and if such unnecessary oscillations are produced, the rare earth doped fiber optical amplifier operates unstably.

In the optical fiber amplifier of the seventeenth embodiment shown in FIG. 55, the dispersion compensating fiber 62 as a loss medium is provided at the following stage to the erbium-doped-fiber 61 as a rare earth doped fiber optical amplifier so that unstable operation of the erbium-doped-fiber 61 is suppressed.

However, where the gain G of the erbium-doped-fiber 61 is very high, since the GR parameter defined by the reflectivity R1, the gain G and the reflectivity RA exhibits a high value (since the gain G of the erbium-doped-fiber 61 is very high, although RA <<R1, R2, an influence of the reflectivity RA cannot be ignored), even if the dispersion compensating fiber 62 is provided at the following stage to the erbium-doped-fiber 61, the effect of the loss η of it does not appear, and unstable operation of the erbium-doped-fiber 61 cannot be suppressed.

Thus, in order to suppress unstable operation of the erbium-doped-fiber 61 also in such an instance, the erbium-doped-fiber 61 is divided into front and rear stage erbium-doped-fibers, between which the dispersion compensating fiber 62 is disposed, thereby obtaining the optical fiber amplifier shown in FIG. 57.

The principle of suppression of unstable operation in this instance will be described below with reference to FIG. 57.

If the dispersion compensating fiber 62 (whose loss is represented by η ($0 \leq \eta \leq 1$)) is provided between the erbium-doped-fibers 61-1 and 61-2 (whose gains are given by G/2), for example, by fusion connection, then an interface A' appears between the erbium-doped-fiber 61-1 and the dispersion compensating fiber 62 and another interface B' appears between the dispersion compensating fiber 62 and the erbium-doped-fiber 61-2 as seen in FIG. 57.

The reflectivity at the front end of the erbium-doped-fiber 61-1 is represented by R1' and the reflectivity at the rear end of the erbium-doped-fiber 61-2 is represented by R2', the reflectivity at the interface A' is represented by RA' (RA'<<R1', R2'), and the reflectivity at the interface B' is presented by RB' (RB'<<R1', R2'). The reflectivity R1' is a reflectivity in reflection from all parts located forwardly of the front end of the erbium-doped-fiber 61-1, and the reflectivity R2' is a reflectivity in reflection from all parts located rearwardly of the rear end of the erbium-doped-fiber 61-2. Further, the reflectivity RA' is a reflectivity in reflection caused by a difference in reflectivity at the interface A', and the reflectivity RB' is a reflectivity in reflection caused by a difference in reflectivity at the interface B'.

In this instance, the following GR parameters are applicable. In particular, (1) a GR parameter defined by the reflectivity R1', the gain G/2 of the erbium-doped-fiber 61-1 and the reflectivity RA', (2) another GR parameter defined by the reflectivity R1', the gain G/2 of the erbium-doped-fiber 61-1, the loss η and the reflectivity RB', (3) a further GR parameter defined by the reflectivity R1', the gain G/2 of the erbium-doped-fiber 61-1, the loss η, the gain G/2 of the erbium-doped-fiber 61-2 and the reflectivity R2', (4) a still further GR parameter defined by the reflectivity RA', the loss η, the gain G/2 of the erbium-doped-fiber 61-2 and the reflectivity R2', and (5) a yet further GR parameter defined by the reflectivity RB', the gain C/2 of the erbium-doped-fiber 61-2 and the reflectivity R2'.

In regard to the GR parameter of (1), with the erbium-doped-fiber 61 shown in FIG. 55, since the gain of it is G, $GR=G(R1RA)^{1/2}$, but with the erbium-doped-fiber 61-1 shown in FIG. 57, since the gain of it is G/2 and equal to one half the gain G of the erbium-doped-fiber 61 shown in FIG. 55, $GR=(G/2)(R1RA)^{1/2}$ (RA'=RA) and is equal to one half the GR value of the erbium-doped-fiber 61 shown in FIG. 55.

In regard to the GR parameter of (2), with the erbium-doped-fiber 61-1, since the loss η ($0 \leq \eta \leq 1$) is present at the following stage to it, the net gain when light takes a round is, similarly as in the seventeenth embodiment, $[R1' \times (G/2) \times \eta] \times [RB' \times \eta \times G/2)] = [(G/2)\eta]^2 R1'RB'$, and consequently, the net gain in one way is $(G/2)\eta(R1'RB')^{1/2}$. Here, since $0 \leq \eta \leq 1$ and RB'=RB, GR is equivalently low. Further, since RA'≈RB', the GR parameter exhibits a further lower value than that of (1), and GR in this instance can be ignored.

In regard to the GR parameter of (3), since the loss η ($0 \leq \eta \leq 1$) is present between the erbium-doped-fibers 61-1 and 61-2, the net gain when light takes a round is given by, similarly as in the seventeenth embodiment, $[R1' \times (G/2) \times \eta] \times [R2' \times \eta \times G/2)] = [(G/2)\eta]^2 R1'R2'$, and consequently, the net gain in one way is $(G/2)\eta(R1'R2')^{1/2} = [(G/2)\eta]R$, and the parameter indicating the degree of stability of operation of the erbium-doped-fibers 61-1 and 61-2 changes from (G/2)R to $[(G/2)\eta]R$. It is to be noted that, since RA'<<R1', R2' and RB'<<R1', R2', the influence of the reflectivity RA' and the reflectivity RB' can be ignored. Here, since $0 \leq \eta \leq 1$, GR is equivalently low.

It is to be noted that the GR parameters of (4) and (5) are similar to those of the parameters of (2) and (1), respectively.

Accordingly, when the gain G of the erbium-doped-fiber 61 shown in FIG. 55 is very high, since the GR parameter defined by Ri, G and RA is very high, the erbium-doped-fiber 61 operates unstably, but where the erbium-doped-fiber 61 is divided into the erbium-doped-fibers 61-1 and 61-2 at the preceding and following stages as seen in FIG. 57 and the dispersion compensating fiber 62 as a loss medium is disposed between the erbium-doped-fibers 61-1 and 61-2, the GR parameters of (1) and (5) can be made low, and consequently, unstable operation of the erbium-doped-fibers 61-1 and 61-2 can be suppressed.

Therefore, in the optical fiber amplifier shown in FIG. 57, by pumping the dispersion compensating fiber 62 interposed between the erbium-doped-fibers 61-1 and 61-2 with residual pump light from the erbium-doped-fibers 61-1 and 61-2, the dispersion compensating fiber 62 is compensated for against the loss (including leveling of the concaves of the gains of the erbium-doped-fibers 61-1 and 61-2 and compensation against the reduction of the gains of the erbium-doped-fibers 61-1 and 61-2) and unstable operation of the erbium-doped-fibers 61-1 and 61-2 is simultaneously suppressed by the remaining losses.

In the optical fiber amplifier shown in FIG. 57 and having the construction described above, pump light is inputted to one end of the erbium-doped-fiber 61-1 by way of the optical demultiplexer-multiplexer 64-1 together with signal light and pumps the erbium-doped-fiber 61-1 to amplify the signal light. Residual pump light which is produced in this instance arrives at the other end of the erbium-doped-fiber 61-1. The residual pump light is supplied into the dispersion compensating fiber 62 to cause Raman amplification to occur.

Meanwhile, another pump light is introduced into an output end of the erbium-doped-fiber 61-2 by way of the optical demultiplexer-multiplexer 64-2 to pump the erbium-doped-fiber 61-2 to amplify the signal light inputted into the input end of the erbium-doped-fiber 61-2. Also in this instance, residual pump light arrives at the other end of the erbium-doped-fiber 61-2. The residual pump light is supplied to the dispersion compensating fiber 62 so that Raman amplification may occur in the dispersion compensating fiber 62.

In this instance, since the dispersion compensating fiber 62 causes Raman amplification to occur using the residual pump light from the erbium-doped-fibers 61-1 and 61-2 on the front and rear sides, the dispersion compensating fiber 62 exhibits a higher compensation effect as much. Consequently, a wide bandwidth optical amplifier can be realized while achieving simplification in structure and reduction in cost.

Further, in the optical fiber amplifier, removal of unnecessary oscillations produced in the erbium-doped-fibers 61-1 and 61-2 by means of the loss of the dispersion compensating fiber 62 is simultaneously achieved. Consequently, unnecessary oscillating operation of a rare earth doped fiber optical amplifier adjusted for wavelength multiplexing (WDM) can be prevented to achieve stabilized optical amplification in a reduced noise condition.

It is to be noted that, where the pump sources 63-1 and 63-2 generate pump light of 0.98 $\mu$m, the dispersion compensating fiber 62 does not perform Raman amplification, and accordingly, the dispersion compensating fiber 62 is not compensated for against the loss.

It is also to be noted that the reflectivity of the dispersion compensating fiber due to Rayleigh backscattering is ignored in the above discussion. The reflectivity depends on the length of the dispersion compensating fiber. Therefore, if the reflectivity cannot be ignored, an optical isolator should be added to the configuration shown in FIG. 57, for example, between the erbium-doped-fiber 61-1 and the dispersion compensating fiber 62. The addition of an optical isolator is normally effective where the Rayleigh backscattering cannot be ignored.

Also the present modified optical fiber amplifier may be further modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Further, a pump source and an optical demultiplexer-multiplexer for the dispersion compensating fiber 62 may be provided additionally. In particular, similarly as in the optical fiber amplifier of FIG. 12, an optical fiber amplifier may be constructed using pump sources 133-1 to 133-3 and optical demultiplexer-multiplexers 134-1 to 134-3.

Furthermore, a silica-type-optical-fiber may be employed in place of the dispersion compensating fiber 62.

B17-3. Third Modification to the Seventeenth Embodiment

Figure 58:
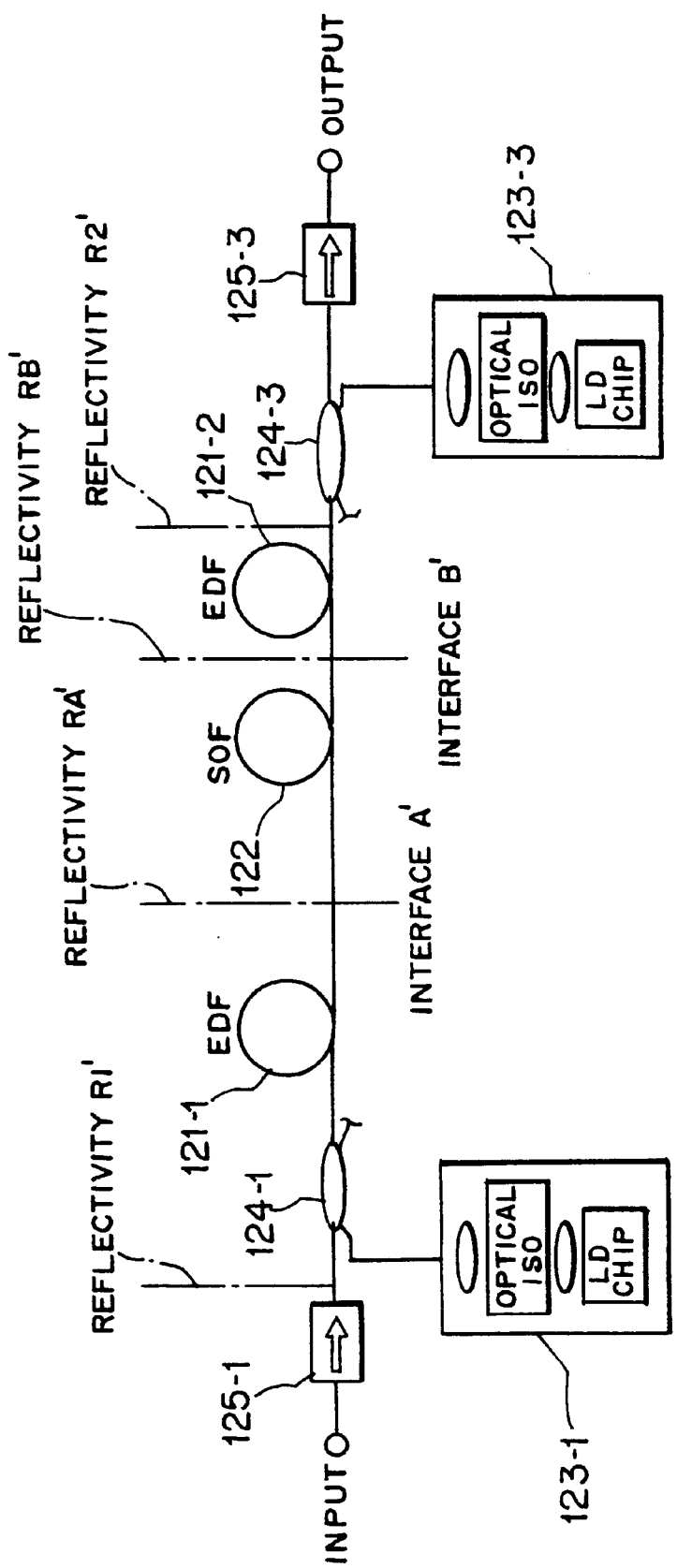

FIG. 58 is a block diagram showing a third modification to the seventeenth embodiment of the present invention. Referring to FIG. 58, the optical fiber amplifier shown includes an isolator 125-1, an optical demultiplexer-multiplexer 124-1, an erbium-doped-fiber (front stage optical amplification element constructed as a rare earth doped fiber amplification element) 121-1, a silica-type-optical-fiber (optical fiber attenuation element) 122, another erbium-doped-fiber (rear stage optical amplification element constructed as a rare earth doped fiber amplification element) 121-2, another optical demultiplexer-multiplexer 124-3, and another isolator 125-3 disposed in this order from the input side. A pair of pump sources 123-1 and 123-3 for producing pump light of, for example, the 1.47 $\mu$m band (1.45 to 1.49 $\mu$m) are connected to the optical demultiplexer-multiplexers 124-1 and 124-3, respectively.

As described hereinabove in connection with the seventeenth embodiment, a rare earth doped fiber optical amplifier having a high gain sometimes suffers from unnecessary oscillations which are produced when it performs optical amplification, and if such unnecessary oscillations are produced, the rare earth doped fiber optical amplifier operates unstably.

In the optical fiber amplifier shown in FIG. 56, the silica-type-optical-fiber 122 as a loss medium is provided at the following stage to the erbium-doped-fiber 111 as a rare earth doped fiber optical amplifier so that unstable operation of the erbium-doped-fiber 111 is suppressed.

However, where the gain G of the erbium-doped-fiber 111 is very high, since the GR parameter exhibits a high value similarly as in the optical fiber amplifier shown in FIG. 55, even if the silica-type-optical-fiber 122 is provided at the following stage to the erbium-doped-fiber 111, the effect of the loss η of it does not appear, and unstable operation of the erbium-doped-fiber 111 cannot be suppressed.

Thus, in order to suppress unstable operation of the erbium-doped-fiber 111 also in such an instance, the erbium-doped-fiber 111 is divided into front and rear stage erbium-doped-fibers, between which the silica-type-optical-fiber 122 is disposed, thereby obtaining the optical fiber amplifier shown in FIG. 58. It is to be noted that the principle of suppression of unstable operation in this instance is similar to that described hereinabove in connection with the second modification to the seventeenth embodiment. Also in FIG. 58, reference characters R1', R2', RA' and RB' denote each a reflectivity, and A' and B' represent each an interface.

Consequently, in the optical fiber amplifier shown in FIG. 58, by pumping the silica-type-optical-fiber 122 provided at a middle stage with residual pump light from the erbium-doped-fibers 121-1 and 121-2, the silica-type-optical-fiber 122 is compensated for against the loss (including leveling of the concaves of the gains of the erbium-doped-fibers 121-1 and 121-2 and compensation against the reduction of the gains of the erbium-doped-fibers 121-1 and 121-2) and unstable operation of the erbium-doped-fibers 121-1 and 121-2 is suppressed by the remaining losses simultaneously.

In the optical fiber amplifier shown in FIG. 58 and having the construction described above, pump light is introduced into one end of the erbium-doped-fiber 121-1 by way of the optical demultiplexer-multiplexer 124-1 to pump the erbium-doped-fiber 121-1 to amplify signal light. Thereupon, residual pump light is produced in the erbium-doped-fiber 121-1, and the silica-type-optical-fiber 122 is pumped with the residual pump light so that Raman amplification may occur similarly as in a dispersion compensating fiber.

Meanwhile, another pump light is introduced into an output end of the erbium-doped-fiber 121-2 by way of the optical demultiplexer-multiplexer 124-3 to pump the erbium-doped-fiber 121-2 to amplify the signal light. Thereupon, residual pump light is produced in the erbium-doped-fiber 121-2, and the silica-type-optical-fiber 122 is pumped with the residual pump light to cause Raman amplification to occur.

Since the optical fiber amplifier shown in FIG. 58 employs the pump sources 123-1 and 123-3 of the 1.47 µm band in this manner, all of the erbium-doped-fibers 121-1 and 121-2 and the silica-type-optical-fiber 122 can be pumped. Consequently, the pump source 123-2 in the optical fiber amplifier shown in FIG. 11 can be omitted. Accordingly, the optical fiber amplifier is simplified in construction and improved in efficiency of the pump power.

Further, in the optical fiber amplifier, removal of unnecessary oscillation originating in the erbium-doped-fibers 121-1 and 121-2 by the loss of the silica-type-optical-fiber 122 is achieved simultaneously. Consequently, unnecessary oscillating operation of a rare earth doped fiber optical amplifier adjusted for wavelength multiplexing (WDM) can be prevented to achieve stabilized optical amplification in a reduced noise condition.

It is to be noted that, where the pump sources 123-1 and 123-3 generate pump light of 0.98 µm, the silica-type-optical-fiber 122 does not perform Raman amplification, and accordingly, the silica-type-optical-fiber 122 is not compensated for against the loss.

It is also to be noted that the reflectivity of the dispersion compensating fiber due to Rayleigh backscattering is ignored in the above discussion. The reflectivity depends on the length of the dispersion compensating fiber. Therefore, if the reflectivity cannot be ignored, an optical isolator should be added to the configuration shown in FIG. 58, for example, between the erbium-doped-fiber 121-1 and the silica-type-optical-fiber 122. The addition of an optical isolator is normally effective where the Rayleigh backscattering cannot be ignored.

Also the present modified optical fiber amplifier may be modified such that, in place of the provision of an isolator at the input portion or at both of the input and output portions, input signal light is inputted by way of an optical circulator and output signal light is outputted by way of the optical circulator in a similar manner as in the arrangement shown in FIG. 18 or 30.

Or, an isolator may be interposed between the silica-type-optical-fiber 122 and the erbium-doped-fiber 121-2.

Further, a pump source and an optical demultiplexer-multiplexer for the silica-type-optical-fiber 122 may be provided additionally. In particular, similarly as in the optical fiber amplifier of FIG. 11, an optical fiber amplifier may be constructed using pump sources 123-1 to 123-3 and optical demultiplexer-multiplexers 124-1 to 124-3.

Furthermore, the silica-type-optical-fiber 122 may be replaced by a dispersion compensating fiber.

The present invention is not limited to the specifically described embodiment, and variations and modifications may be made without departing from the scope of the present invention.

What is claimed is:

1. An apparatus optically coupled to an optical fiber transmission line, comprising:
    a dispersion compensating fiber through which an optical signal is transmitted and for compensating a dispersion given to said optical signal due to transmission through the optical fiber transmission line; and
    a light source for pumping said dispersion compensating fiber to amplify said optical signal by Stimulated Raman Scattering in said dispersion compensating fiber.

2. An apparatus optically coupled to an optical fiber transmission line, comprising:
    a dispersion compensating fiber through which an optical signal is transmitted and for compensating a dispersion given to the optical signal due to transmission through the optical fiber transmission line;
    a pumping light source; and,
    an optical coupler for introducing pump light from said pumping light source to amplify the optical signal by Stimulated Raman Scattering in said dispersion compensation fiber.

3. An apparatus according to claim 2, further comprising an optical isolator through which said optical signal from said dispersion compensating fiber is outputted.

4. An apparatus according to claim 1, wherein said dispersion compensating fiber is doped without a rare earth element.

5. An apparatus optically coupled to an optical fiber transmission line, comprising:
    an optical amplifier, including an optical fiber doped with a rare earth element, for amplifying an optical signal;
    a dispersion compensating fiber, optically connected to the optical fiber, through which the optical signal is transmitted and which compensates dispersion given to the optical signal due to transmission through the optical fiber transmission line; and
    a light source for outputting a pumping light to said dispersion compensating fiber to amplify the optical signal by Stimulated Raman Scattering in said dispersion compensating fiber.

6. An apparatus according to claim 5, wherein, said dispersion compensating fiber is doped without a rare earth element.

7. An apparatus according to claim 3, wherein a wavelength of said optical signal is within a gain bandwidth of said optical amplifier, and said semiconductor laser outputs said pumping light of which wavelength is selected to amplify said optical signal.

8. An apparatus according to claim 5, wherein said optical fiber and said dispersion compensating fiber are optically connected through an optical isolator.

9. A method of processing an optical signal, comprising:
    transmitting the optical signal through a dispersion compensating fiber to amplify the optical signal;
    compensating a dispersion given to the optical signal due to the transmission through an optical fiber transmission line; and
    generating Stimulated Raman Scatting within said dispersion compensating fiber by inputting pumping light to amplify the optical signal.

10. A method of processing an optical signal, comprising:
    transmitting the optical signal through an optical fiber doped with a rare earth element to amplify the optical signal;

transmitting the optical signal through a dispersion compensating fiber to amplify the optical signal;

compensating a dispersion given to the optical signal due to the transmission through an optical fiber transmission line; and generating Stimulated Raman Scattering within said dispersion compensating fiber by inputting pumping light the optical signal.

11. An apparatus according to claim 1, wherein the light source is a semiconductor laser.

12. An apparatus according to claim 2, wherein the pumping light source is a semiconductor laser.

13. An apparatus according to claim 4, wherein the light source is a semiconductor laser.

* * * * *